United States Patent
Gupta et al.

(10) Patent No.: US 11,854,131 B2
(45) Date of Patent: Dec. 26, 2023

(54) CONTENT-SPECIFIC-PRESET EDITS FOR DIGITAL IMAGES

(71) Applicant: Adobe Inc., San Jose, CA (US)

(72) Inventors: Subham Gupta, Roorkee (IN); Arnab Sil, Khalisani (IN); Anuradha, Bengaluru (IN)

(73) Assignee: Adobe Inc., San Jose, CA (US)

( * ) Notice: Subject to any disclaimer, the term of this patent is extended or adjusted under 35 U.S.C. 154(b) by 310 days.

(21) Appl. No.: 17/147,931

(22) Filed: Jan. 13, 2021

(65) Prior Publication Data

US 2022/0222875 A1 Jul. 14, 2022

(51) Int. Cl.
| | |
|---|---|
| *G06T 11/60* | (2006.01) |
| *G06N 20/00* | (2019.01) |
| *G06T 11/20* | (2006.01) |
| *G06T 7/11* | (2017.01) |

(52) U.S. Cl.
CPC ............. *G06T 11/60* (2013.01); *G06N 20/00* (2019.01); *G06T 11/20* (2013.01); *G06T 7/11* (2017.01); *G06T 2210/12* (2013.01)

(58) Field of Classification Search
CPC ........ G06N 3/045; G06N 20/00; G06T 11/60; G06T 7/11; G06T 2210/12; G06T 11/20
See application file for complete search history.

(56) References Cited

U.S. PATENT DOCUMENTS

| | | | | |
|---|---|---|---|---|
| 6,879,327 B1 * | 4/2005 | Mathur | .................. | G06T 11/40 |
| | | | | 345/589 |
| 8,706,544 B1 * | 4/2014 | Sharma | .............. | G06Q 30/0202 |
| | | | | 705/7.31 |
| 2010/0054549 A1 * | 3/2010 | Steinberg | ............. | H04N 23/611 |
| | | | | 348/222.1 |
| 2015/0110349 A1 * | 4/2015 | Feng | .................... | G06V 40/162 |
| | | | | 382/103 |
| 2015/0127603 A1 * | 5/2015 | Cohen | ................. | G06Q 10/101 |
| | | | | 707/608 |

(Continued)

OTHER PUBLICATIONS

Adobe.com "Edit photos faster with Lightroom presets." Date downloaded Jan. 27, 2021; https://www.adobe.com/products/photoshop-lightroom/lightroom-presets.html.

*Primary Examiner* — Phi Hoang
(74) *Attorney, Agent, or Firm* — Keller Preece PLLC

(57) ABSTRACT

The present disclosure describes systems, non-transitory computer-readable media, and methods for generating object-specific-preset edits to be later applied to other digital images depicting a same object type or applying a previously generated object-specific-preset edit to an object of the same object type within a target digital image. For example, in some cases, the disclosed systems generate an object-specific-preset edit by determining a region of a particular localized edit in an edited digital image, identifying an edited object corresponding to the localized edit, and storing in a digital-image-editing document an object tag for the edited object and instructions for the localized edit. In certain implementations, the disclosed systems further apply such an object-specific-preset edit to a target object in a target digital image by determining transformed-positioning parameters for a localized edit from the object-specific-preset edit to the target object.

20 Claims, 29 Drawing Sheets

(56) References Cited

U.S. PATENT DOCUMENTS

| | | | |
|---|---|---|---|
| 2015/0178586 A1* | 6/2015 | Ushijima | G06V 40/165 |
| | | | 382/103 |
| 2019/0392564 A1* | 12/2019 | Sun | G06V 40/164 |
| 2020/0014847 A1* | 1/2020 | Ito | H04N 1/2112 |
| 2020/0193144 A1* | 6/2020 | Rivard | G06V 10/22 |

* cited by examiner

CONTENT-SPECIFIC-PRESET EDITS FOR DIGITAL IMAGES

BACKGROUND

In recent years, digital image editing systems have improved both the function and variety of editing tools for editing digital images. For example, conventional image editing systems can maintain various edit options that modify digital images according to a preset edit upon user selection. To illustrate, in response to a detected selection of a stored preset edit option, conventional systems can apply preset edits to a digital image that automatically adjust the color scheme, black-and-white contrast or tone, visual granularity, various vignettes, or several other preset modifications.

Although conventional image editing systems provide preset functionality, such systems exhibit several technical problems that inhibit the systems from flexibly, accurately, or efficiently applying preset edits to images. For instance, some conventional systems can only apply a fixed type of preset edits to a digital image. To illustrate, certain conventional systems can only apply global preset edits to digital images based on a user selection of a preset edit, such as global preset edits that affect the color scheme, exposure, and white-balance across the entire digital image.

While global preset edits can quickly change aspects of an entire digital image, such conventional preset edits lack specificity and accuracy when attempting more nuanced image edits or different layouts in digital images. For instance, global preset edits do not apply to particular objects within a digital image, but rather apply indiscriminately to objects as a group across an entire image. A global preset edit cannot, therefore, adjust or apply an edit to the same object or type of object, such as when an image editor applies a radial gradient to faces across digital photographs taken at a wedding to improve the appearance of the faces. In such instances, conventional systems often provide no other option or editing tool but for the user to manually (and laboriously) edit each object or type of object across each digital image in a series of images.

To perform manual edits on particular objects, conventional image editing systems typically require users to navigate between and interact with multiple (and separate) graphical user interfaces and/or interact with multiple editing tools. For example, some conventional systems generally require users to open and switch between graphical user interfaces or graphical overlays to select tools, adjust tool configurations, open digital images, and so forth. Because editing objects in images one by one can be user-interaction intensive, conventional systems are particularly inefficient when operating on a client computing device with a smaller screen—such as a smart phone or tablet, where interacting with multiple graphical user interfaces is difficult.

In addition to global preset edits, some conventional image editing systems offer fixed-area-preset edits that can apply to particular sections of a digital image. For instance, some image editing systems provide a preset radial gradient that applies a gradient to the same circular portion of a subsequent image as an original image or a preset linear gradient that applies a gradient to the same rectangular portion of a subsequent image as an original image—regardless of the image's contents. Such conventional partial-image-preset edits can be inaccurate and unhelpful when editing a series of images or objects in locations that do not exactly match the preset edit area from an original image. Thus, when conventional systems apply a preset radial gradient or a preset linear gradient to a target digital image, the resulting effect is often a floating edited region with a gradient that does not cover or match an object within the target digital image that should be within the edited region.

Because conventional image editing systems often require users to manually edit particular objects across images, conventional systems foment additional system-level inefficiencies. For example, conventional systems that are limited to global preset edits waste computing resources and user interactions required to repeatedly and manually perform object-level edits to multiple digital images (e.g., editing all faces across multiple photos from an event). Because fixed-area-preset edits often apply edits to a wrong or an inaccurate region of a target image, conventional systems likewise waste computing resources required for manual correction of positioning an edited region associated with the fixed-area-preset edit. Regardless of the capabilities of conventional systems, this manual editing—repetitively performing the same edits to multiple digital images or manually correcting the positioning of a fixed-area-preset edit—wastes computing resources spent in generating additional user interfaces, detecting additional user inputs, and storing additional information associated with the manually performed edits.

BRIEF SUMMARY

This disclosure describes one or more embodiments of systems, non-transitory computer-readable media, and methods that solve one or more of the foregoing or other problems in the art. In particular, the disclosed systems can generate object-specific-preset edits to be later applied to other digital images depicting a same object type or can apply a previously generated object-specific-preset edit to an object of the same object type within a target digital image. For example, the disclosed systems identify an object (e.g., a face, a person, an animal, a plant, a car, a building, a sky region) and an object location in an edited digital image and determine that the identified object corresponds with a localized edit—such as a radial gradient edit or a linear gradient edit. The disclosed systems generate an object-specific-preset edit for editing an object type corresponding to the type of object in the edited digital image by storing in a digital-image-editing document instructions identifying the object type and the localized edit. In some cases, the disclosed systems further categorize the object-specific-preset edit based on an object identifier or tag associated with the object type in the edited digital image.

In addition (or in the alternative) to creating such object-specific-preset edits, in some cases, the disclosed systems further provide object-specific-preset edits to apply to a target digital image upon user selection. For example, in some cases, the disclosed systems determine objects within a digital image and provide preset-edit options for object-specific-preset edits that correspond to the determined objects. Based on detecting a selection of a preset-edit option for an object-specific-preset edit, the disclosed systems determine transformed-positioning parameters for a localized edit to a target object in the target digital image based on positioning parameters for an edited object upon which the object-specific-preset edit is based. The disclosed systems can determine such transformed-positioning parameters to ensure the object-specific-preset edit applies in a position, scale, and/or offset to the target object in the target digital image in the same manner as a localized edit was applied to an edited object in an original digital image from which the object-specific-preset edit was generated. The disclosed systems further apply the object-specific-preset edit to the target object according to the transformed-positioning parameters.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
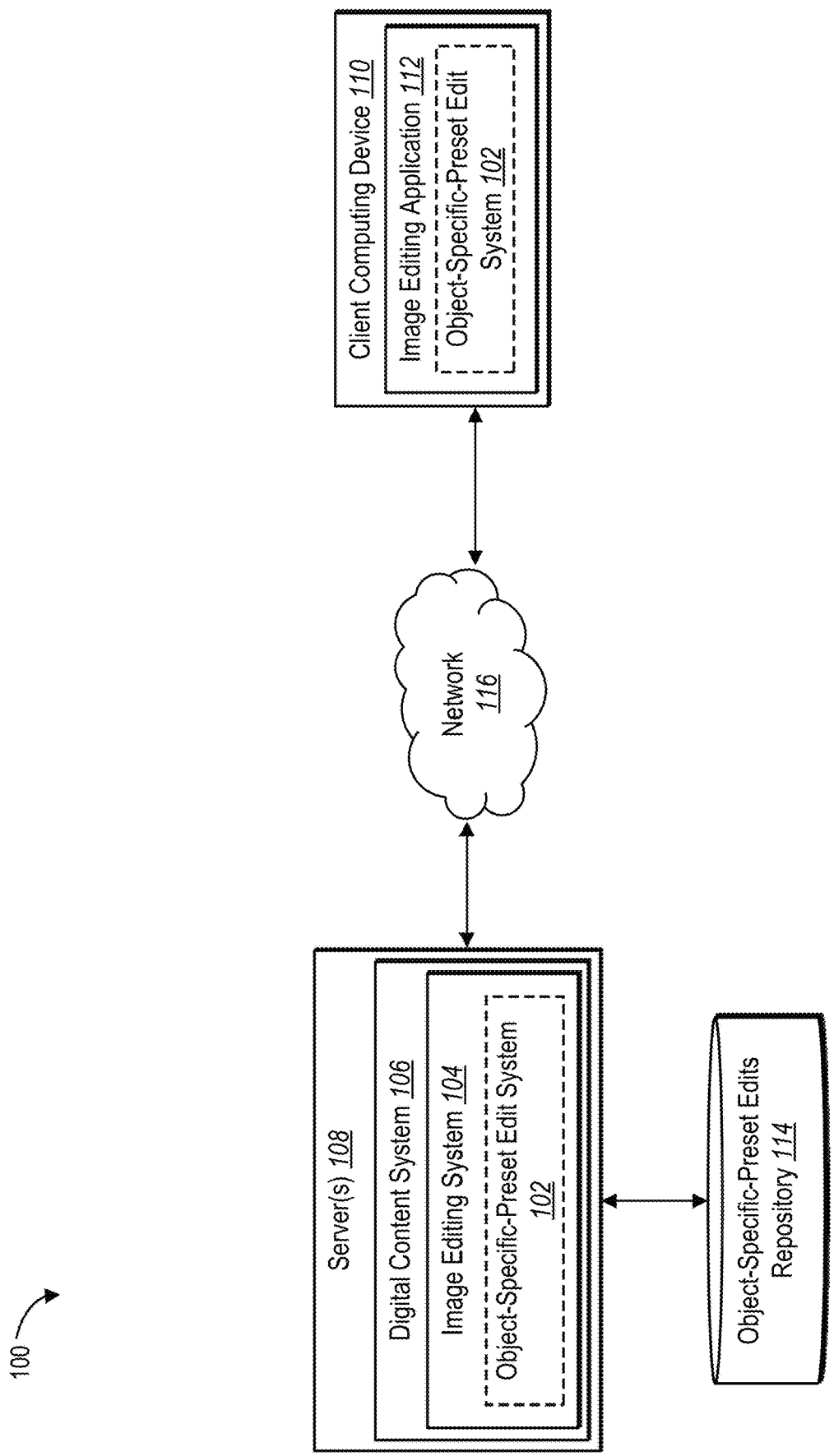
FIG. 1 illustrates a diagram of an environment in which an object-specific-preset-edit system can operate in accordance with one or more embodiments.

This disclosure describes one or more embodiments of an object-specific-preset-edit system that generates or applies an object-specific-preset edits to an object within a digital image when such an object corresponds to a same object type as the object-specific-preset edit. To generate such a preset edit, in some cases, the object-specific-preset-edit system determines a region of a particular localized edit in an edited digital image and identifies an edited object corresponding to the localized edit—based on a degree of overlap between the object and the region. By further storing in a digital-image-editing document an object tag and instructions for the localized edit, the object-specific-preset-edit system generates an object-specific-preset edit for editing objects having a same object type as the edited object. For example, such a digital-image-editing document can include a bounding box associated with the edited object in the edited digital image and original positioning parameters of the localized edit in the edited digital image.

After or independent of generating such a preset edit, the disclosed system can apply an object-specific-preset edit to another digital image that includes a same object type as the object-specific-preset edit. For instance, the object-specific-preset-edit system can identify a set of objects within a target digital image and facilitate the display of a preset-edit option for an object-specific-preset edit—when a target object from the set of objects is of a same object type as the object-specific-preset edit. Based on a detected selection of the preset-edit option, the object-specific-preset-edit system determines transformed-positioning parameters for a localized edit to the target object. The object-specific-preset-edit system can then quickly and accurately apply the same object-specific-preset edit to the target object in the target digital image according to the transformed-positioning parameters.

As mentioned above, the object-specific-preset-edit system identifies one or more objects in an edited digital image. To illustrate, in one or more embodiments, the object-specific-preset-edit system determines object identifiers (e.g., object tags) and bounding boxes associated with each object depicted in the edited digital image. Such object identifiers can indicate different types of objects. For example, the object-specific-preset-edit system can identify objects including faces, people, animals, plants, cars, sky regions, and so forth. In one or more embodiments, the object-specific-preset-edit system utilizes (i) a trained machine-learning-detection model to detect objects in an edited digital image or (ii) segmentation and regression techniques to determine a horizon associated with a sky region within the edited digital image.

In addition to detecting objects, the object-specific-preset-edit system also determines a localized-edit region outlining a localized edit in the edited digital image. For example, the object-specific-preset-edit system determines coordinates outlining the localized-edit region for the localized edit within the edited digital image. In one or more embodiments, the localized edit includes one or more of a radial gradient edit, a linear gradient edit, brushing effects, a type of mask, or other localized modifications or effects in an image.

Having detected objects and determined a localized-edit region, in some cases, the object-specific-preset-edit system determines that an edited object from among the detected objects in the edited digital image corresponds to the localized-edit region. For example, the object-specific-preset-edit system determines an overlap between the localized-edit region and each object of the detected objects in the edited digital image. By comparing such overlap, the object-specific-preset-edit system determines that the object with the highest degree of overlap with the localized-edit region is the edited object within the edited digital image corresponding to the localized-edit region.

Based on the localized-edit region and the corresponding edited object, the object-specific-preset-edit system generates an object-specific-preset edit for use on other digital images. For example, the object-specific-preset-edit system can generate the object-specific-preset edit by aggregating an object identifier for the edited object and positioning parameters (e.g., bounding-box coordinates) associated with the edited object within a digital-image-editing document. Such a digital-image-editing document can further include coordinates associated with the localized-edit region for the object-specific-preset edit. Based on the object identifier associated with the edited object, in one or more embodiments, the object-specific-preset-edit system further classifies the object-specific-preset edit by object type for use with other digital images depicting a same object type.

In addition to generating such preset edits, in one or more embodiments, the object-specific-preset-edit system provides object-specific-preset edits tailored to objects within a currently displayed digital image (e.g., a target digital image). For example, after generating an object-specific-preset edit, the object-specific-preset-edit system can detect a face, animal, sky region, or other objects in a new target digital image displayed in a graphical user interface. For instance, the object-specific-preset-edit system can use a machine-learning-detection model—or segmentation and regression techniques—to detect objects within the target digital image and assign corresponding object identifiers. Based on the object identifiers, the object-specific-preset-edit system provides selectable preset-edit options for object-specific-preset edits corresponding to the detected objects for display within the graphical user interface with the target digital image.

Such preset-edit options provide a computing device with user friendly and automatic preset edits particular to objects within the target digital image. Based on detecting a user selection of a provided preset-edit option, for instance, the object-specific-preset-edit system can apply the corresponding object-specific-preset edit to the target digital image. In one or more embodiments, for instance, the object-specific-preset-edit system identifies a target object within the target digital image for a localized edit based on the target object having an object identifier that corresponds with a preset-object identifier specified by the object-specific-preset edit. The object-specific-preset-edit system then applies the object-specific-preset edit by transforming the position of a localized-edit region specified in the object-specific-preset edit based on a location of the target object in the target digital image.

To transform the position of such a localized edit, in some cases, the object-specific-preset-edit system determines transformed-positioning parameters for accurately positioning the localized-edit region in the target digital image based on (i) a location of the edited object specified in the object-specific-preset edit, (ii) a location of the target object in the digital image, and (iii) a location of the localized-edit region specified in the object-specific-preset edit relative to the location of the edited object. In one or more embodiments, the object-specific-preset-edit system determines the transformed-positioning parameters to accurately position, scale, and/or offset the preset-localized edit from the object-specific-preset edit such that the resulting effect of the preset-localized edit on the target object is the same as that found in the edited digital image from which the object-specific-preset edit was generated.

As mentioned above, the object-specific-preset-edit system provides many technical advantages and benefits over conventional image editing systems. For example, the object-specific-preset-edit system improves both the functionality of editing tools and user navigation of an image editing graphical user interface. As noted, conventional image editing systems often require users to open and switch between multiple user interfaces or graphical overlays to select tools, adjust tool configurations, and otherwise perform edits to a digital image. Conversely, the object-specific-preset-edit system presents a streamlined preset-image-editing tool in a graphical user interface whereby a user device can generate or apply an object-specific-preset edit for multiple target objects across one or more digital images based on a selection of the object-specific-preset edit.

Accordingly, unlike conventional image editing systems, the object-specific-preset-edit system consolidates what would previously have been multiple tool selections and interface switches into an object-specific-preset edit. For example, disclosed systems can identify an edited object with a localized edit and a localized-edit region in an edited digital image and—based on determining that the edited object corresponds to the localized edit—generate an object-specific-preset edit for editing an object type corresponding to the type of object in the edited digital image. As a further example, in some cases, based on a selection of a preset-edit option for an object-specific-preset edit, the object-specific-preset-edit system applies a localized edit to one or more target objects in a target digital image—without the multiple and often complex user interactions and/or interface switches common in conventional systems. Thus, the object-specific-preset-edit systems avoids the burdensome task of navigating and interacting with multiple, and separate, graphical user interfaces or graphical overlays and tools to edit a specific object in a target digital image.

In addition to improved editing tools and graphical user interfaces, the object-specific-preset-edit system generates and applies object-specific-preset edits to particular types or classifications of objects with a higher degree of accuracy than conventional image editing systems with preset tools. For example, as mentioned above, conventional systems that apply a fixed-area-preset edit generally apply that preset edit based on a particular and fixed position or location of an edited object in a digital image from which the preset edit was generated. To apply such a fixed-area-preset edit that represents a radial gradient filter on a face that was in an upper left-hand corner of an original digital image, for instance, a conventional system inaccurately often applies that radial gradient filter to an upper left-hand corner of a target digital image—regardless of any object that may or may not be in that location of the target digital image. Conversely, the object-specific-preset-edit system can capture positioning parameters for a localized edit to an edited object in an edited digital image as a basis for generating an object-specific-preset edit that can later be applied with transformed-positioning parameters to accurately edit a target object. Similarly, after generating such a smart edit, the object-specific-preset-edit system utilizes object detection and various transformation parameters that ensure that an object-specific-preset edit is accurately applied to a correct type or classification of target object in the same way that the represented edit was applied in the original digital image—no matter where the target object(s) is located in the target digital image.

Beyond improved user interfaces or greater preset editing accuracy, the object-specific-preset-edit system introduces more editing flexibility than conventional image editing systems by generating, providing, and applying preset edits that are object-specific. While conventional systems often rigidly generate and apply global-level preset edits that change one or more values or configurations across an entire digital image, the object-specific-preset-edit system generates or applies preset edits that are specific to a particular type or classification of object in a target image. The object-specific-preset-edit system accordingly introduces more editing flexibility by generating an object-specific-preset-edit based on a localized edit in an edited digital image that can be applied to an unlimited number of target digital images exhibiting a same object type. Additionally, when a target digital image includes multiple objects with the same object type as previously generated object-specific-preset edits, the object-specific-preset-edit system can flexibly and intelligently surface those previously generated object-specific-preset edits for use in connection with the target digital image.

In addition to improved graphical tools, accuracy, or flexibility, in some embodiments, the object-specific-preset-edit system generates and applies object-specific-preset edits by implementing an ordered combination of unconventional actions that automatically perform something conventional image editing systems cannot do—either generate or apply a preset edit for a specific object within a digital image. Unlike conventional systems, the object-specific-preset-edit system generates an object-specific-preset edit by identifying an edited object corresponding to a localized-edit region and storing information associated with the type and location of the edited object along with additional information associated with the localized-edit region. To apply such an object-specific-preset edit, the object-specific-preset-edit system identifies a target object based on object detection and object identifiers, determines transformed-positioning parameters for a localized edit to the target object, and applies the object-specific-preset edit to the target object according to the transformed-positioning parameters.

In part because of the improved graphical tools, accuracy, or flexibility, the object-specific-preset-edit system further overcomes the system-level inefficiencies common to conventional image editing systems. For example and as discussed above, conventional systems waste computing resources associated with generating and providing graphical user interfaces, storing user selections, displaying tools, and tracking user inputs while users repeatedly apply the same edits to digital images over and over again (e.g., applying the same radial gradient filter to faces across multiple digital images while editing wedding photos). Even if a conventional system offers fixed-area-preset edits, such systems still waste computing resources spent in providing the interfaces, tools, and memory space needed for a user to manually correct the positioning of one or more edits associated with fixed-area-preset edits. Conversely, the object-specific-preset-edit system applies object-specific-preset edits at an object level, regardless of target object positioning or location, based on a single user-selection in a single user interface.

As illustrated by the foregoing discussion, the present disclosure utilizes a variety of terms to describe features and advantages of the object-specific-preset-edit system. Additional detail is now provided regarding the meaning of such terms. For example, as used herein, the term "digital image" refers to a collection of digital information that represents an image. More specifically, a digital image can comprise pixels, each including a numeric representation of a color and/or gray-level or other characteristics (e.g., brightness). In some cases, a digital image arranges pixels in two dimensions, where each pixel has spatial coordinates including an x-value and a y-value. In at least one embodiment, a "target digital image" refers to a digital image to which an edit could or will be applied. In one or more embodiments, a digital image is stored as a file (e.g., a ".jpeg" file, a ".tiff" file, a ".bmp" file, a ".pdf" file). Moreover, the term "edited digital image" refers to a collection of digital information that represents an image including one or more edits. For example, an edited digital image can include a digital image with a radial gradient filter applied in an area of the digital image.

As used herein, the term "localized edit" refers to an alteration, modification, or effect applied to a digital image at a specific location. In one or more embodiments, for instance, a localized edit includes a particular edit that is applied to specific pixels within a digital image. More particularly, the localized edit applied to the specific pixels can be defined by coordinates (e.g., a bounding box) outlining an area of the pixels affected by the localized edit. For example, a localized edit can include a radial gradient filter, a linear gradient filter, a mask, one or more brush stroke, or other type of edit. In one or more embodiments, a localized edit corresponds to a "localized-edit region," which refers to an area in the digital image where the localized edit is present or applied.

Similarly, the term "preset-localized edit" refers to an alteration, modification, or effect applied to an edited digital image at a specific location within an object-specific-preset edit associated with the edited digital image. Additionally, the term "preset-localized-edit region" refers to the area of the preset-localized edit as represented within the object-specific-preset edit associated with the edited digital image. In some embodiments, a preset-localized-edit region is defined or demarcated by "preset-gradient coordinates." In one or more embodiments, preset-gradient coordinates define or demarcate an area of pixel affected by a preset-localized edit. For example, preset-gradient coordinates can include corner coordinates of a bounding box that encompasses the preset-localized-edit region.

As used herein, the term "object" refers to a region of pixels in a digital image that depicts a person, place, or thing. Similarly, the term "edited object" refers to a region of pixels in an edited digital image that correspond with a depiction of a person, place, or thing that has had one or more edits applied within that region of pixels. As used herein, the term "target object" refers to an object in a digital image corresponding to a region of pixels where an object-specific-preset edit could or will be applied. In one or more embodiments, the term "object identifier" refers to an object alphanumeric, code, digits, or tag associated with an object that refers to a title, description, type, and/or classification of the object.

Also as used herein, the term "bounding box" refers to a quadrilateral area within a digital image. In some cases, a bounding box includes an area demarcated by coordinates for pixels that encompasses a detected object or edited object. In one or more embodiments, a bounding box is associated with bounding-box coordinates that include x-coordinates and y-coordinates defining the bounding box within the digital image, edited digital image, or target digital image. Accordingly, "bounding-box coordinates for an edited object" refer to the coordinates of defining a quadrilateral within an edited digital image that encompass an edited object.

As used herein, the term "object-specific-preset edit" refers to data defining or associated with a localized edit made to an edited object in an edited digital image that can be applied to a target object of a same object type. For example, an object-specific-preset edit includes both information associated with the edited object and information associated with the localized edit. In one or more embodiments, the information associated with the edited object includes an object identifier (e.g., an object tag) associated with the edited object and positioning or location information associated with the edited object (e.g., bound-box coordinates associated with the edited object). Accordingly, an object-specific-preset edit can be a type of content-aware-preset edit or content-specific-preset edit particular to an image's contents or constituent objects.

In one or more embodiments, the information associated with the localized edit includes to a set or collection of edit configurations associated with a localized edit and location information for the localized edit. For example, edit configurations associated with a radial gradient applied to an edited object in an edited digital image includes exposure values, contrast values, highlight values, shadow values, white values, etc. in association with the radial gradient.

Location information for the localized edit includes information defining a "localized-edit region" associated with the localized edit. For example, the localized-edit region of the localized edit can be defined or demarcated by "preset-positioning parameters." In one or more embodiments, preset-positioning parameters refer to coordinates defining or demarcating an area of pixels outlining the localized edit to the edited object. For instance, the preset-positioning parameters can be bounding-box coordinates for corner pixels of an area of pixels outlining the localized edit in the edited object. As used herein, the term "object-specific-preset gradient" refers to an object-specific-preset edit that reflects a gradient edit to an edited object.

As used herein, the term "preset-edit option" refers to a selectable option within a graphical user interface that is associated with a particular object-specific-preset edit. Similarly, the term "preset-gradient option" refers to a selectable option within a graphical user interface that is associated with a particular object-specific-preset gradient.

As used herein, the term "digital-image-editing document" refers to a digital file that includes information associated with an object-specific-preset edit. For example, a digital-image-editing document can include instructions for applying a preset-localized edit (e.g., a radial gradient) to a particular object in the edited digital image from which the corresponding object-specific-preset edit was generated. In one or more embodiments, a digital-image-editing document can be a scripted digital document, such as an XMP document. Additionally or alternatively, a digital-image-editing document can be a text digital document or a compiled executable.

As used herein, the term "transformed-positioning parameters" refer to instructions indicating a size and location of a localized edit to a target object in a target digital image. In some cases, transformed-positioning parameters refer to parameters that define a size and position of an edit to a target object to simulate an edit to an object of a same type for an object-specific-preset edit. For example, transformed-positioning parameters can include coordinates or digital measurements for scaling, offsetting, and/or positioning a localized-edit region associated with the localized edit such that, when applied to a target object, the localized-edit is correctly sized and positioned relative to the target object. In one or more embodiments, transformed-positioning parameters include "target-gradient coordinates." As used herein, "target-gradient coordinates" refer to coordinates demarcating an area for a gradient edit in a digital image. For example, target-gradient coordinates for a radial gradient can include bounding-box coordinates defining the radial gradient as applied to the target digital image. As a further example, target-gradient coordinates for a linear gradient can include target full point coordinates and target zero point coordinates defining points in the target digital image where the linear gradient begins and ends.

As used herein, "scaling ratios" refer to a ratio for adjusting a size of coordinates, bounding boxes, or other parameters for a region or an object. For instance, a scaling ratio may include a horizontal ratio or a vertical ratio for adjusting a localized-edit region according to the bounds of a gradient applied to an edited object in an edited digital image and bounds of an object to which a gradient will be applied. As used herein, the term "directional offset" refers to a distance between an object and a localized edit (or a localized-edit region) for the object. Such a distance may include a pixel distance between the center of an object and the center of a localized-edit region applied to the object. For example, directional offsets can include horizontal and vertical offsets reflecting a distance and direction between a center of the edited object and a center of the localized-edit region.

As used herein, "zero-point coordinates" refer to coordinates representing a starting point for a linear gradient. In some cases, the coordinates include x and y coordinates according to respective horizontal and vertical axes within an image. For example, zero-point coordinates may be equal to a point in a digital image where a linear gradient tool is initially applied (e.g., where a mouse is pressed, where a tap-and-slide touch gesture is begun). The term "full-point coordinates" refer to coordinates representing an ending point for a linear gradient. Such coordinates can likewise include x and y coordinates according to respective horizontal and vertical axes within an image. For example, full-point coordinates may be equal to a point in a digital image where a linear gradient tool is released (e.g., where the mouse is released, where the tap-and-slide touch gesture ends). As such, the term "preset-zero-point coordinates" refers to an initial point associated with a preset-linear gradient on the edited object, and the term "preset-full-point coordinates" refers to an ending point associated with the preset-linear gradient on the edited object. Similarly, the term "target-zero-point coordinates" refers to an initial point associated with a linear gradient on a target object, and the term "target-full-point coordinates" refers to an ending point associated with the linear gradient on the target object.

As used herein, a "machine-learning-detection model" refers to a machine learning model that is tuned (e.g., trained) based on inputs to approximate unknown functions in order to identify objects in a digital image. In particular, the machine-learning-detection model learns to approximate complex functions and generate outputs based on inputs provided to the machine-learning-detection model to detect objects. Specifically, the object-specific-preset-edit system trains the machine-learning-detection model as an object detector to identify, determine, and/or tag one or more objects in a digital image or modified version of the digital image. In one or more embodiments, the machine-learning-detection model includes a neural network model of interconnected layers that communicate and analyze attributes at varying degrees of abstraction to learn to approximate complex functions and generate outputs based on a plurality of inputs provided to the machine-learning-detection model.

In one or more embodiments, the machine-learning-detection model includes convolutional neural networks (i.e., "CNNs"). In other words, the machine-learning-detection model includes an algorithm that implements deep learning techniques, i.e., machine learning that utilizes a set of algorithms to attempt to model high-level abstractions in data. For example, in at least one embodiment, the machine-learning-detection model includes a plurality of convolution layers and max-pooling layers followed by fully-connected layers to generate a prediction of a number, location, size, and/or type of objects within a digital image. In additional or alternative embodiments, the machine-learning-detection model includes other or additional neural network architectures (alone or in combination) such as: a recurrent neural network, a feedforward neural network, a long-short term memory network, a self-organizing neural network, a decision tree, a random forest, a gradient boosting network, and/or a modular neural network.

Additional detail regarding the object-specific-preset-edit system will now be provided with reference to the figures. For example, FIG. 1 illustrates a schematic diagram of an example system environment 100 (e.g., the "environment" 100) for implementing an object-specific-preset-edit system 102 in accordance with one or more embodiments. Thereafter, a more detailed description of the components and processes of the object-specific-preset-edit system 102 is provided in relation to the subsequent figures.

As shown in FIG. 1, the environment 100 includes server(s) 108, a client computing device 110, and a network 116. Each of the components of the environment 100 communicate via the network 116, and the network 116 may be any suitable network over which computing devices communicate. Example networks are discussed in more detail below in relation to FIG. 14.

As mentioned, the environment 100 includes the client computing device 110. The client computing device 110 includes one of a variety of computing devices, including a smartphone, tablet, smart television, desktop computer, laptop computer, virtual reality device, augmented reality device, or other computing device as described in relation to FIG. 14. Although FIG. 1 illustrates a single client computing device 110, in some embodiments, the environment 100 includes multiple different client computing devices, each associated with a different user. The client computing device 110 further communicates with the server(s) 108 via the network 116.

In one or more embodiments, the client computing device 110 includes an image editing application 112. The image editing application 112 includes one or more features or functions that enables selection, editing, modifying, and storing of digital images. For example, the image editing application 112 provides the digital image in an editing mode. In response to further user interactions, the image editing application 112 enacts one or more edits or modifications on the digital image that result in an edited version of the digital image. The image editing application 112 stores the edited version of the digital image either locally on the client computing device 110, remotely at the server(s) 108, or both locally and remotely.

As illustrated in FIG. 1, the environment 100 includes the server(s) 108. The server(s) 108 may include one or more individual servers that may generate, store, receive, and transmit electronic data. For example, the server(s) 108 may receive data from the client computing device 110 in the form of an edited version of a digital image including metadata associated with modifications made in connection with the modified version of the digital image. In addition, the server(s) 108 transmit data to the client computing device 110. Furthermore, the server(s) 108 includes one or more machine learning models. In some embodiments, the server(s) 108 comprise a content server. The server(s) 108 also optionally comprise an application server, a communication server, a web-hosting server, a social networking server, or a digital content analytics server.

As further shown in FIG. 1, the server(s) 108 includes the digital content system 106. In one or more embodiments, the digital content system 106 provides various tools for use in connection with digital content. For example, the digital content system 106 includes an image editing system 104 that provides tools for editing digital images. In one or more embodiments, the image editing system 104 sends and receives data to and from the image editing application 112. Additionally, or alternatively, the image editing system 104 includes one or more machine learning models. In at least one embodiment, the image editing system 104 receives a digital image from the client computing device 110, and utilizes a machine learning model, such as an object detector, to determine one or more objects in the digital image and provide one or more object identifiers and locations associated with the determined objects to the client computing device 110. In other words, the image editing system 104 supports or otherwise works in concert with the image editing application 112. In some embodiments, the image editing system 104 hosts the image editing application 112. In other words, in such embodiments, the image editing application 112 is a web-based client application. In alternative embodiments, the image editing system 104 is an access point that allows downloading of the image editing application 112 to the client computing device 110.

As shown in FIG. 1, the object-specific-preset-edit system 102 can be part of the image editing system 104 on the server(s) 108 or can be part of the image editing application 112 on the client computing device 110. In some embodiments, the object-specific-preset-edit system 102 may be implemented entirely or in part by any of the components of the environment 100. For example, the object-specific-preset-edit system 102 may be implemented in whole, or in part, by the client computing device 110. Alternatively, the object-specific-preset-edit system 102 may be implemented in whole, or in part, by the server(s) 108. In some such embodiments, the object-specific-preset-edit system 102 can provide functionality to other client computing devices in addition to the client computing device 110.

As further shown in FIG. 1, in some embodiments, the object-specific-preset-edit system 102 can store and retrieve object-specific-preset edits to and from the object-specific-preset edits repository 114. In one or more embodiments, the object-specific-preset edits repository 114 stores object-specific-preset edits in various formats. For example, in one embodiment, the object-specific-preset edits repository 114 stores object-specific-preset edits as Extreme Memory Profile (XMP) documents. Additionally, the object-specific-preset edits repository 114 organizes stored object-specific-preset edits according to attributes (e.g., titles, object identifiers) associated with each of the object-specific-preset edits.

FIGS. 2A-2H illustrate an overview of the object-specific-preset-edit system 102 generating and applying object-specific-preset edits using various graphical user interfaces. For example, FIGS. 2A-2D illustrate an overview of the object-specific-preset-edit system 102 generating and applying an object-specific-preset edit for a radial gradient on digital images, and FIGS. 2E-2H illustrate an overview of the object-specific-preset-edit system 102 generating and applying an object-specific-preset edit for a linear gradient on digital images.

Figure 2B:
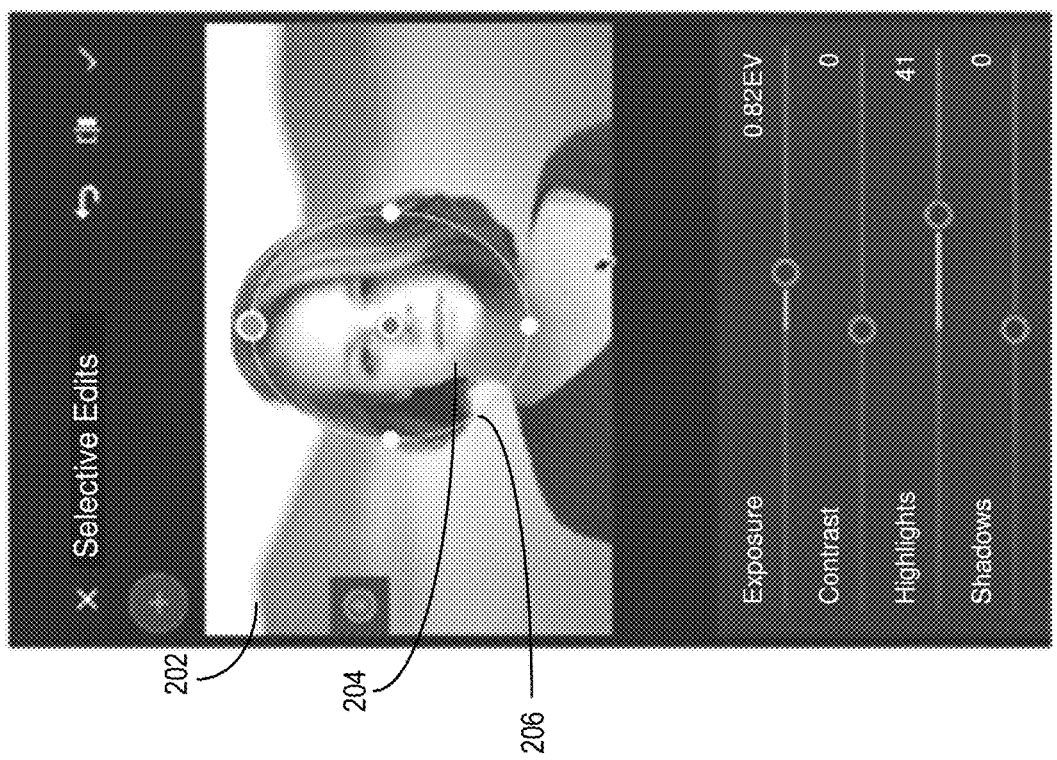
FIGS. 2A-2H illustrate overviews of the object-specific-preset-edit system generating and applying object-specific-preset edits in accordance with one or more embodiments.
Figure 2A:
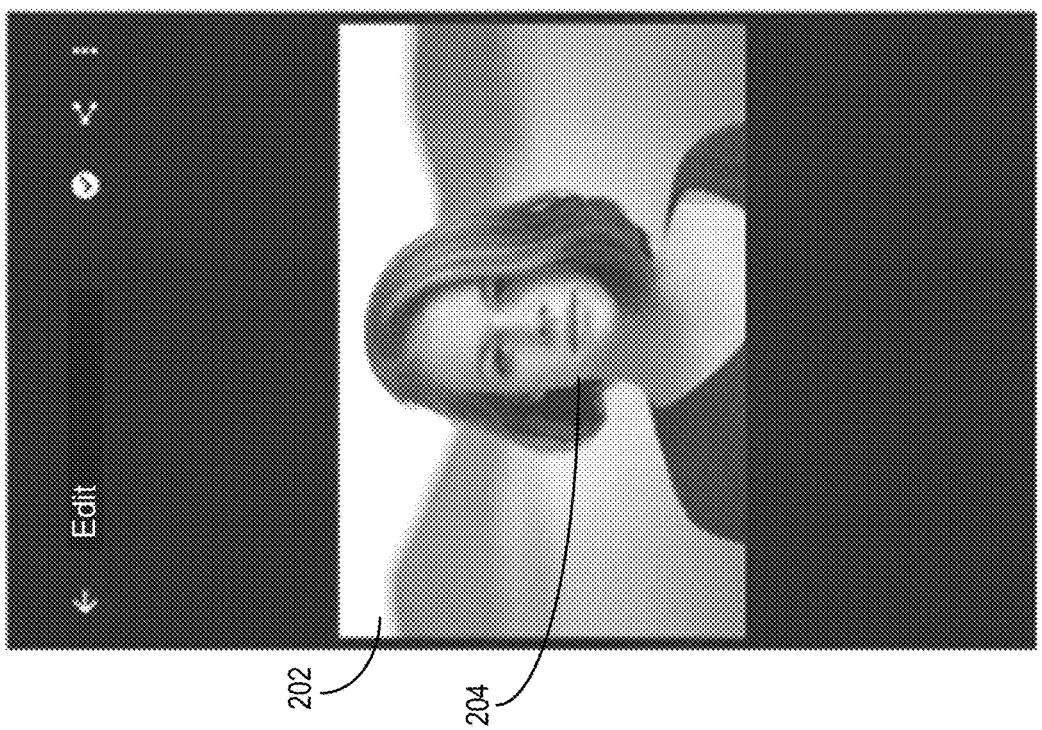

As shown in FIG. 2A, the object-specific-preset-edit system 102 can provide a digital image 202 including an object 204 for further editing within a graphical user interface of a computing device. In this example, the object 204 is a human face, but it could be some other object. As further shown in FIG. 2B, based on detecting interactions with one or more editing tools, the object-specific-preset-edit system 102 can apply a radial gradient 206 to the object 204 in the digital image 202. Based on a detected preset-generating trigger (e.g., a detected user selection of a preset generating option, a detected completion of a single edit), the object-specific-preset-edit system 102 generates an object-specific-preset edit for application on other digital images based on the radial gradient 206 applied to the object 204 within the digital image 202.

To generate such an object-specific-preset edit, for example, the object-specific-preset-edit system 102 identifies the object 204 (e.g., utilizing a machine-learning-detection model) by determining an object identifier and a location of the object 204. The object-specific-preset-edit system 102 further determines a localized-edit region associated with the radial gradient 206. The object-specific-preset-edit system 102 further generates an object-specific-preset edit comprising editing information for a radial gradient within a digital-image-editing document—based on the information associated with the object 204 and the localized-edit region of the radial gradient 206 relative to the object 204.

Figure 2D:
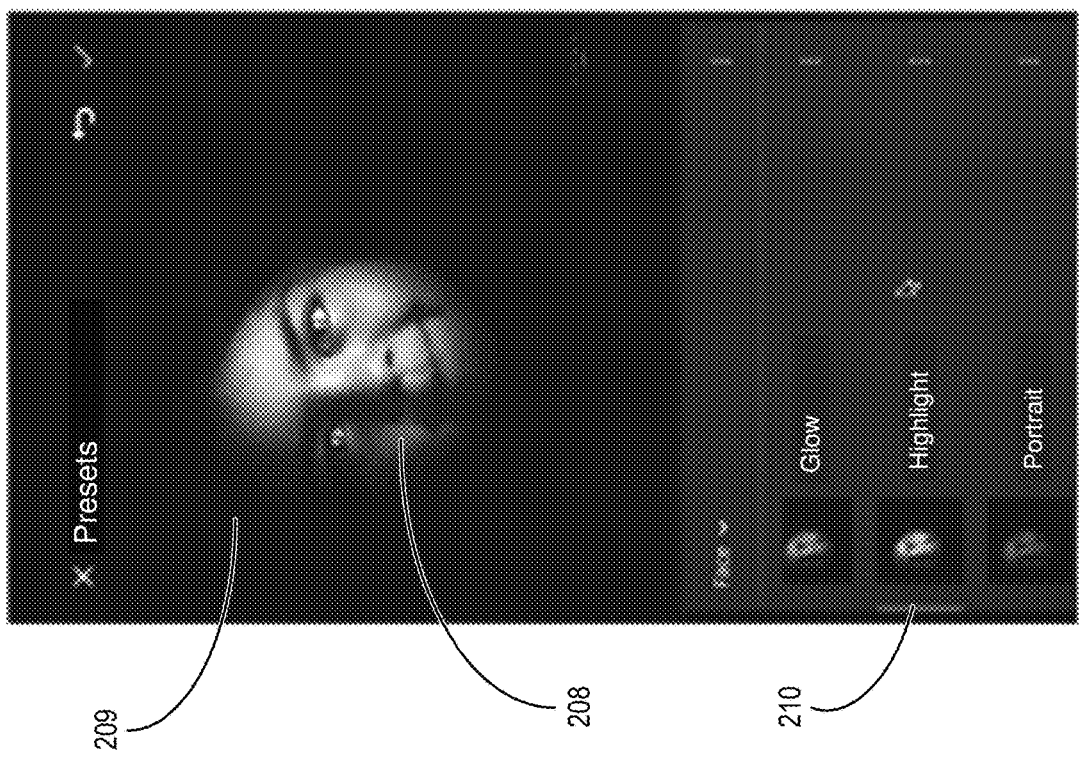
Figure 2C:
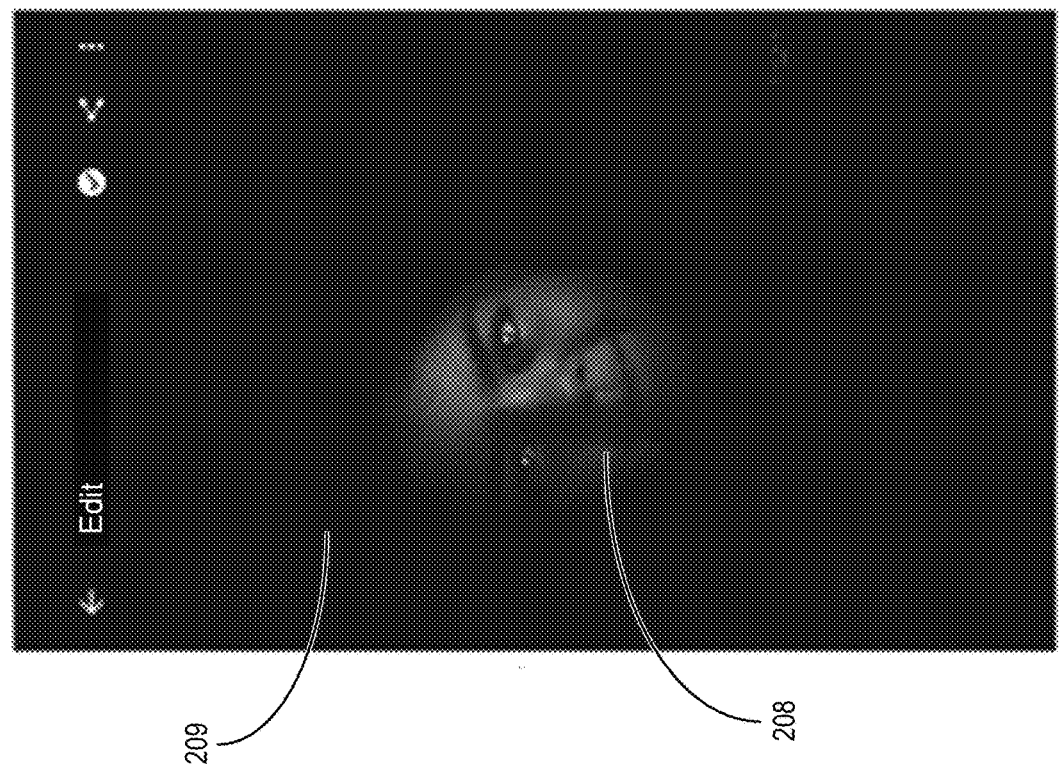

As shown in FIGS. 2C and 2D, the object-specific-preset-edit system 102 further applies the generated object-specific-preset edit to a target object 208 in a target digital image 209. As shown in FIG. 2C, the object-specific-preset-edit system 102 detects the target object 208 within the target digital image 209 and determines the target object 208 represents a same object type as the object 204 within the digital image 202, that is, a human face. Based on detecting a same object type—and to enable a quick and easy modification to the dark shading or coloring of the target object 208 in the target digital image 209 as shown in FIG. 2D—the object-specific-preset-edit system 102 provides a preset-edit option 210 (e.g., "highlight") associated with the previously generated object-specific-preset edit for the radial gradient 206. Based on a detected selection of the preset-edit option 210, the object-specific-preset-edit system 102 determines transformed-positioning parameters for applying the radial gradient 206 to the target object 208. As shown, the object-specific-preset-edit system 102 applies the radial gradient 206 to the target object 208 in FIG. 2D in the same manner that the radial gradient 206 was applied to the object 204 in FIG. 2B—even though the relative location of the target object 208 is not the same as the location of the object 204 with respect to the digital image 202.

Figure 2F:
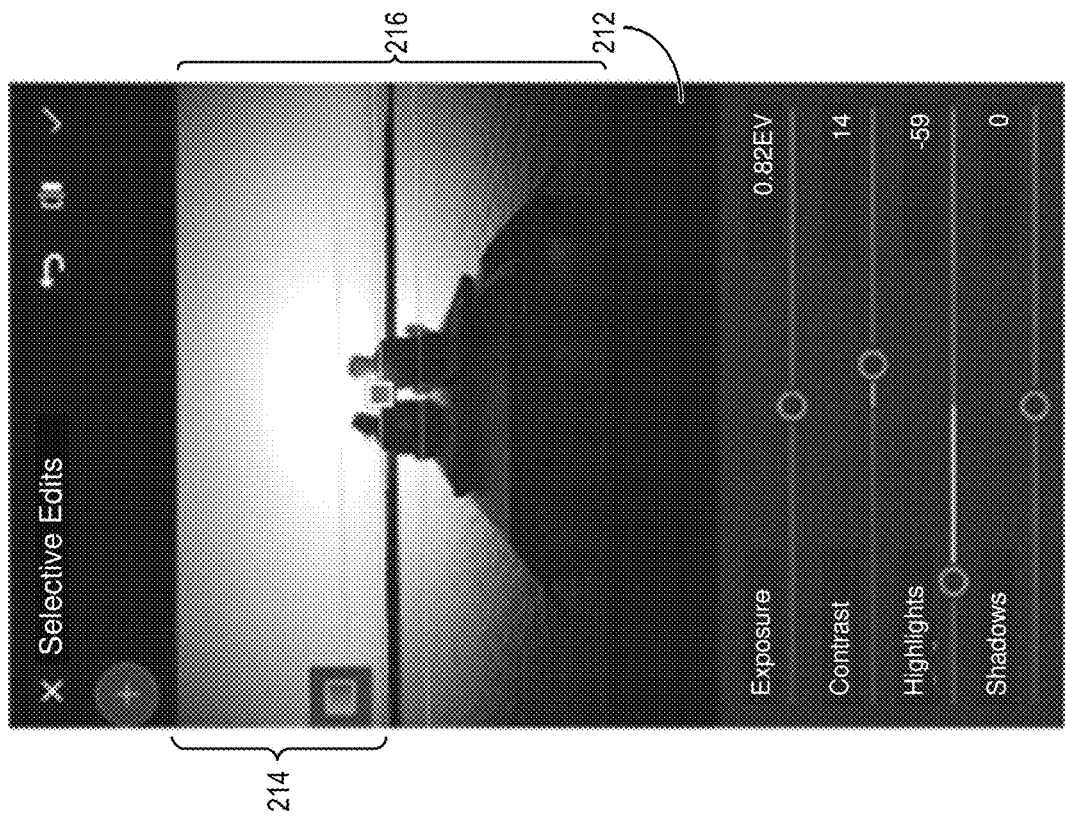
Figure 2E:
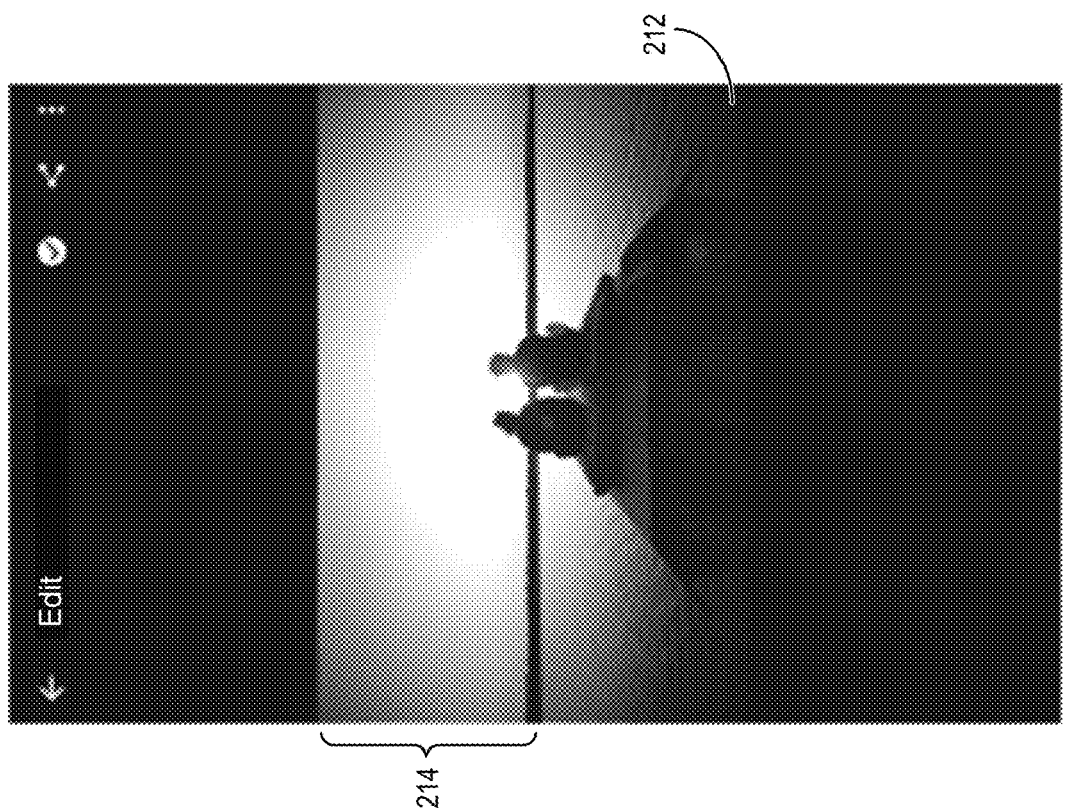

As shown in FIG. 2E, the object-specific-preset-edit system 102 can also provide a digital image 212 including an object 214 for further editing within a graphical user interface of a computing device. In this example, the object 214 is a sky region, but could be another object. As shown in FIG. 2F, based on detected interactions with one or more tools, the object-specific-preset-edit system 102 can apply a linear gradient 216 in connection with the object 214. Based on detecting a preset-generating trigger (e.g., user selection), the object-specific-preset-edit system 102 generates an object-specific-preset edit associated with the linear gradient 216 applied to the object 214.

To generate such an object-specific-preset edit, for example, the object-specific-preset-edit system 102 identifies the object 214 by determining a horizon of the sky region. The object-specific-preset-edit system 102 further determines a localized-edit region associated with the linear gradient 216 by determining a zero point (e.g., a beginning point) and a full point (e.g., an ending point) associated with the linear gradient 216. The object-specific-preset-edit system 102 generates an object-specific-preset edit for application on other digital images based on the linear gradient 216 applied to the object 214 within the digital image 202.

Figure 2H:
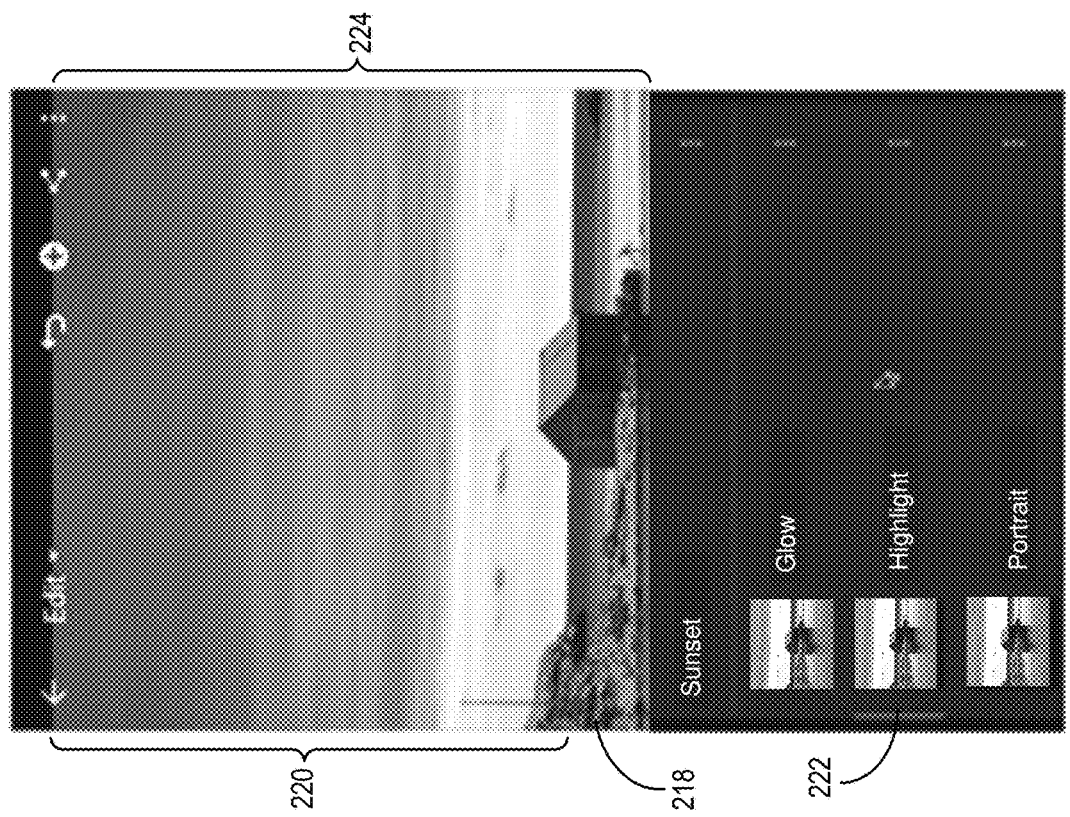
Figure 2G:
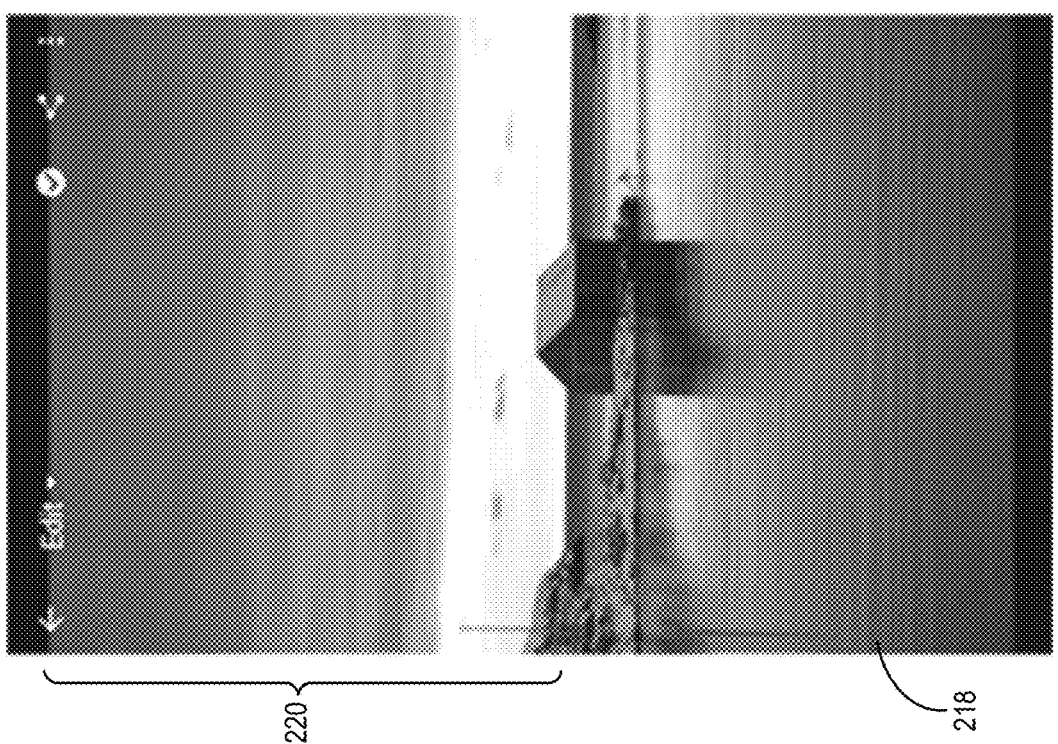

As shown in FIGS. 2G and 2H, the object-specific-preset-edit system 102 further applies the generated object-specific-preset edit to a target object 220 in a target digital image 218. As shown in FIG. 2G, the object-specific-preset-edit system 102 detects the target object 220 within the target digital image 218 and determines the target object 220 represents a same object type as the object 214 within the digital image 212, that is, a sky region. Based on detecting a same object type—and to enable a quick and easy modification to make the sky region shown in FIG. 2H more dramatic or follow a particular color pattern—the object-specific-preset-edit system 102 provides a preset-edit option 222 (e.g., "highlight") associated with the previously generated object-specific-preset edit for the linear gradient 216. Based on a detected selection of the preset-edit option 222, the object-specific-preset-edit system 102 determines transformed-positioning parameters for applying a linear gradient 224 to the target object 220. As shown in FIG. 2H, the object-specific-preset-edit system 102 applies the linear gradient 224 to the target object 220 in the same manner that the linear gradient 216 was applied to the object 214 in FIG. 2F, even though the target object 220 has different dimensions (e.g., a different horizon) within the target digital image 218 than the object 214 has within the digital image 212.

Figure 3A:
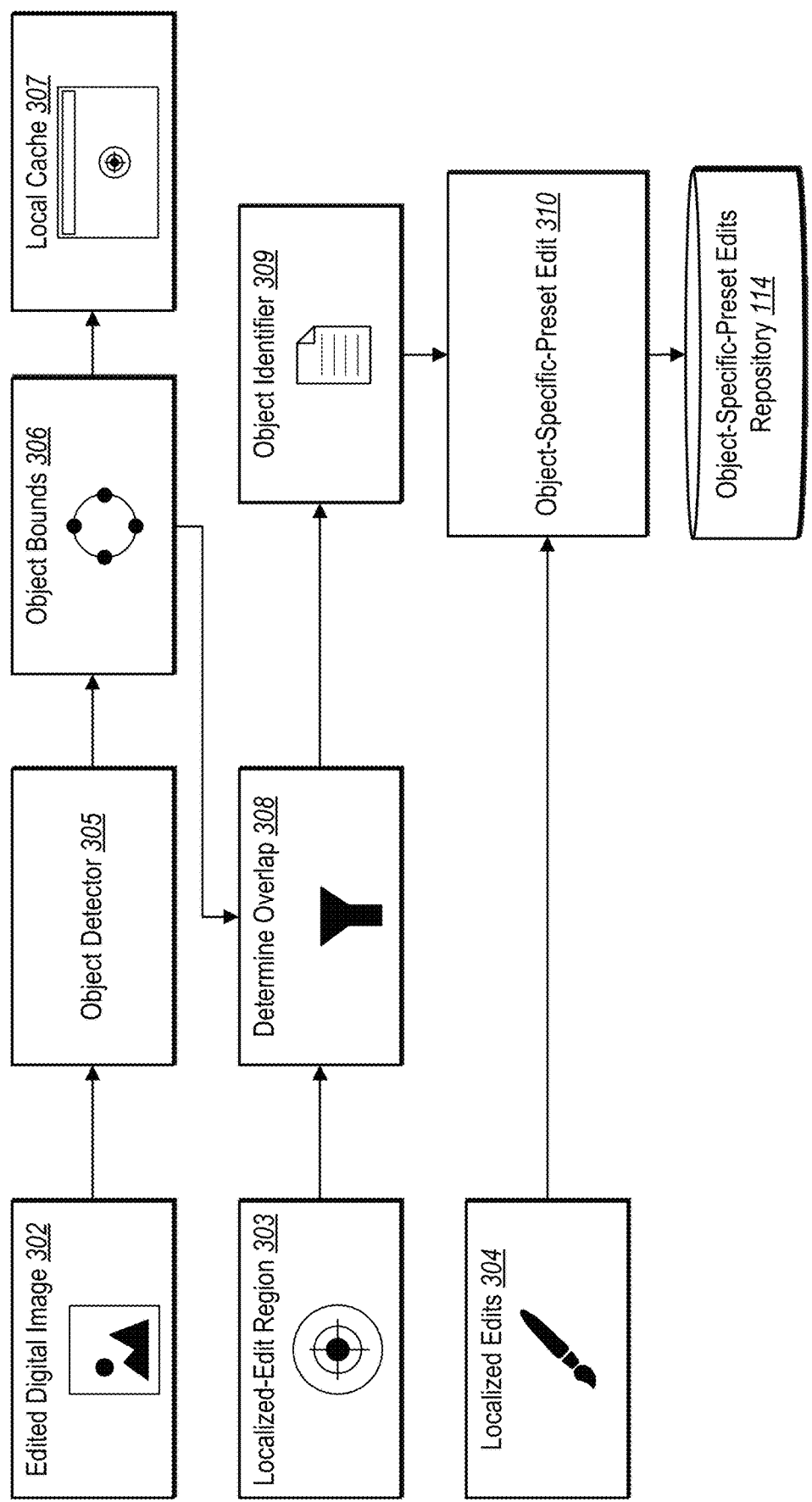
FIGS. 3A-3B illustrate schematic overviews of the object-specific-preset-edit system generating and applying object-specific-preset edits in accordance with one or more embodiments.
Figure 3B:
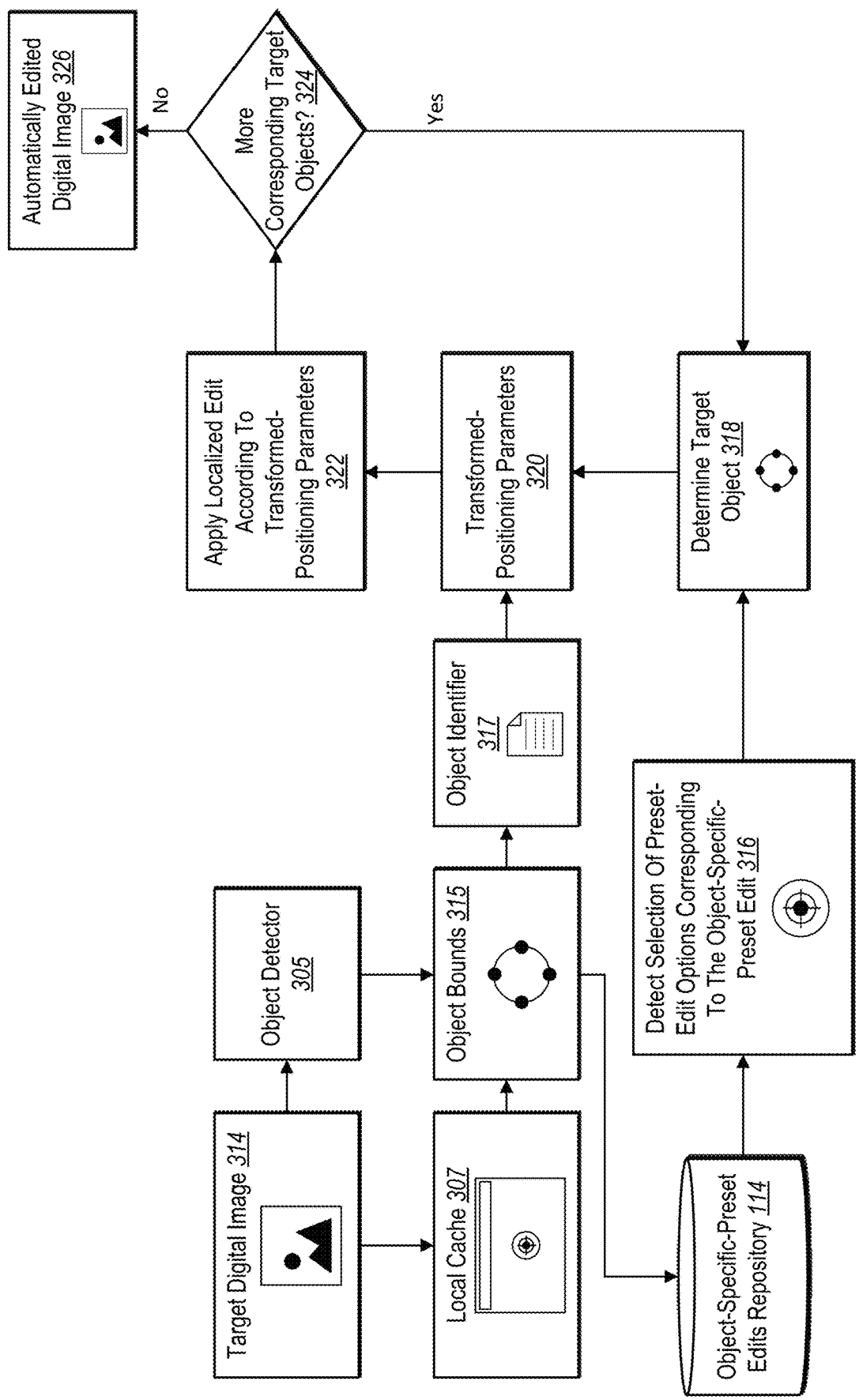

FIGS. 3A and 3B provide schematic overviews of the object-specific-preset-edit system 102 respectively generating and applying object-specific-preset edits. As discussed below, FIG. 3A illustrates an overview of the object-specific-preset-edit system 102 generating an object-specific-preset edit based on a localized-edit region associated with an object in an edited digital image. Additionally, and as discussed below, FIG. 3B illustrates an overview of the object-specific-preset-edit system 102 applying an object-specific-preset edit to a target object in a target digital image.

As shown in FIG. 3A, for example, the object-specific-preset-edit system 102 detects localized edits 304 within a localized-edit region 303 in an edited digital image 302. In one or more embodiments, the object-specific-preset-edit system 102 determines the localized-edit region 303 based on an area of pixels in the edited digital image 302 affected by the localized edits 304.

As further shown in FIG. 3A, in one or more embodiments, the object-specific-preset-edit system 102 identifies one or more objects in the edited digital image 302 utilizing an object detector 305. For example, the object detector 305 can be a machine-learning-detection model trained to determine object identifiers (e.g., an object identifier 309) and object bounds 306 (e.g., object bounding boxes, full point and zero point) for the objects in the edited digital image 302. To illustrate, the object-specific-preset-edit system 102 can apply the object detector 305 to the edited digital image 302 to determine object identifiers (e.g., object tags) and bounding boxes for objects including people, faces, animals, plants, furniture, toys, books, and so forth. In at least one embodiment, the object-specific-preset-edit system 102 applies the object detector 305 to determine a sky region in the edited digital image. As further shown in FIG. 3A, in one or more embodiments, the object-specific-preset-edit system 102 saves objects detected by the object detector 305 in local cache 307.

As indicated above, in one or more embodiments, the edited digital image 302 includes multiple objects. In this example, the localized-edit region 303 associated with the localized edits 304 is associated with one of the multiple objects in the edited digital image 302. Accordingly, the object-specific-preset-edit system 102 determines an edited object from the identified objects that corresponds to the localized-edit region 303 by performing an act 308 of determining an overlap between each of the objects identified in the edited digital image 302 and the localized-edit region 303. For example, the object-specific-preset-edit system 102 determines the overlap by iteratively determining an intersection over union (IoU) between each identified object in the edited digital image 302 and the localized-edit region 303. In at least one embodiment, the object-specific-preset-edit system 102 determines that the object with the highest (or maximum) degree of overlap with the localized-edit region 303 is the edited object in the edited digital image 302.

After identifying the edited object based on maximum overlap, in one or more embodiments, the object-specific-preset-edit system 102 generates an object-specific-preset edit 310 based on the identified edited object, the localized-edit region 303, and the localized edits 304. For example, the object-specific-preset-edit system 102 generates the object-specific-preset edit 310 by aggregating the object identifier 309 and object bounds 306 associated with the edited object along with the localized-edit region 303 and the localized edits 304 into a single preset or profile. To illustrate, the object-specific-preset-edit system 102 can aggregate all of this information into a digital-image-editing document. For example, the digital-image-editing document can be a customized preset XMP document. Alternatively, the digital-image-editing document can be a customized preset document in a different type of scripting language including, but not limited to: JavaScript, PHP, Python, Perl, or PowerShell. The object-specific-preset-edit system 102 further stores the generated object-specific-preset edit 310 in the object-specific-preset edits repository 114 to provide and apply to other digital images at a later point. In at least one embodiment, the object-specific-preset-edit system 102 stores the object-specific-preset edit 310 based on the object identifier 309 associated with the edited object.

As mentioned above, FIG. 3B illustrates an overview of the object-specific-preset-edit system 102 applying a previously generated object-specific-preset edit. For example, based on a request for preset edits in connection with a target digital image 314, the object-specific-preset-edit system 102 can provide one or more object-specific-preset edits that are specific to the target digital image 314. In one or more embodiments, the object-specific-preset-edit system 102 identifies object-specific-preset edits that are specific to the target digital image 314 by utilizing the object detector 305 to determine an object identifier 317 and object bounds 315 (e.g., bounding-box coordinates) for each of the one or more objects in the target digital image 314. In at least one embodiment, the object-specific-preset-edit system 102 stores the object identifier 317 and the object bounds 315 detected by the object detector 305 in the local cache 307.

As further shown in FIG. 3B, on one or more embodiments, the object-specific-preset-edit system 102 further identifies the object-specific-preset edits that are tailored to the target digital image 314. Specifically, the object-specific-preset-edit system 102 identifies these tailored object-specific-preset edits by identifying object-specific-preset edits in the object-specific-preset edits repository 114 that correspond with the object identifier 317 associated with the one or more objects in the target digital image 314. For example, the object-specific-preset-edit system 102 identifies one or more object-specific-preset edits that include and/or are stored according to preset object tags (e.g., object identifiers) that match or are related to the object identifier 317 associated with the one or more objects in the target digital image 314. To illustrate, if the object-specific-preset-edit system 102 determines that the target digital image 314 includes a human face, a dog face, and a tree, the object-specific-preset-edit system 102 can further identify object-specific-preset edits that are associated with preset object tags related to human faces, dog faces, and trees, such as radial gradients for highlights of the faces and brushing for the tree. The object-specific-preset-edit system 102 then provides, for display on a client device, preset-edit options corresponding to each such object-specific-preset edit.

After determining and providing preset-edit options for display, the object-specific-preset-edit system 102 performs an act 316 of detecting a selection of a preset-edit option corresponding to the object-specific-preset edit. Based on a detected user selection of one of the preset-edit options, the object-specific-preset-edit system 102 applies the object-specific-preset edit corresponding to the selected preset-edit option.

To apply the corresponding object-specific-preset edit, in one or more embodiments, the object-specific-preset-edit system 102 performs an act 318 of determining a target object in the target digital image 314. For example, the object-specific-preset-edit system 102 determines the target object by identifying the object in the target digital image 314 with an object tag or object identifier that corresponds with the preset object tag or object identifier indicated by the object-specific-preset edit being applied. To illustrate, based on determining that the object-specific-preset edit includes the preset object tag "face," the object-specific-preset-edit system 102 can determine that the target object in the target digital image 314 is the object associated with the object tag "face."

After determining the target object in the target digital image 314, the object-specific-preset-edit system 102 performs an act 320 of determining transformed-positioning parameters for applying a localized edit to the target object based on preset-positioning parameters for an edited object as specified by the object-specific-preset edit. For example, the preset-positioning parameters in the object-specific-preset edit indicate how the localized edit is applied to the edited object from which the object-specific-preset edit was generated. Accordingly, the object-specific-preset-edit system 102 can determine the transformed-positioning parameters by determining how to offset, scale, and reposition the preset-positioning parameters to accurately apply the same localized edit to the target object in the target digital image.

As further shown in FIG. 3B, after determining the transformed-positioning parameters, the object-specific-preset-edit system 102 performs the act 322 of applying the localized edit specified in the object-specific-preset edit to the target object according to the transformed-positioning parameters. For example, if the preset-localized edit is a radial gradient applied to a face within preset-positioning parameters—as specified by the object-specific-preset edit—the object-specific-preset-edit system 102 applies the same type of radial gradient to the target object (e.g., a different face) in the target digital image 314 according to the transformed-positioning parameters. Because the transformed-positioning parameters resize and reposition the radial gradient according to the location of the target object in the target digital image 314, the object-specific-preset-edit system 102 tailors the localized edit to the target object.

As noted above, in one or more embodiments, the target digital image 314 includes multiple target objects. Accordingly, the object-specific-preset-edit system 102 can iteratively determine additional target objects (e.g., multiple faces in the target digital image 314) and apply the preset-localized edit specified by the corresponding object-specific-preset edit to each additional target object. For example, the object-specific-preset-edit system 102 performs the act 324 of determining whether the target digital image 314 includes additional corresponding target objects by determining whether the target digital image 314 includes additional objects with object identifier 317 corresponding to the object identifier specified by the object-specific-preset edit. Based on determining the target digital image 314 includes additional corresponding objects (e.g., "Yes" in the act 324), the object-specific-preset-edit system 102 repeats the acts 318-322. Based on determining that there are no additional corresponding objects in the target digital image 314 (e.g., "No" in the act 324), the object-specific-preset-edit system 102 displays the automatically edited digital image 326 (e.g., via the image editing application 112).

Figure 4A:
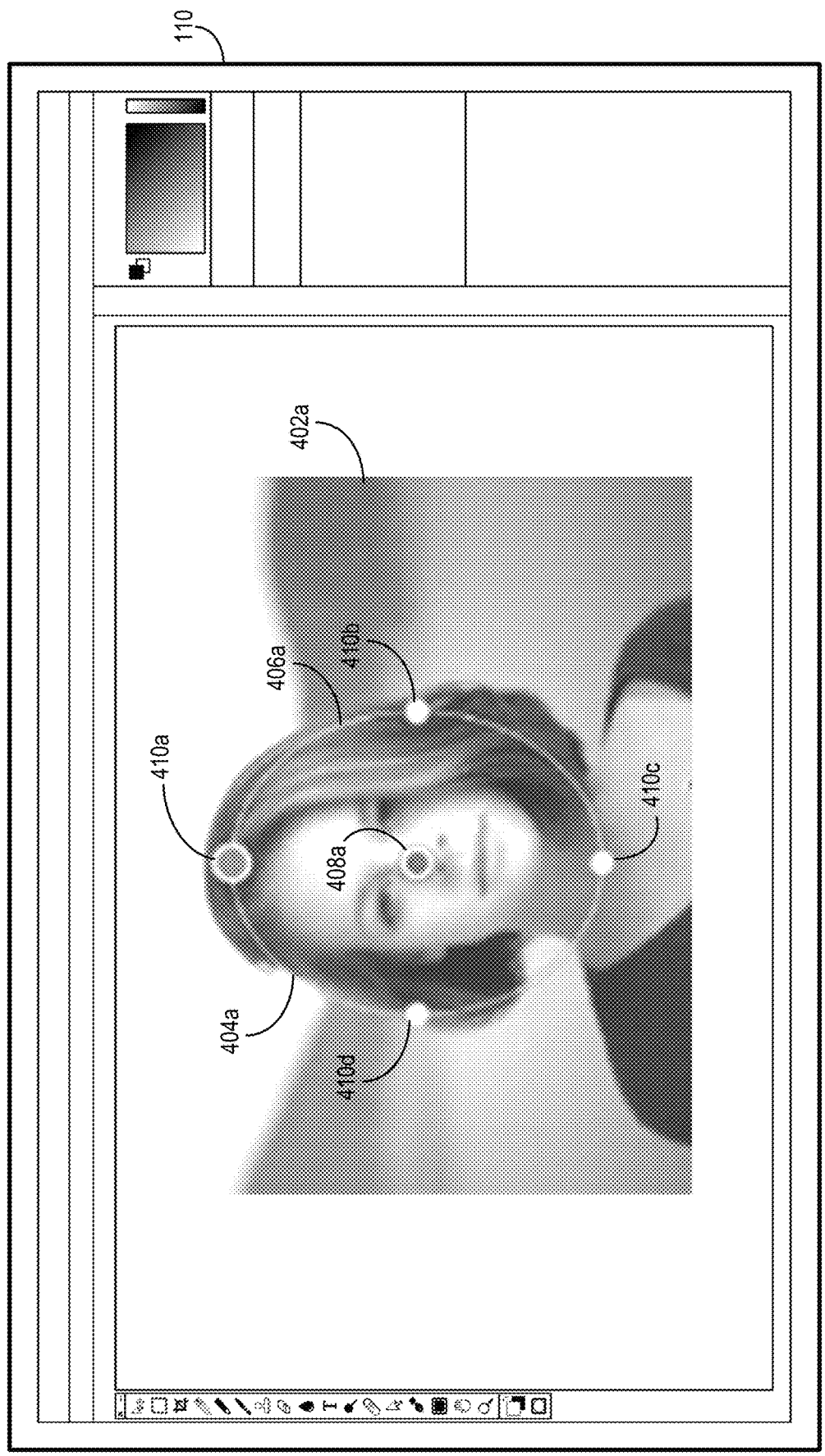
FIGS. 4A-4B illustrate overviews of a radial gradient and a linear gradient applied to digital images in accordance with one or more embodiments.
Figure 4B:
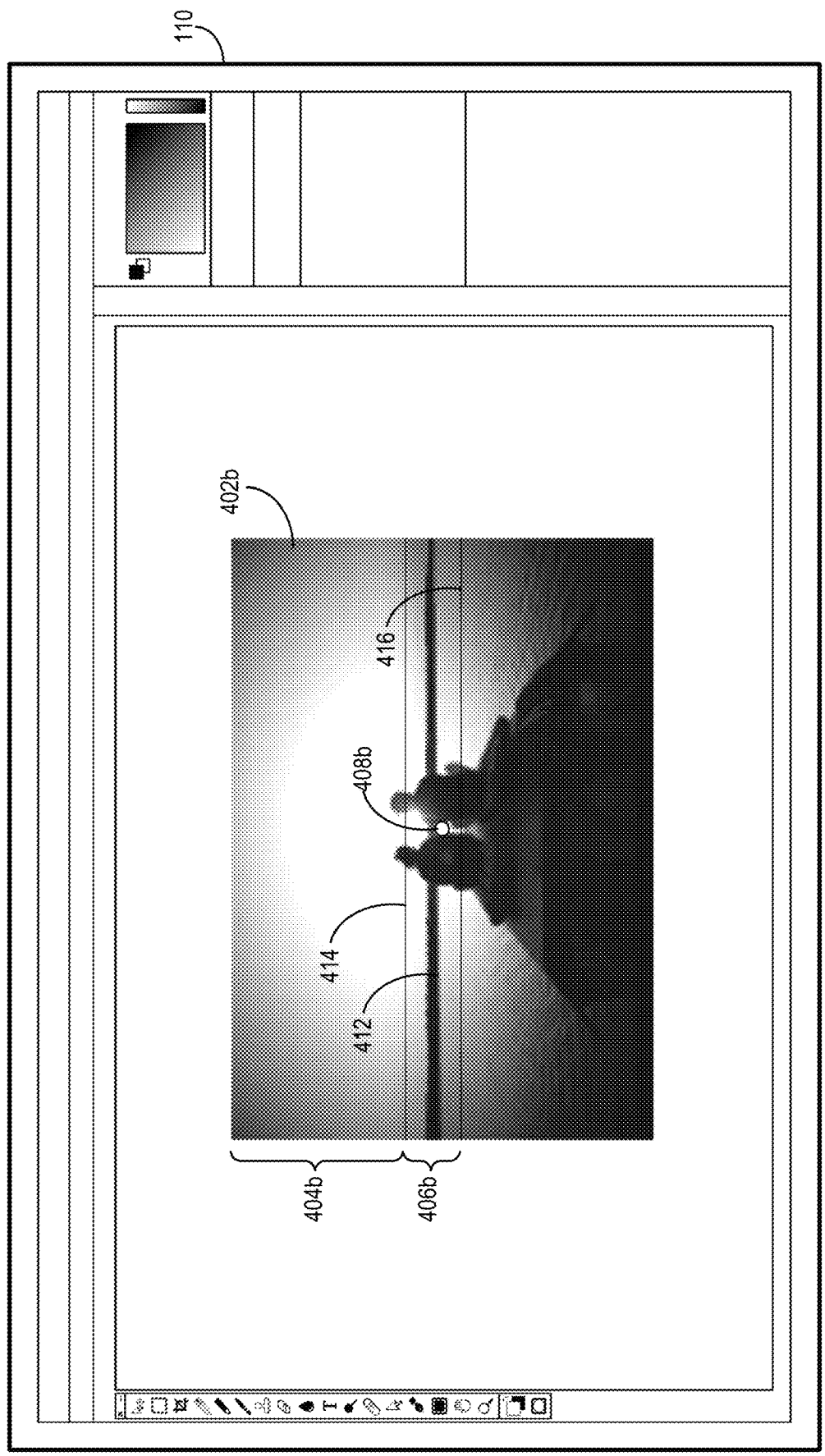

As discussed herein, the object-specific-preset-edit system 102 generates or applies object-specific-preset edits. In one or more embodiments, the object-specific-preset-edit system 102 generates and applies object-specific-preset gradients, such as preset radial gradients and preset linear gradients. FIGS. 4A and 4B illustrate additional overviews of these types of gradient edits in connection with objects in digital images. For example, FIG. 4A illustrates an overview of the client computing device 110 applying a radial gradient 406a to an object 404a (e.g., a human's face) in a digital image 402a (e.g., via the image editing application 112).

In one or more embodiments, as shown in FIG. 4A, the radial gradient 406a alters pixels in an underlying area such that one or more pixel characteristics (e.g., color, opacity, brightness, saturation) shade, transition, or fade from an initial value to a final value in a manner that radiates outward from a central point. To illustrate, the radial gradient 406a causes a brightness of underlying pixels to gradually darken from an initial or a center point 408a to ending points along a circle or oval indicated by ending points 410a, 410b, 410c, and 410d. For example, the client computing device 110 may apply the radial gradient 406a to the object 404a via the image editing application 112 based on a mouse-down event detected at the center point 408a and a mouse-release event detected at any point along the circle or oval indicated by the ending points 410a, 410b, 410c, and 410d. The overall effect is that the human's face in the digital image 402a appears brighter and more dramatic (e.g., in terms of contrast).

FIG. 4B illustrates an overview of the client computing device 110 applying a linear gradient 406b to an object 404b (e.g., a sky region above a horizon) in a digital image 402b (e.g., via the image editing application 112). In one or more embodiments, the linear gradient 406b alters pixels in an underlying linear area such that one or more pixel characteristics shade, transition, or fade from an initial value to a final value in a straight line from a starting point to an ending point. To illustrate, the linear gradient 406b causes a brightness of underlying pixels to increase from a zero point along a starting line 414 to a full point along an ending line 416. In some embodiments, the client computing device 110 applying displays a center line 412 and center point 408b to illustrate an angle of the linear gradient 406b. The client computing device 110 applying may apply the linear gradient 406b to the sky region and horizon via the image editing application 112 based on a mouse-down event detected along the starting line 414 and a mouse-release event detected along the ending line 416. The overall effect is that the sky region above the horizon in the digital image 402b appears more dramatic and beautiful.

FIGS. 5A-5F illustrate the object-specific-preset-edit system 102 generating an object-specific-preset edit specific to a radial gradient edit, which can also be called an object-specific-preset-radial gradient. For example, FIG. 5A includes an overview of the object-specific-preset-edit system 102 generating the object-specific-preset edit specific to a radial gradient edit in an edited digital image. In particular, the object-specific-preset-edit system 102 detects a selection of an option to generate an object-specific-preset edit and then detects an object in the edited digital image. The object-specific-preset-edit system 102 then determines an edited object of the detected objects that corresponds to a localized-edit region in the edited digital image. Finally, the object-specific-preset-edit system 102 generates the object-specific-preset edit based on the edited object and the localized edit—by storing, within a digital-image-editing document, instructions identifying an object type of the edited object and instructions for the localized edit.

Figure 5A:
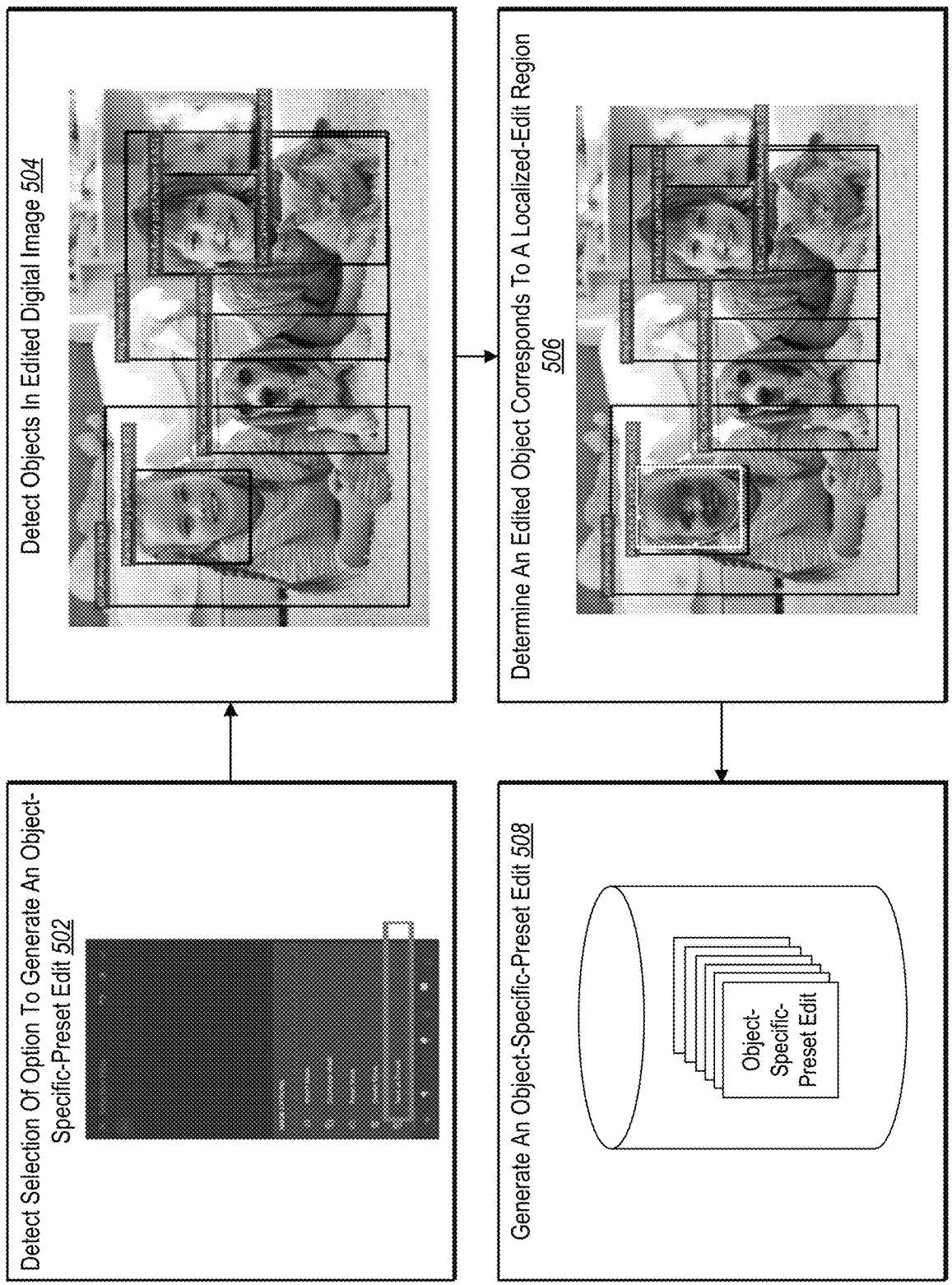
FIGS. 5A-5H illustrate the object-specific-preset-edit system generating an object-specific-preset edit for a radial gradient edit in accordance with one or more embodiments.

In more detail, and as shown in FIG. 5A, the object-specific-preset-edit system 102 performs an act 502 of detecting a selection of an option to generate an object-specific-preset edit. For example, the object-specific-preset-edit system 102 can detect the selection of the option to generate the object-specific-preset edit in connection with an edited digital image displayed within a graphical user interface of the image editing application 112. Specifically, the object-specific-preset-edit system 102 can selectively enable the option to generate the object-specific-preset edit based on detecting at least one localized edit applied to the edited digital image.

As further shown in FIG. 5A, the object-specific-preset-edit system 102 performs an act 504 of detecting objects in the edited digital image. For example, the object-specific-preset-edit system 102 can detect one or more objects in the edited digital image utilizing a machine-learning-detection model trained to identify objects in digital images. For example, the object-specific-preset-edit system 102 can detect one or more objects in the edited digital image utilizing a Faster-RCNN model (e.g., ResNet-101) trained to detect objects across multiple classes and categories. Additionally or alternatively, the object-specific-preset-edit system 102 can utilize a different neural network to detect one or more objects, such as ImageNet or DenseNet. Additionally or alternatively, the object-specific-preset-edit system 102 can utilize an algorithmic approach to detect one or more object such as the You Only Look Once (YOLO) algorithm. In one or more embodiments, the object-specific-preset-edit system 102 detects the one or more objects by generating object identifiers (e.g., object tags) and object positions/locations (e.g., object bounding boxes) within the edited digital image.

As further shown in FIG. 5A, the object-specific-preset-edit system 102 performs an act 506 of determining an edited object corresponds to a localized-edit region in the edited digital image. For example, the object-specific-preset-edit system 102 determines the edited object from the one or more detected objects in the edited digital image based on degrees of overlap between the bounding boxes for the detected objects and the localized-edit region (e.g., coordinates for the localized-edit region). In at least one embodiment, the object-specific-preset-edit system 102 determines that the edited object is the object in the edited digital image with a highest degree of overlap with the localized-edit region.

As further shown in FIG. 5A, the object-specific-preset-edit system 102 performs an act 508 of generating an object-specific-preset edit or, specifically, an object-specific-preset-radial gradient. For example, the object-specific-preset-edit system 102 generates the object-specific-preset edit by aggregating information associated with the edited object and the localized-edit region within a digital-image-editing document. In at least one embodiment, the object-specific-preset-edit system 102 generates the digital-image-editing document as an XMP document.

Figure 5C:
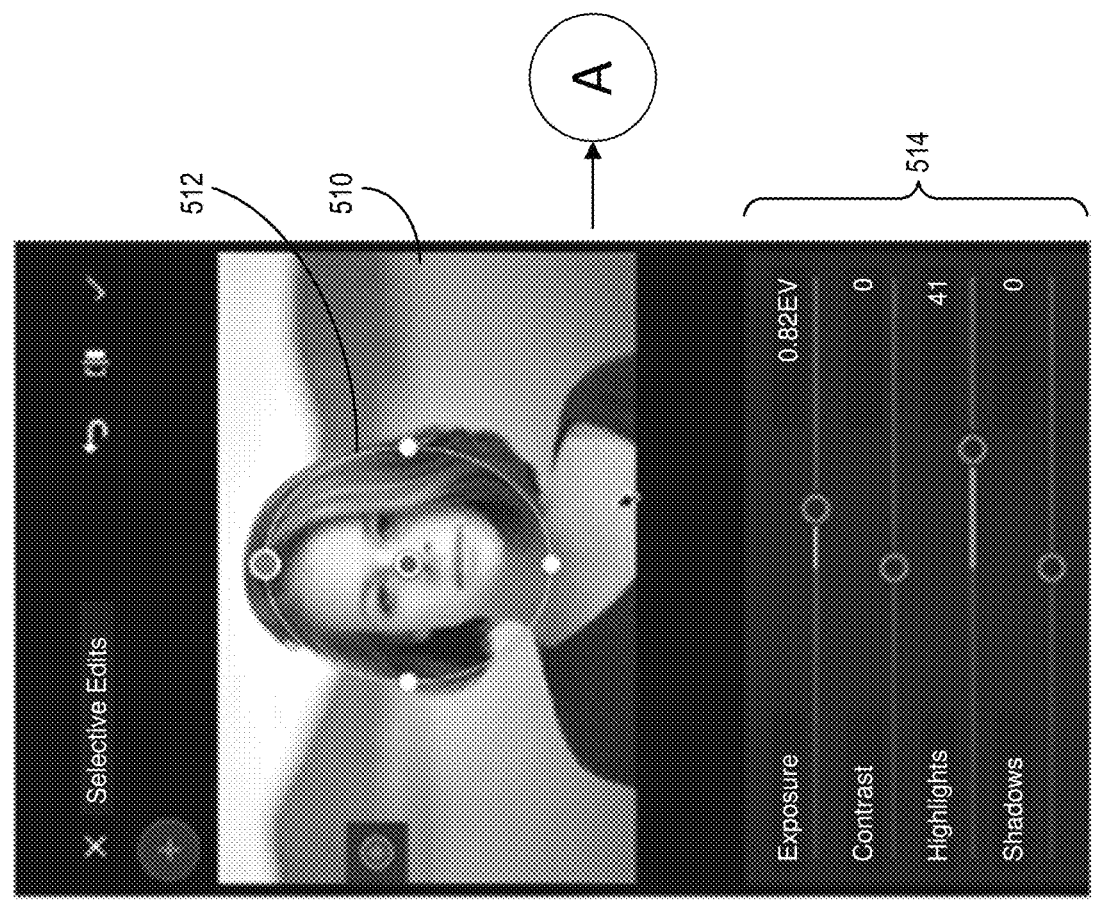
Figure 5B:
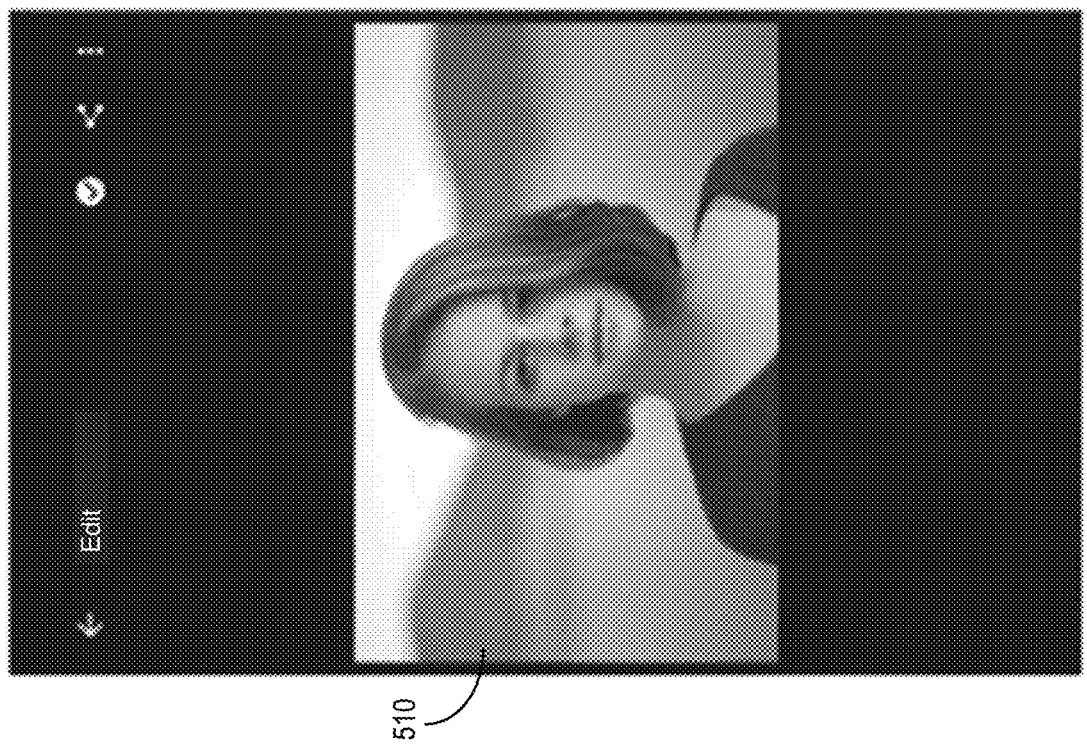
Figure 5D:
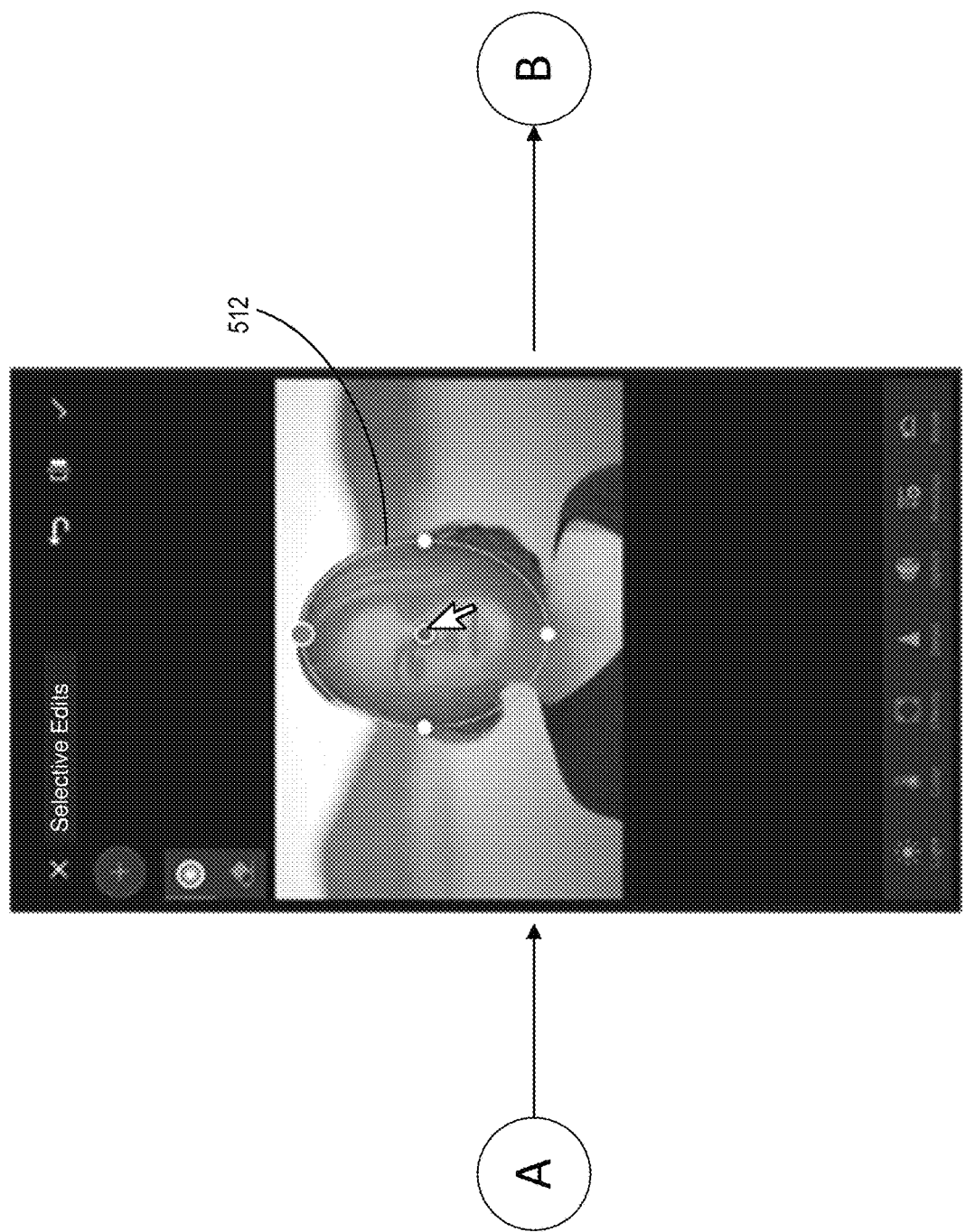

FIG. 5B-5D illustrate the object-specific-preset-edit system 102 providing a series of graphical user interfaces in connection with the image editing application 112. For example, as shown in FIG. 5B, the object-specific-preset-edit system 102 enables a user to apply edits to a digital image 510 including at least one object (e.g., a human's face). In FIG. 5C, and based on one or more user interactions, the object-specific-preset-edit system 102 applies the radial gradient 512 to the now-edited digital image 510. The object-specific-preset-edit system 102 enables further configuration of the radial gradient 512 via the tools in the radial gradient toolbox 514.

Next, in FIG. 5D, the object-specific-preset-edit system 102 detects a user selection of the radial gradient 512. For example, the object-specific-preset-edit system 102 detects a user selection of the center point of the radial gradient 512. Based on the detected selection of the radial gradient 512, the object-specific-preset-edit system 102 provides mask options list 516 as shown in FIG. 5E. Next, based on a detected selection of a save preset option 518 in the mask option list 516, the object-specific-preset-edit system 102 provides a title-input text box 520, as shown in FIG. 5F.

Figure 5F:
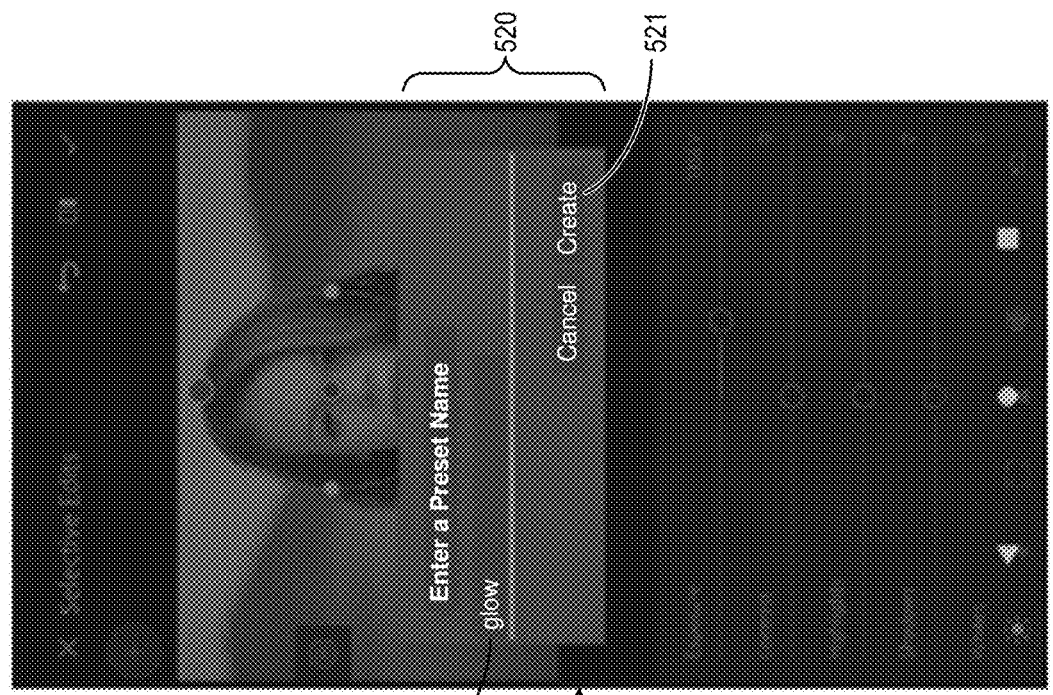
Figure 5E:
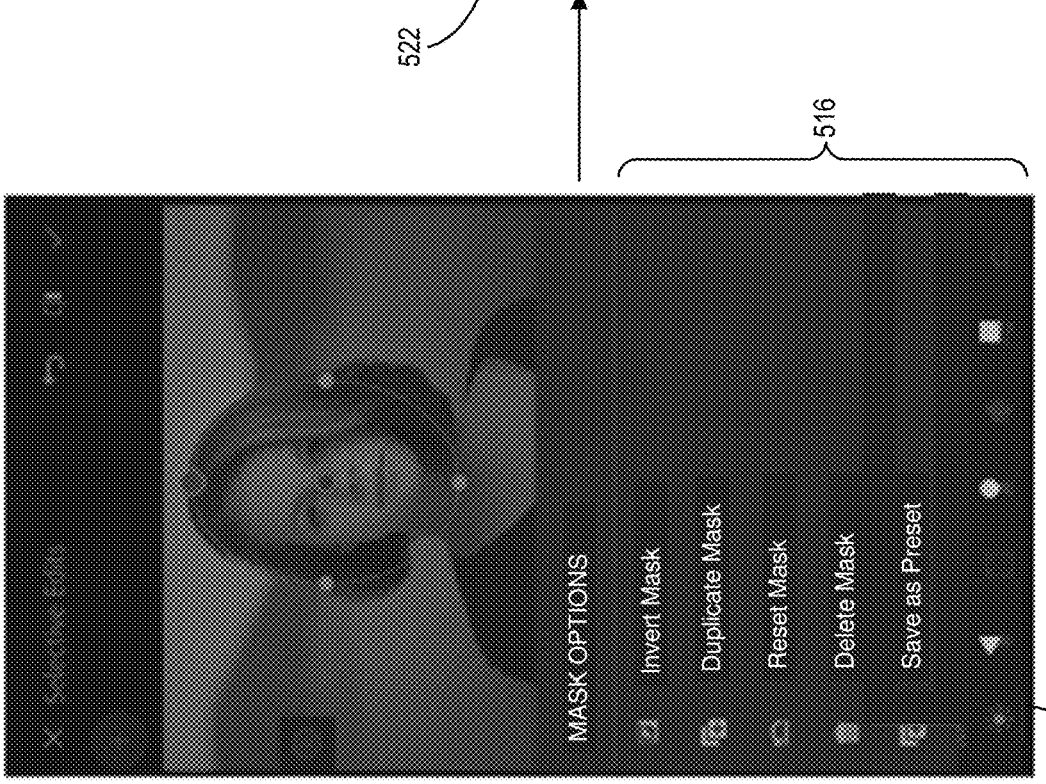

As further shown in FIG. 5F, in one or more embodiments, the object-specific-preset-edit system 102 detects a title 522 or "preset name" input by the user into the title-input text box 520 (e.g., "glow"). To illustrate, when generating the object-specific-preset edit associated with the radial gradient 512 in the edited digital image 510 (e.g., based on a detected selection of a create button 521, as shown in FIG. 5F), the object-specific-preset-edit system 102 aggregates the user-input title, "glow," within the digital-image-editing document for the object-specific-preset edit along with information associated with the radial gradient 512 and the edited object (e.g., the human's face) within the edited digital image 510.

Figure 5G:
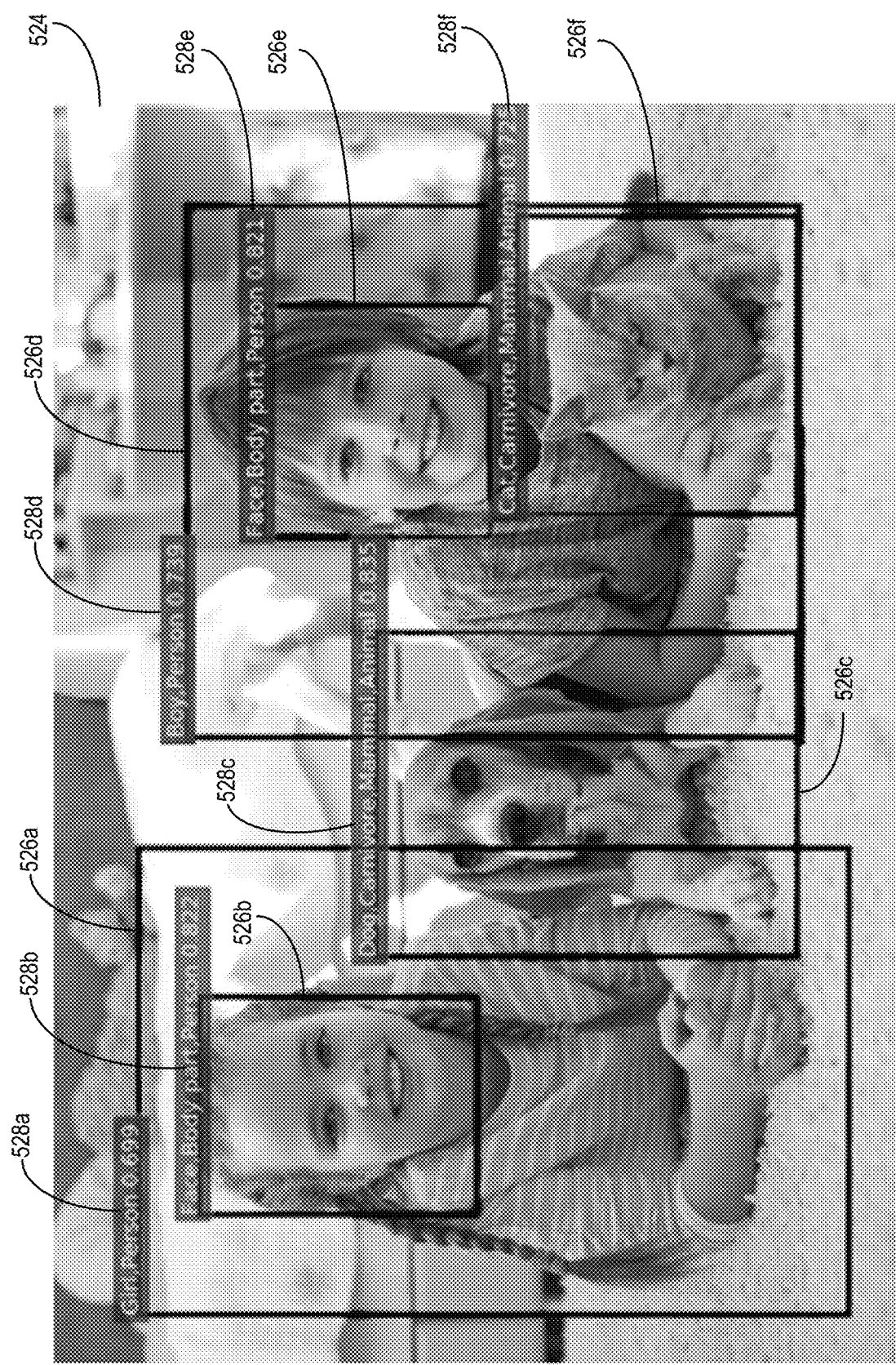
Figure 5H:
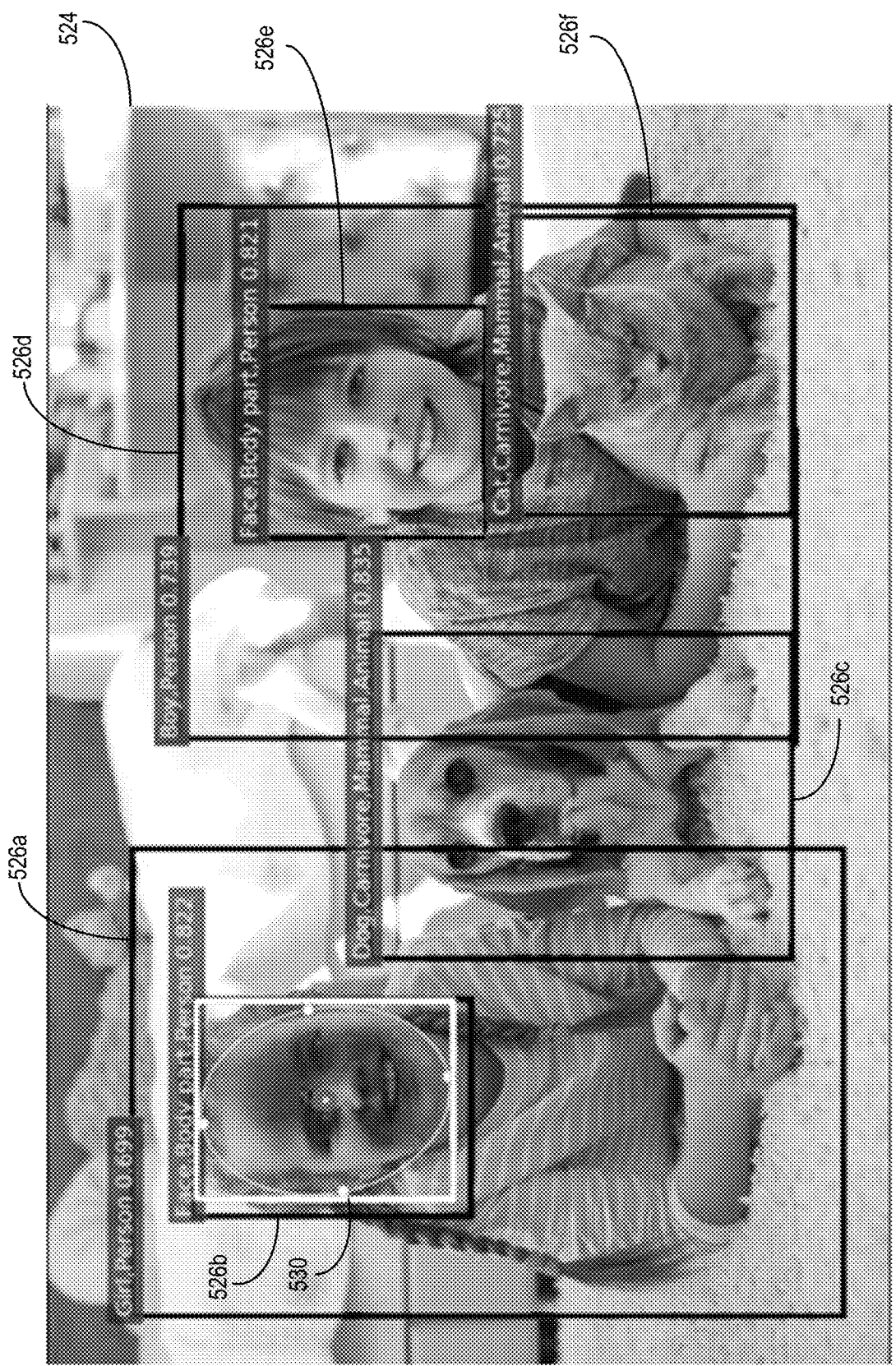

FIGS. 5G and 5H illustrate the object-specific-preset-edit system 102 determining an edited object corresponding to a localized-edit region from a set of objects in an edited digital image. For example, as shown in FIG. 5G, an edited digital image 524 can include multiple objects (e.g., a boy, a boy's face, a girl, a girl's face, a cat, a dog). In one or more embodiments, and based on a detected user-selection of an option to generate an object-specific-preset edit associated with the edited digital image 524, the object-specific-preset-edit system 102 utilizes a machine-learning-detection model to determine the one or more objects in the edited digital image 524. For example, the object-specific-preset-edit system 102 can utilize a Faster-RCNN model, such as ResNet-101, or other neural network or non-neural network approaches to determine objects in the edited digital image 524.

As indicated by FIG. 5G, the object-specific-preset-edit system 102 generates an input vector associated with the edited digital image 524 and provides the generated input vector to a trained machine-learning-detection model. In one or more embodiments, the trained machine-learning-detection model outputs bounding boxes 526a, 526b, 526c, 526d, 526e, and 526f, and object tags 528a, 528b, 528c, 528d, 528e, and 528f.

In at least one embodiment, the trained machine-learning-detection model outputs the bounding boxes 526a-526f as a list of coordinates, where each bounding box is represented by a left coordinate, a top coordinate, a right coordinate, and a bottom coordinate. For example, the trained machine-learning-detection model outputs the left coordinate as an x-coordinate of the left side of a bounding box, the top coordinate as the y-coordinate of the top side of the bounding box, the right coordinate as the x-coordinate of the right side of the bounding box, and the bottom coordinate as the y-coordinate of the bottom side of the bounding box. Accordingly, the trained machine-learning-detection model outputs the bounding boxes 526a-526f as an ordered list of coordinates, where each bounding box is represented by four ordered coordinates (e.g., a left coordinate, a top coordinate, a right coordinate, and a bottom coordinate).

As further shown in FIG. 5G, the trained machine-learning-detection model also outputs the object tags 528a-528f associated with each object. For example, the trained machine-learning-detection model determines an object tag including one or more descriptors associated with an underlying object. Additionally, in at least one embodiment, the trained machine-learning-detection model further includes a confidence score along with the descriptors in each object tag, as shown in FIG. 5G alongside each object identifier.

In order for the object-specific-preset-edit system 102 to generate an object-specific-preset edit associated with the edited digital image 524, the object-specific-preset-edit system 102 determines which of the objects in the edited digital image 524 is an edited object. In one or more embodiments, as illustrated in FIG. 5H, the object-specific-preset-edit system 102 determines which of the objects indicated by the bounding boxes 526a-526f is associated with the edited object based on a correspondence between the bounding boxes 526a-526f and a localized-edit region 530. For example, the object-specific-preset-edit system 102 identifies the localized-edit region 530 as a set of coordinates (e.g., a left coordinate, a top coordinate, a right coordinate, and a bottom coordinate) outlining an area of pixels affected by a localized edit (e.g., a radial gradient).

To determine which of the bounding boxes 526a-526f represents the edited object, the object-specific-preset-edit system 102 determines a degree of overlap between each of the bounding boxes 526a-526f and the localized-edit region 530. In at least one embodiment, the object-specific-preset-edit system 102 determines the degree of overlap between a bounding box and the localized-edit region 530 by determining an Intersection over Union (IoU) value based on an area of the bounding box and an area of the localized-edit region 530. To illustrate, the object-specific-preset-edit system 102 determines an IoU value for the bounding box 526a and the localized-edit region 530 by determining an area of overlap between the bounding box 526a and the localized-edit region 530, divided by an area of union of the bounding box 526a and the localized-edit region 530. According, as shown in FIG. 5H, the object-specific-preset-edit system 102 determines the IoU value associated with the bounding box 526a and the localized-edit region 530 as the area of the localized-edit region 530 divided by the total area of the bounding box 526a added to the area of the localized-edit region 530.

In one or more embodiments, the object-specific-preset-edit system 102 determines an IoU value between each of the remaining bounding boxes 526b-526f and the localized-edit region 530. In the event that there is no overlap between a bounding box and the localized-edit region 530 (e.g., as with the bounding boxes 526c-526f), the object-specific-preset-edit system 102 can assign a zero to the IoU value for that bounding box.

After determining IoU values associated with each of the bounding boxes 526a-526f, the object-specific-preset-edit system 102 compares the IoU values to identify the highest IoU value. As shown in FIG. 5H, the object-specific-preset-edit system 102 would identify the IoU value associated with the bounding box 526b as the highest IoU value because the area of overlap between the bounding box 526b and the localized-edit region 530 is almost the entire area of the bounding box 526b, and the area of union between the bounding box 526b and the localized-edit region 530 is smaller than the area of union between the bounding box 526a and the localized-edit region 530. Based on determining that the IoU value associated with the bounding box 526b is the highest IoU value, the object-specific-preset-edit system 102 determines that the object indicated by the bounding box 526b is the edited object.

After determining the edited object corresponds to the localized-edit region 530, along with other edit information associated with the radial gradient in the localized-edit region 530, the object-specific-preset-edit system 102 generates an object-specific-preset edit associated with the radial gradient applied to the edited object. In one or more embodiments, the object-specific-preset-edit system 102 generates the object-specific-preset edit by aggregating information related to the edited object, the radial gradient, and the localized-edit region 530 into a digital-image-editing document. In at least one embodiment, as discussed in great detail below, the object-specific-preset-edit system 102 generates the digital-image-editing document as an XMP document.

As shown in Table 1 below, for example, the object-specific-preset-edit system 102 generates an XMP document including information about the localized edit (e.g., the radial gradient described in the "rdf:Description" field), the localized-edit region (e.g., the parameters listed in the "rdf:li" field) and the edited object (e.g., as described in the "crs:CorrectionSubject" field). More specifically, as shown in Table 1, the "crs:CorrectionSubject" field includes information associated with the edited object including the object identifier and/or tag (e.g., "face"), and the bounding box for the edited object (e.g., indicated by the coordinates "crs: Top='0.184059' crs: Left='0.116094' crs: Bottom='0.497803' crs: Right='0.29087'").

TABLE 1

```
<crs:CircularGradientBasedCorrections>
    <rdf:Seq>
        <rdf:li>
            <rdf:Description crs: What="Correction" crs: CorrectionAmount="1 . 000000" crs:
CorrectionActive="true" crs : LocalExposure="0. 000000" crs: LocalHue="0 .000000" crs:
LocalSaturation="0.000000" crs : LocalContrast="0 .000000" crs : LocalClarity="0 .000000"
crs: LocalSharpness="0.000000" crs: LocalBrightness="0 . 000000" crs : LocalToningHue="0
. 000000" crs : LocalToningSaturation="0 . 000000" crs : LocalExposure2012="0 .100000"
crs: LocalContrast2012="0 . 000000" crs: LocalHighlights2012="0 . 000000" crs:
LocalShadows2012="0 . 000000" crs : LocalWhites2012="0 . 000000" crs:
LocalBlacks2012="0 . 000000" crs : LocalClarity2012=" -0 . 303464" crs : LocalDehaze="0 .
000000" crs : LocalLuminanceNoi.se="0 . 291430" crs : LocalMoire="0 .000000" crs :
LocalDefringe="0 .000000" crs: LocalTemperature="0 .000000" crs: LocalTint="0 .000000"
crs : LocalTexture="0 .000000">
                <crs:CorrectionMasks>
                    <rdf:Seq>
                        <rdf:li crs: What="Mask/ CircularGradient" crs: MaskValue="1. 000000" crs:
Top="0 .199336" crs : Left="0 .130003" crs : Bottom= "0 .465629" crs: Right="0 . 295235"
crs: Angle=" -5. 363808" crs: Midpoint="+50" crs: Roundness="0" crs : Feather=" +36" crs :
Flipped="true" crs:Version="+2" />
                    </rdf:Seq>
                </crs:CorrectionMasks>
                <crs:CorrectionRangeMask crs :Version="+2" crs :Type="0" crs :ColorAmount="0 .
500000" crs : LumMin="0 .000000" crs : LumMax="1 .000000"
crs : LumFeather="0 . 500000" crs : DepthMin="0 .000000" crs : DepthMax="1. 000000" crs
:DepthFeather="0 . 500000" />
                <crs:CorrectionSubject crs: Name="face" crs: Top="0 . 184059" crs: Left="0
.116094" crs: Bottom="0 . 497803" crs: Right="0 . 29087", crs: Confidence="0 . 822" />
            </rdf: Description>
        </rdf:li>
    </rdf:Seq>
</crs:CircularGradientBasedCorrections>
```

As mentioned above, the object-specific-preset-edit system 102 further organizes and filters a generated object-specific-preset edit based on automatically determined edited object identifiers and user provided titles. For example, as shown in Table 2 below, the object-specific-preset-edit system 102 can add additional information to the digital-image-editing document represented by the XMP document shown in Table 1 that includes an automatically generated category (e.g., "Auto-face" in the <crs: Group> field), and the user provided title (e.g., "Glow" in the <crs:Name> field).

TABLE 2

```
<crs: Name>
    <rdf:Alt>
        <rdf:li xml:lang="x- default">Glow</rdf:li.>
    </rdf:Alt>
```

TABLE 2-continued

```
      </crs: Name>
      <crs:ShortName>
        <rdf:Alt>
          <rdf:li xml:lang="x- default"/>
        </rdf: Alt>
      </crs:ShortName>
      <crs:Group>
        <rdf:Alt>
          <rdf:li xml:lang="x-default">Auto – face</rdf:li>
        </rdf:Alt>
      </crs:Group>
      <crs:Description>
        <rdf:Alt>
          <rdf:li xml:lang="x-default" />
        </rdf:Alt>
      </crs:Description>
```

FIGS. 6A-6D illustrate the object-specific-preset-edit system 102 generating an object-specific-preset edit associated with a linear gradient, which can also be called an object-specific-preset-linear gradient. As discussed above, the object-specific-preset-edit system 102 generates an object-specific-preset gradient associated with a linear gradient based on a detected edited object in an edited digital image. In one or more embodiments, linear gradients are frequently applied to sky regions in digital images to make sunrises, sunsets, cloud formations, etc. more dramatic. Accordingly, in certain embodiments, the object-specific-preset-edit system 102 utilizes additional or different detection in connection with digital images including sky regions.

Figure 6A:
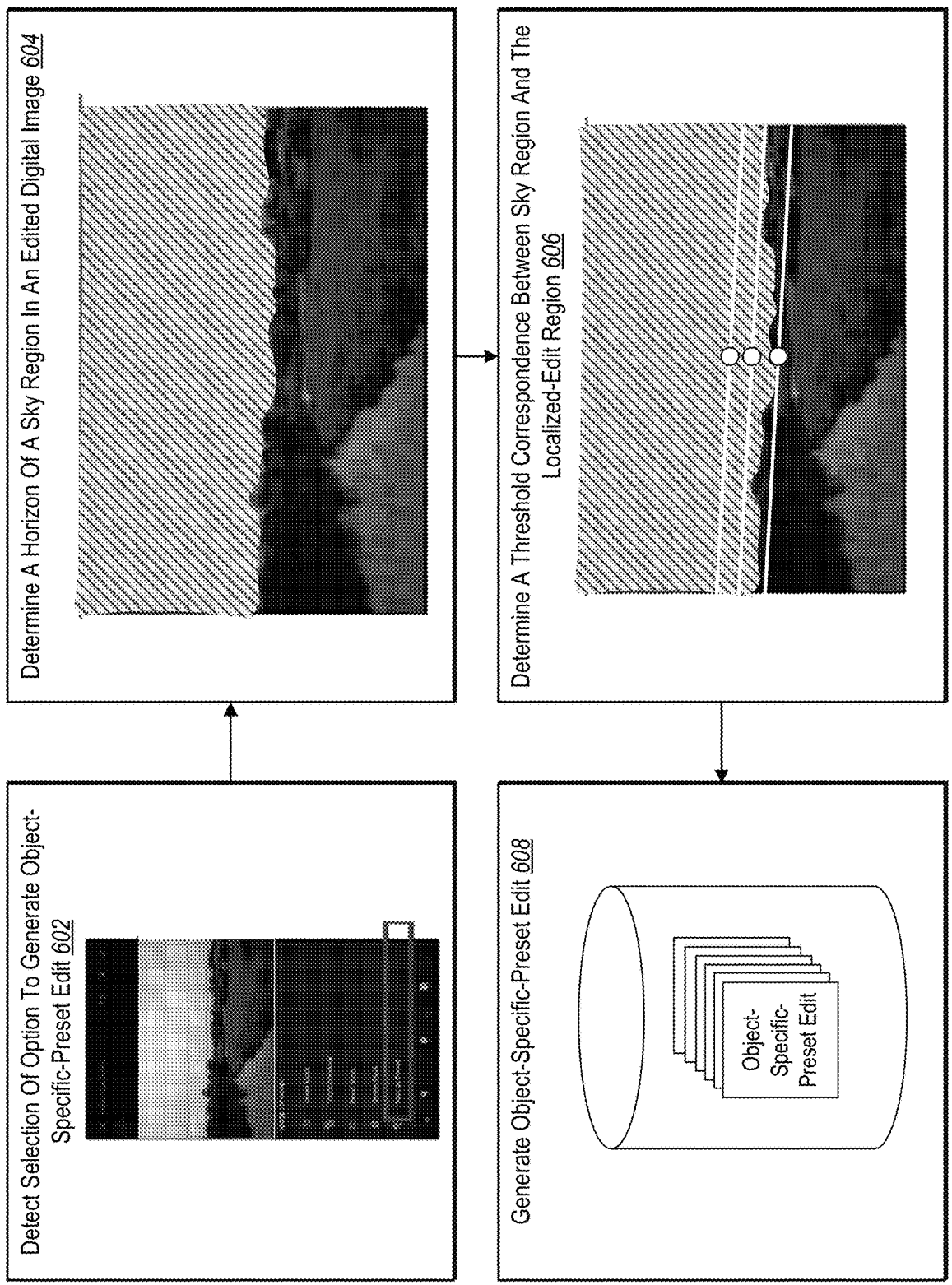
FIGS. 6A-6D illustrate the object-specific-preset-edit system generating an object-specific-preset edit associated with a linear gradient in accordance with one or more embodiments.

FIG. 6A illustrates an overview of the object-specific-preset-edit system 102 generating an object-specific-preset edit in connection with a linear gradient applied to a sky region in an edited digital image. For example, the object-specific-preset-edit system 102 detects a selection of an option to generate an object-specific-preset edit, then determines a horizon of a sky region in an edited digital image. The object-specific-preset-edit system 102 then determines a threshold correspondence between the sky region and the localized-edit region to generate an object-specific-preset edit associated with the sky region and the localized edit in the edited digital image. Finally, the object-specific-preset-edit system 102 generates the object-specific-preset edit based on the edited sky region and the localized edit—by storing, within a digital-image-editing document, instructions identifying a sky region as an object type and instructions for the localized edit.

In more detail, and as shown in FIG. 6A, the object-specific-preset-edit system 102 performs an act 602 of detecting a selection of an option to generate an object-specific-preset edit. As with the act 502 discussed above with regard to FIG. 5A, the object-specific-preset-edit system 102 can detect the selection of the option to generate the object-specific-preset edit in connection with an edited digital image within a graphical user interface of the image editing application 112.

As further shown in FIG. 6A, the object-specific-preset-edit system 102 performs an act 604 of determining a horizon of a sky region in an edited digital image. For example, in some embodiments, the object-specific-preset-edit system 102 utilizes one or more machine learning models to segment the edited digital image into a sky region and a non-sky region. The object-specific-preset-edit system 102 further determines a horizon associated with the sky region by performing a linear regression on boundary points between the sky region and the non-sky region.

As further shown in FIG. 6A, the object-specific-preset-edit system 102 performs an act 606 of determining a threshold correspondence between the sky region in the edited digital image and a localized-edit region in the edited digital image. For example, the object-specific-preset-edit system 102 determines a threshold correspondence between the sky region and localized-edit region associated with a linear gradient when the localized-edit region overlaps the sky region by at least a threshold percentage. To illustrate, the object-specific-preset-edit system 102 can determine that the sky region satisfies or exceeds a threshold correspondence between the sky region and the localized-edit region associated with the linear gradient when at least 50% of the linear gradient overlaps the sky region in the edited digital image.

As further shown in FIG. 6A, the object-specific-preset-edit system 102 performs an act 608 of generating an object-specific-preset edit or, specifically, an object-specific-preset-linear gradient. For example, the object-specific-preset-edit system 102 generates the object-specific-preset edit by aggregating information associated with the sky region (e.g., the horizon of the sky region) and the localized-edit region within a digital-image-editing document. As in the act 508 discussed above with regard to FIG. 5A, in some embodiments, the object-specific-preset-edit system 102 generates the digital-image-editing document as an XMP document.

Figure 6C:
Figure 6B:
Figure 6D:
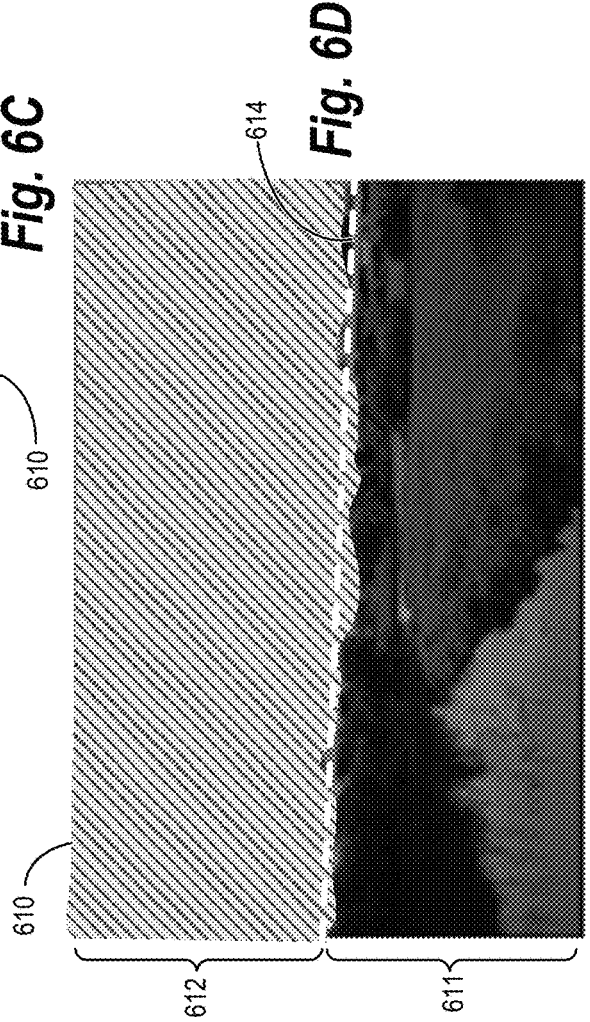

FIGS. 6B-6D illustrate the object-specific-preset-edit system 102 determining a horizon of a sky region in a digital image. For example, as shown in FIG. 6B, the digital image 610 includes a sky region 612 and a non-sky region 611. To determine a horizon demarcating a line between the sky region 612 and the non-sky region 611, in some embodiments, the object-specific-preset-edit system 102 utilizes a convolutional neural network (CNN) trained for scene classification to generate a weighted average mask of the sky region 612 (e.g., indicated by the patterned area illustrated in FIG. 6C). In at least one embodiment, the object-specific-preset-edit system 102 further refines the weighted average mask of the sky region 612 utilizing a conditional random field (CRF) to obtain a probability map for the sky region 612 and the non-sky region 611. In additional or alternative embodiments, the object-specific-edit system 102 utilizes visual semantics to segment the sky region 612 from the non-sky region 611. For example, the object-specific-edit system 102 can utilize a fully convolutional neural network trained for scene parsing to determine the sky region 612. In particular, the object-specific-edit system 102 can use the neural network and visual semantics for sky segmentation as described by Tsai, Y., Shen, X., Lin, Z., Sunkavalli, K., Yang, M., *Sky is Not the Limit: Semantic-Aware Sky Replacement*, ACM Transactions on Graphics (2016), the entire contents of which is hereby incorporated by reference.

After determining the sky region 612, as indicated by the patterned area as shown in FIG. 6C, the object-specific-preset-edit system 102 further determines the horizon associated with the sky region 612 by determining the boundary points between the sky region 612 and the non-sky region 611. For example, the object-specific-preset-edit system 102 determines the boundary points as coordinates within the digital image 610 where the sky region 612 (e.g., indicated by the patterned area) meets the non-sky region 611.

After determining the boundary point coordinates, the object-specific-preset-edit system 102 applies a linear regression to the boundary point coordinates to determine the horizon 614, as shown in FIG. 6D. In one or more embodiments, the object-specific-preset-edit system 102 applies the linear regression to fit the horizon 614 to the determined boundary points. After determining the horizon 614, in one or more embodiments, the object-specific-preset-edit system 102 generates digital-image-editing document for a localized-edit region in connection with the determined horizon 614 including information associated with the localized edit in the localized edit region (e.g., a linear gradient), the sky region 612, and the horizon 614.

Figure 7A:
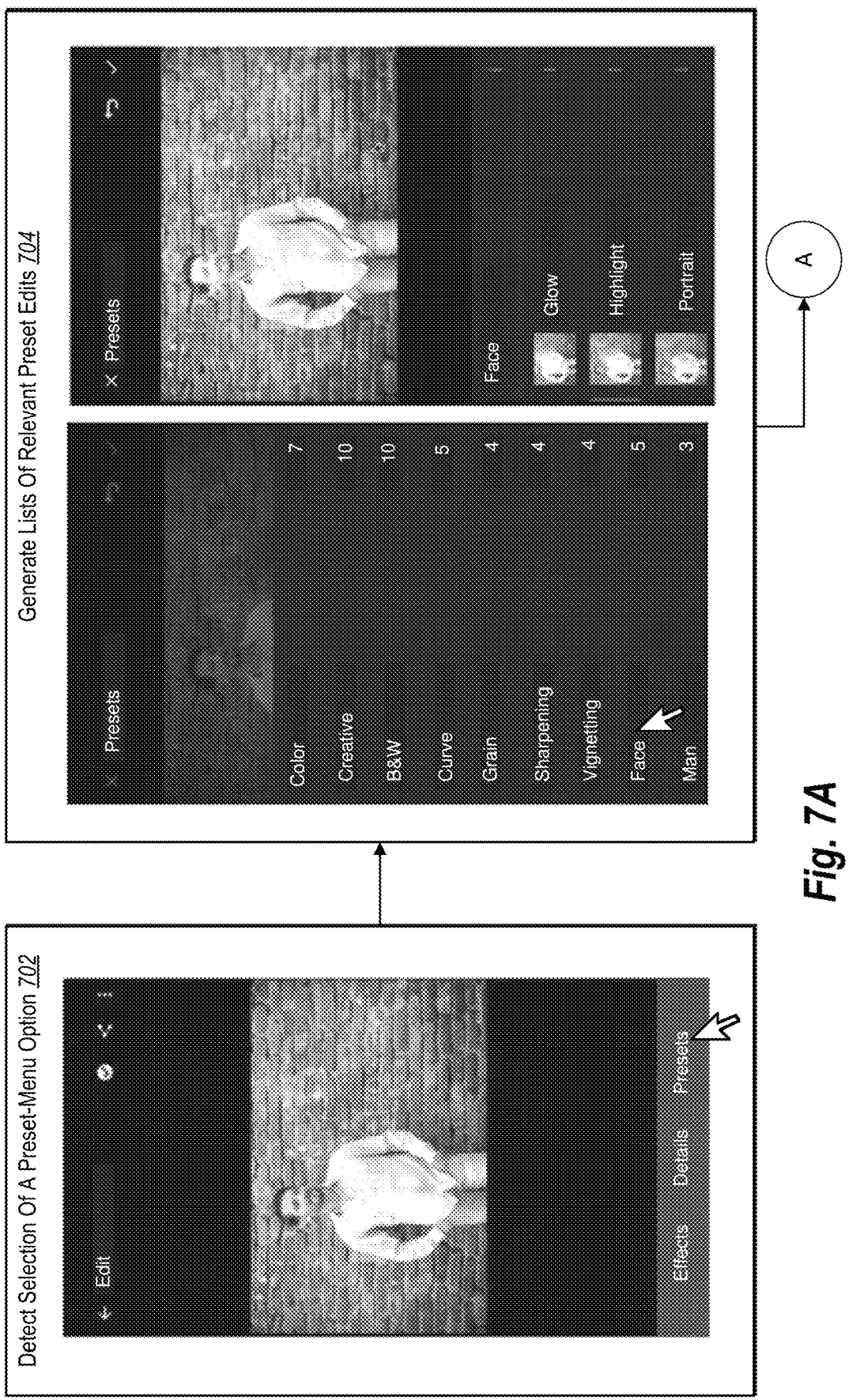
FIGS. 7A-7B illustrate the object-specific-preset-edit system providing object-specific-preset edits for selection that are tailored to a target digital image in accordance with one or more embodiments.
Figure 7B:
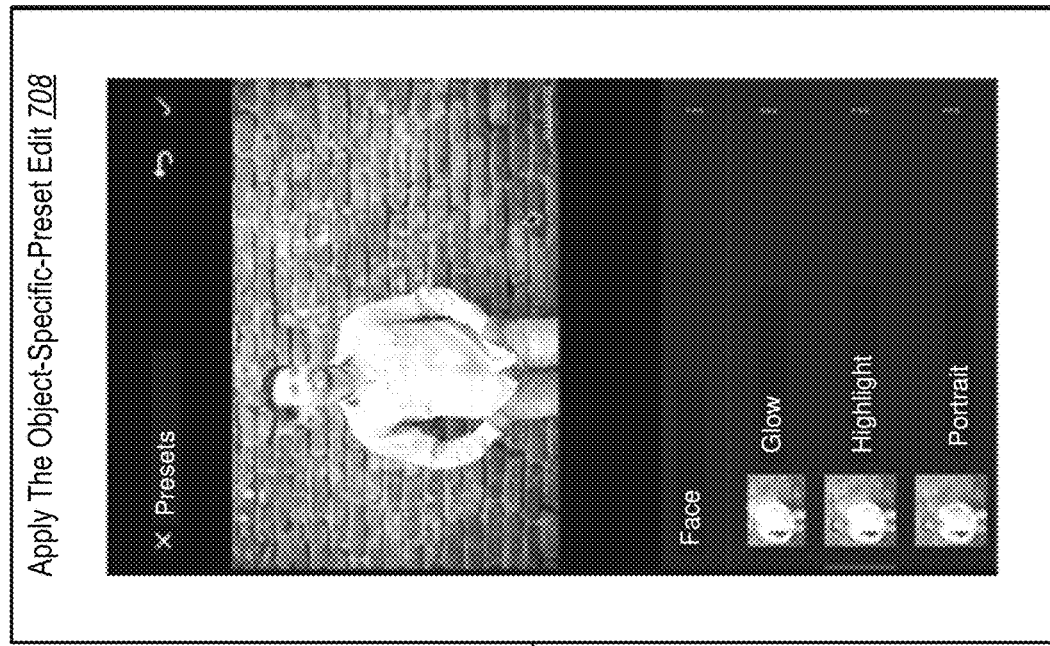
Figure 7B:
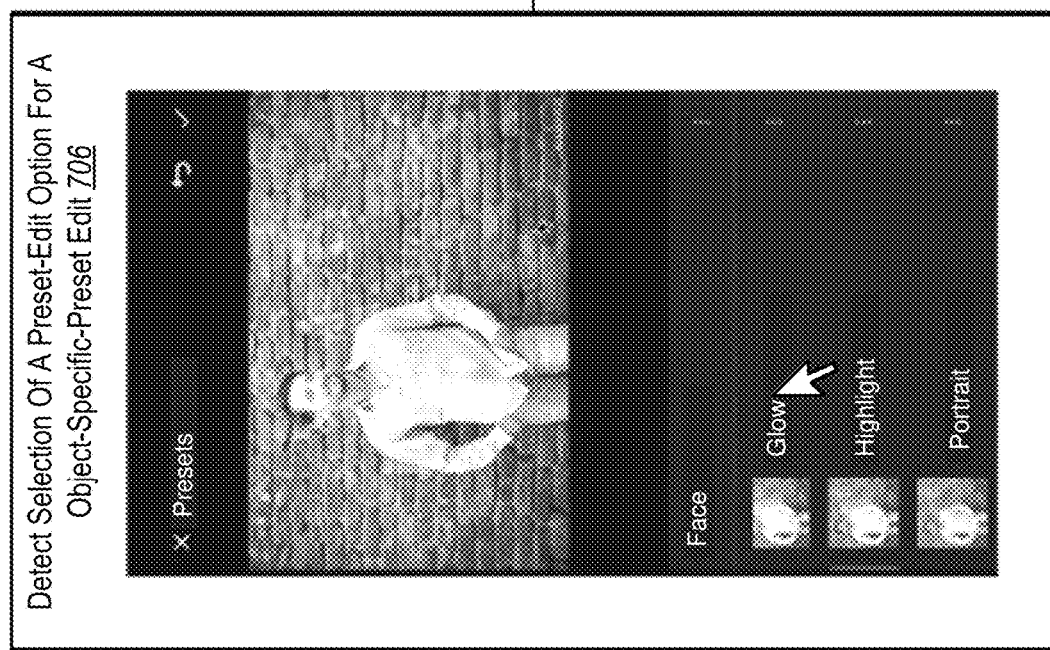

FIGS. 7A-7B illustrate the object-specific-preset-edit system 102 providing object-specific-preset edits for selection that are tailored to a target digital image. For example, FIG. 7A illustrates an overview of the object-specific-preset-edit system 102 providing and applying an object-specific-preset edit that is tailored to a target digital image. In particular, the object-specific-preset-edit system 102 tailors the display of preset-edit options by providing preset-edit options for object-specific-preset edits corresponding to particular object types detected within the target digital image.

As shown in FIG. 7A, for example, the object-specific-preset-edit system 102 performs an act 702 of detecting a selection of a preset-menu option in connection with a target digital image via the image editing application 112. Based on the detected selection of the preset-menu option, the object-specific-preset-edit system 102 performs an act 704 of generating lists of relevant preset edits. For example, the object-specific-preset-edit system 102 can generate lists of preset edits that include general preset edits available via the image editing application 112. Additionally, the object-specific-preset-edit system 102 can generate lists of object-specific-preset edits that are tailored to the target digital image.

To illustrate, in some embodiments, the object-specific-preset-edit system 102 utilizes a machine-learning-detection model discussed above to determine object identifiers associated with the objects in the target digital image. The object-specific-preset-edit system 102 then compares the determined object identifiers to object identifiers indicated by the object-specific-preset edits in the object-specific-preset edits repository 114. The object-specific-preset-edit system 102 can then provide selectable preset-edit options associated with the object-specific-preset edits with object identifiers (e.g., the category "Auto-face" in the <crs:Group> field, discussed above) that match or otherwise correspond with the object identifiers determined in connection with the target digital image.

As part of generating lists of relevant preset edits, in some embodiments, the object-specific-preset-edit system 102 generates the preset categories in a category list based on information associated with the identified general preset edits and tailored object-specific-preset edits. As shown in FIG. 7A, such a category list includes category indicators for color, creative, B&W, curve, grain, sharpening, vignetting, face, and man. The object-specific-preset-edit system 102 can generate such categories (and corresponding category indicators) based on metadata associated with general preset edits and tailored object-specific-preset edits. Additionally or alternatively, the object-specific-preset-edit system 102 can generate categories based on a combination of metadata associated with the general preset edits and object identifiers associated with the tailored object-specific-preset edits.

To illustrate, the object-specific-preset-edit system 102 can utilize natural language processing, machine learning, or other techniques to generate the categories in the category list. For example, the object-specific-preset-edit system 102 can generate a "face" category that includes a general preset edit with metadata indicating it is applicable to a face (e.g., a "portrait" general preset edit that makes a human face in a foreground clear and a background behind the face blurry), and an object-specific-preset edit with an object identifier "face."

As further shown in FIG. 7A, based on a detected selection of the "Face" category indicator, the object-specific-preset-edit system 102 can display selectable preset-edit options associated with the object-specific-preset edits in the selected category. In the example shown in FIG. 7A, the object-specific-preset-edit system 102 generates a sub-list of preset-edit options associated with the selected category indicator. For example, the object-specific-preset-edit system 102 generates the sub-list such that each of the preset-edit options is associated with a previously determined general preset edit or an object-specific-preset edit. As illustrated in FIG. 7A, for instance, the preset-edit option for "Glow" is associated with an object-specific-preset edit (e.g., generated as illustrated in FIG. 5F above). By contrast, the preset-edit options for "Highlight" and "Portrait" are associated with general preset edits available via the image editing application 112.

As shown in FIG. 7B, the object-specific-preset-edit system 102 further performs an act 706 of detecting a selection of a preset-edit option for an object-specific-preset edit. For example, the object-specific-preset-edit system 102 detects a selection of a displayed preset-edit option (e.g., titled "Glow" in the <crs:Name> field, as discussed above) associated with the object-specific-preset edit for a particular detected object (e.g., face) via the image editing application 112.

As further shown in FIG. 7B, the object-specific-preset-edit system 102 performs an act 708 of applying the object-specific-preset edit corresponding to the selected preset-edit option. In one or more embodiments, and as will be discussed below with reference to FIGS. 8A-9B, the object-specific-preset-edit system 102 applies the object-specific-preset edit by determining a target object in the target digital image and then applying the object-specific-preset edit to the target object based on transformed-positioning parameters. As further discussed below, the object-specific-preset-edit system 102 determines the transformed-positioning parameters that include instructions for scaling and positioning the preset-positioning parameters for the edited object specified by the digital-image-editing document for the object-specific-preset edit.

Figure 8A:
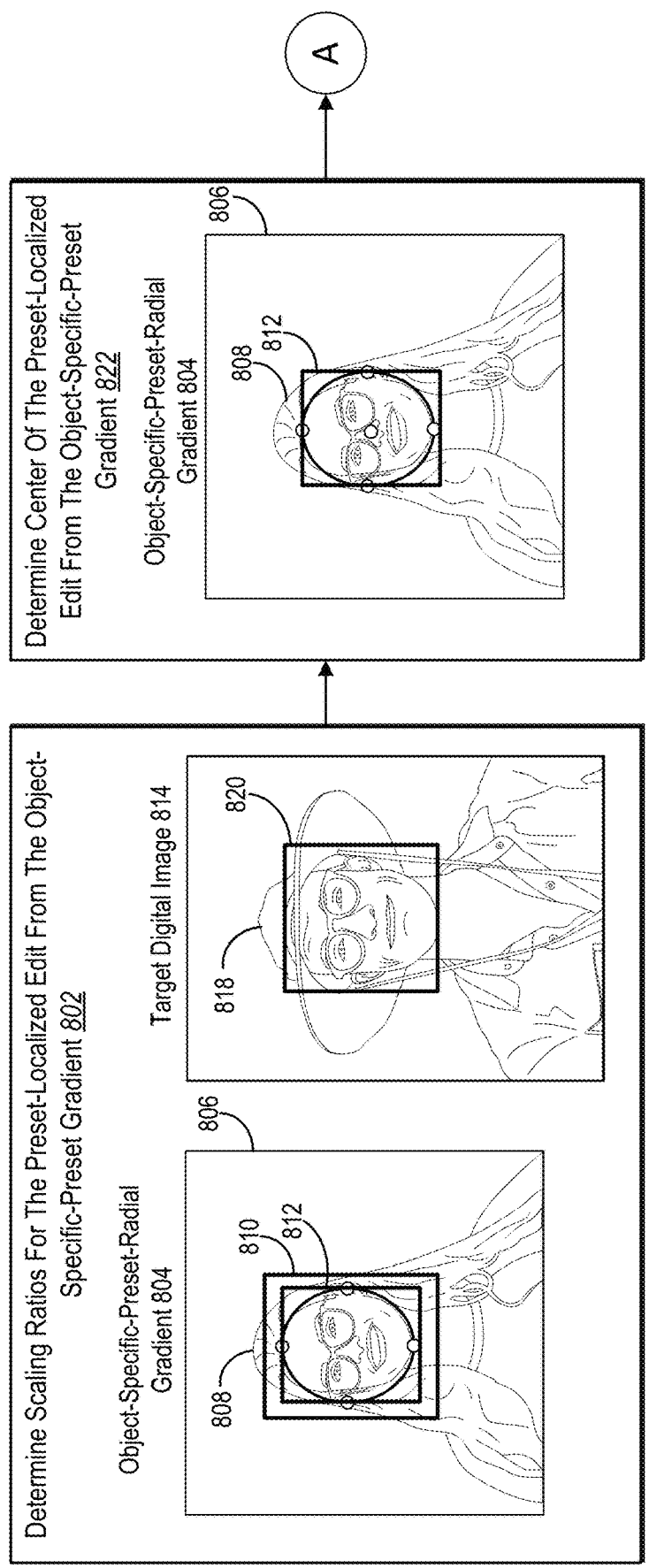
FIGS. 8A-8C illustrate the object-specific-preset-edit system applying an object-specific-preset gradient for a radial gradient to a target digital image in accordance with one or more embodiments.
Figure 8B:
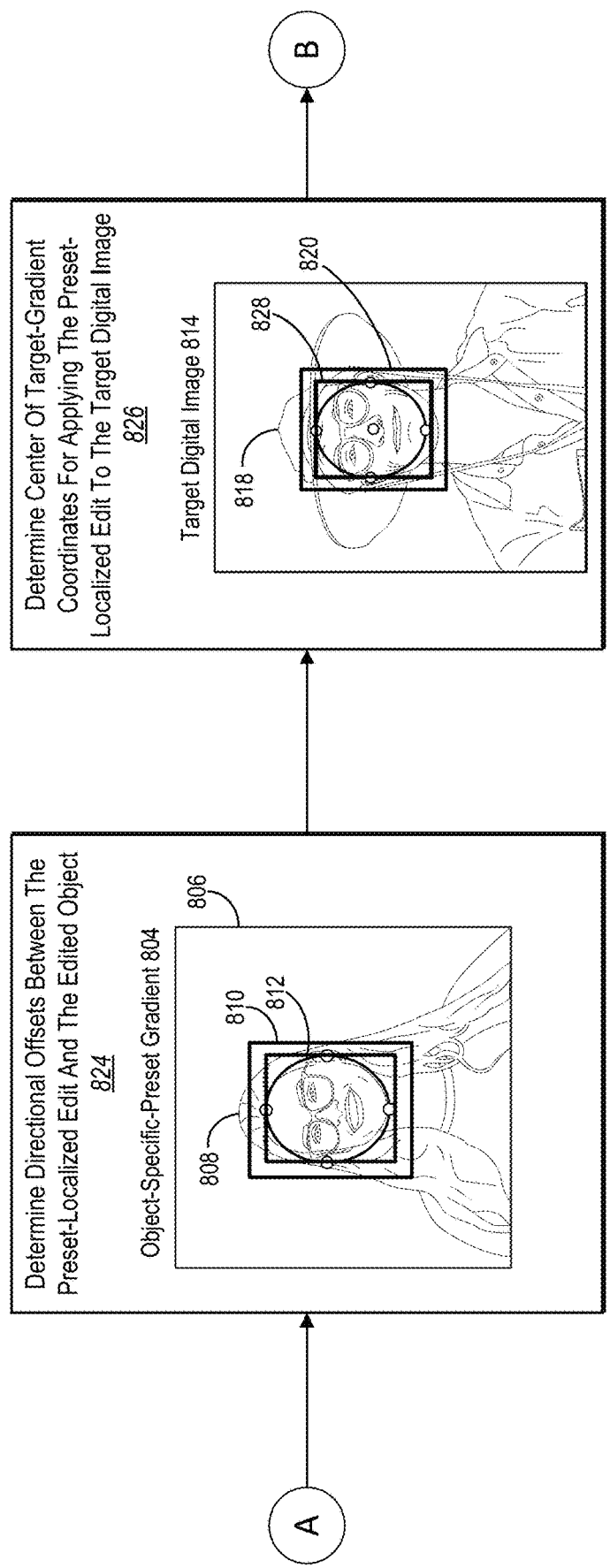
Figure 8C:
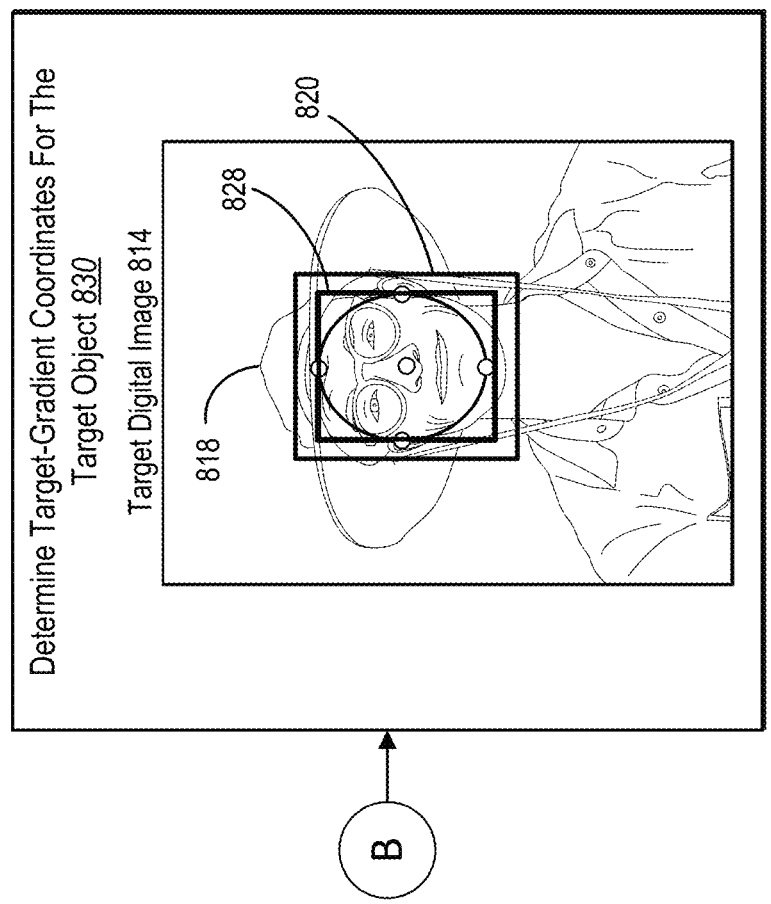
Figure 9A:
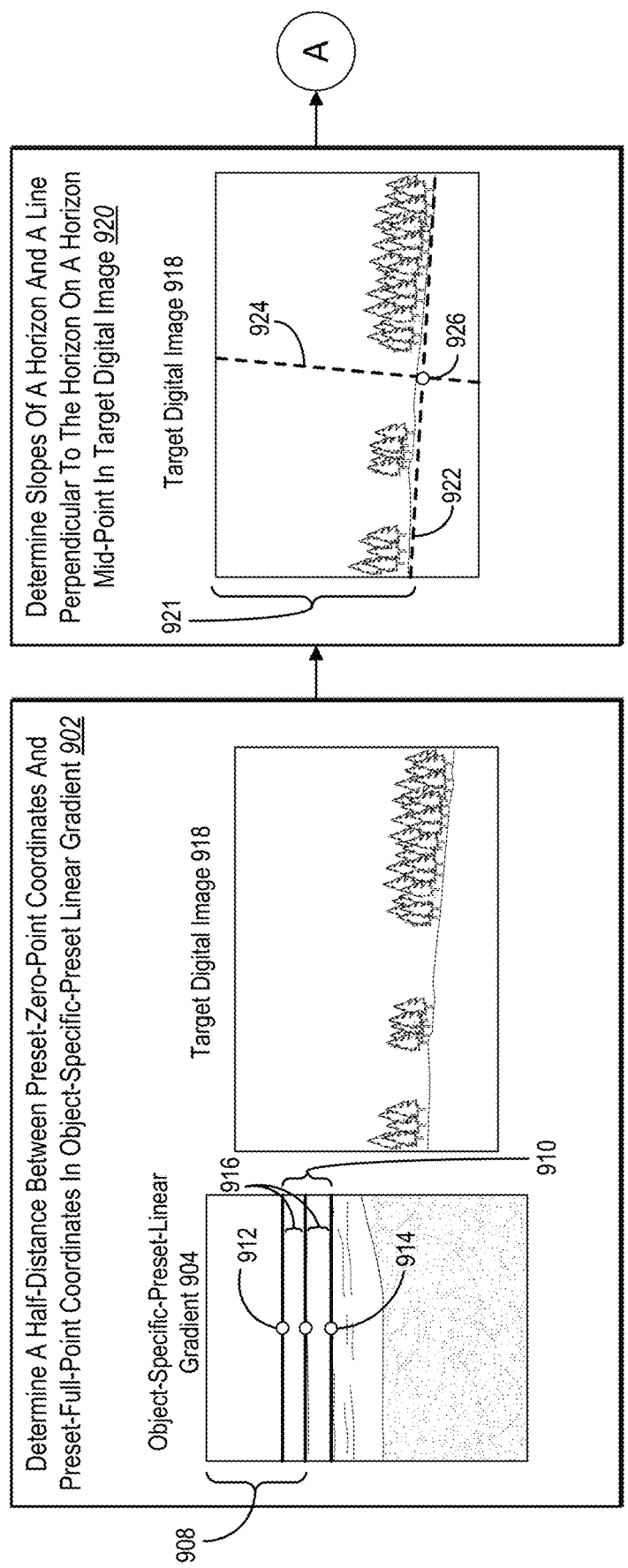
FIGS. 9A-9B illustrate the object-specific-preset-edit system applying an object-specific-preset gradient for a linear gradient to a target digital image in accordance with one or more embodiments.
Figure 9B:
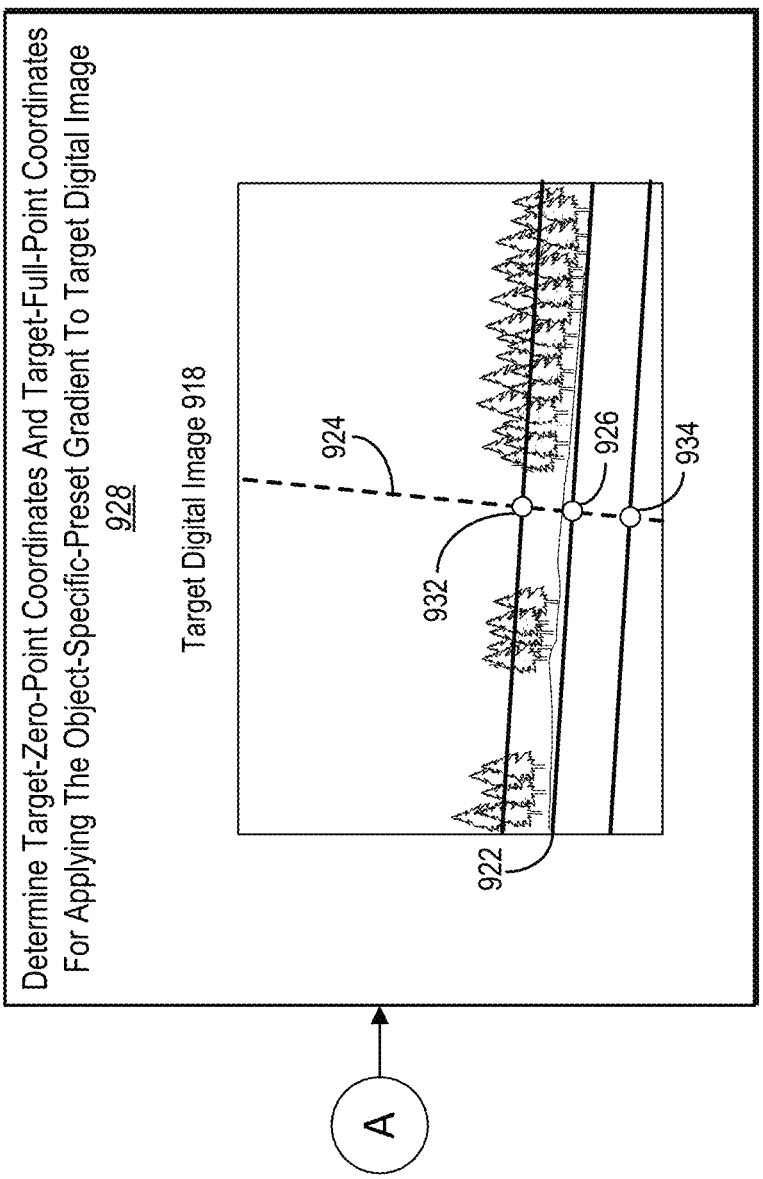

FIGS. 8A-9B illustrate the object-specific-preset-edit system 102 applying selected object-specific-preset edits to target digital images. Specifically, FIGS. 8A-8C illustrate the object-specific-preset-edit system 102 applying an object-specific-preset-radial gradient to a target digital image. FIGS. 9A-9B illustrate the object-specific-preset-edit system 102 applying an object-specific-preset-linear gradient to a target digital image.

Generally, with regard to applying an object-specific-preset-radial gradient to a target object as shown in FIGS. 8A-8C, the object-specific-preset-edit system 102 determines target-gradient coordinates that effectively rescale and reposition a preset-localized edit (e.g., the radial gradient) as defined within the digital-image-editing document for the object-specific-preset-radial gradient. For example, the target-gradient coordinates guide the object-specific-preset-edit system 102 to apply the radial gradient of the object-specific-preset gradient to the target object in the target digital image in the same manner that the radial gradient was applied to the edited object in the edited digital image from which the object-specific-preset gradient was generated—even when the size, position, and/or orientation of the target object in the target digital image is different from the size, position, and/or orientation of the edited object in the edited digital image.

As shown in FIG. 8A, for instance, the object-specific-preset-edit system 102 performs an act 802 of determining scaling ratios from the preset-localized edit from the object-specific-preset-radial gradient 804. As discussed above, the object-specific-preset-radial gradient 804 is defined within a digital-image-editing document by information associated with an edited object 808 and a preset-localized edit in an edited digital image 806. For example, the information associated with the edited object 808 and the preset-localized edit in the edited digital image 806 includes bounding-box coordinates for a bounding box 810 (e.g., preset-positioning parameters) corresponding to the edited object 808 and preset-gradient coordinates for a localized-edit region 812 corresponding to the preset-localized edit (e.g., a radial gradient) to the edited object 808.

To illustrate further, the object-specific-preset-edit system 102 identifies bounding-box coordinates for the bounding box 810 corresponding to the edited object 808 and the preset-gradient coordinates for the localized-edit region 812 corresponding to the preset-localized edit as sets of four ordered coordinates defined within the digital-image-editing document for the object-specific-preset-radial gradient 804. For example, both of the coordinates are represented within the digital-image-editing document for the object-specific-preset-radial gradient 804 as sets of four ordered coordinates including: a left coordinate as an x-coordinate of the left side of the respective bounding box, a top coordinate as the y-coordinate of the top side of the respective bounding box, the right coordinate as the x-coordinate of the right side of the respective bounding box, and the bottom coordinate as the y-coordinate of the bottom side of the respective bounding box.

For the object-specific-preset-edit system 102 to determine transformed-positioning parameters for applying the object-specific-preset-radial gradient 804 to a target object 818 defined by bounding-box coordinates for a bounding box 820 in a target digital image 814, the object-specific-preset-edit system 102 determines how the preset-gradient coordinates for the localized-edit region 812 are scaled relative to the bounding-box coordinates for the bounding box 810 corresponding to the edited object 808. For example, the object-specific-preset-edit system 102 can determine this scaling by determining scaling ratios (e.g., a horizontal scaling ratio and a vertical scaling ratio) for the preset-gradient coordinates for the localized-edit region 812 relative to the bounding-box coordinates for the bounding box 810.

In one or more embodiments, the object-specific-preset-edit system 102 determines a horizontal scaling ratio according to the following equation: (horizontal scaling ratio)=((right coordinate of the preset-gradient coordinates)−(left coordinate of the preset-gradient coordinates))/((right coordinate of the bounding-box coordinates)−(left coordinate of the bounding-box coordinates)). Additionally, the object-specific-preset-edit system 102 determines a vertical scaling ratio according to the following equation: (vertical scaling ratio)=((bottom coordinate of the preset-gradient coordinates)−(top coordinate of the preset-gradient coordinates))/((bottom coordinate of the bounding-box coordinates)−(top coordinate of the bounding-box coordinates)).

As further shown in FIG. 8A, the object-specific-preset-edit system 102 performs an act 822 of determining a center of the preset-localized edit from the object-specific-preset-radial gradient 804. In one or more embodiments, the object-specific-preset-edit system 102 determines the center of the preset-localized edit represented by the preset-gradient coordinates for the localized-edit region 812 applied to the edited object 808 in the edited digital image 806 by determining a horizontal-center coordinate and a vertical-center coordinate of the preset-gradient coordinates for the localized-edit region 812. For example, the object-specific-preset-edit system 102 determines the horizontal-center coordinate according to the following equation: (horizontal-center coordinate)=(right coordinate of the preset-gradient coordinates)+(((right coordinate of the preset-gradient coordinates)−(left coordinate of the preset-gradient coordinates))/2). The object-specific-preset-edit system 102 further determines the vertical-center coordinate according to the following equation: (vertical-center coordinate)=(top coordinate of the preset-gradient coordinates)+(((bottom coordinate of the preset-gradient coordinates)−(top coordinate of the preset-gradient coordinates))/2).

As shown in FIG. 8B, the object-specific-preset-edit system 102 further performs an act 824 of determining a directional offset between the preset-localized edit and the edited object 808 in the edited digital image 806. For example, the object-specific-preset-edit system 102 determines the directional offset as a horizontal offset and a vertical offset. In one or more embodiments, the object-specific-preset-edit system 102 determines the horizontal offset according to the following equation: (horizontal offset)=(horizontal-center coordinate)−(left coordinate of the bounding-box coordinates for the bounding box). Similarly, the object-specific-preset-edit system 102 determines the vertical offset according to the following equation: (vertical offset)=(vertical-center coordinate)−(top coordinate of the bounding-box coordinates for the bounding box).

As further shown in FIG. 8B, with the scaling and offset determined for the preset-localized edit, the object-specific-preset-edit system 102 performs an act 826 of determining a center of target-gradient coordinates for applying the preset-localized edit to the target digital image. In one or more embodiments, the object-specific-preset-edit system 102 determines the center of target-gradient coordinates represented by the bounding box 828 by determining a horizontal-center coordinate of the target-gradient coordinates and a vertical-center coordinate of the target-gradient coordinates. For example, the object-specific-preset-edit system 102 determines the horizontal-center coordinate of the target-gradient coordinates represented by the bounding box 828 according to the following equation: (horizontal-center coordinate of the target-gradient coordinates)=(left coordinate of the bounding-box coordinates)+(horizontal offset)*((right coordinate of the bounding-box coordinates)−(left coordinate of the bounding-box coordinates))/((right coordinate of the bounding-box coordinates for the edited object)−(left coordinate of the bounding-box coordinates for the edited object)). Similarly, the object-specific-preset-edit system 102 determines the vertical-center coordinate of the target-gradient coordinates according to the following equation: (vertical-center coordinate of the target-gradient coordinates)=(top coordinate of the bounding-box coordinates)+(vertical offset)*((bottom coordinate of the bounding-box coordinates)−(top coordinate of the bounding-box coordinates))/((bottom coordinate of the bounding-box coordinates for the edited object)−(top coordinate of the bounding-box coordinates for the edited object)).

As shown in FIG. 8C, the object-specific-preset-edit system 102 performs an act 830 of determining target-gradient coordinates for the target object. For example, the object-specific-preset-edit system 102 determines the target-gradient coordinates represented by a bounding box 828 such that the target-gradient coordinates are resized relative to the target object 818 in the same manner that the preset-gradient coordinates for the localized-edit region 812 are sized relative to the edited object 808. In one or more embodiments, the object-specific-preset-edit system 102 determines left, right, top, and bottom coordinates for the target-gradient coordinates represented by the bounding box 828.

To illustrate, the object-specific-preset-edit system 102 determines the left coordinate of the target-gradient coordinates according to the following equation: (left coordinate of the target-gradient coordinates)=(horizontal-center coordinate of the target-gradient coordinates)−((((right coordinate of the bounding-box coordinates)−(left coordinate of the bounding-box coordinates))*(horizontal scaling ratio))/2). The object-specific-preset-edit system 102 further determines the right coordinate of the target-gradient coordinates according to the following equation: (right coordinate of the target-gradient coordinates)=(horizontal-center coordinate of the target-gradient coordinates)+((((right coordinate of the bounding-box coordinates)−(left coordinate of the bounding-box coordinates))*(horizontal scaling ratio))/2). Additionally, the object-specific-preset-edit system 102 determines the top coordinate of the target-gradient coordinates according to the following equation: (top coordinate of the target-gradient coordinates)=(vertical-center coordinate of the target-gradient coordinates)−((((bottom coordinate of the bounding-box coordinates)−(top coordinate of the bounding-box coordinates))*(vertical scaling ratio))/2). Finally, the object-specific-preset-edit system 102 determines the bottom coordinate of the target-gradient coordinates according to the following equation: (bottom coordinate of the target-gradient coordinates)=(vertical-center coordinate of the target-gradient coordinates)+((((bottom coordinate of the bounding-box coordinates)−(top coordinate of the bounding-box coordinates))*(vertical scaling ratio))/2).

Additionally, in at least one embodiment, the object-specific-preset-edit system 102 further modifies the target-gradient coordinates represented by the bounding box 828 based on an orientation of the target object 818 within the target digital image 814. For example, the object-specific-preset-edit system 102 can utilize one or more machine learning models to determine that the target object 818 has an orientation that is not forward-facing (e.g., rotated left or right, tilted left or right). Based on the determined orientation, the object-specific-preset-edit system 102 can modify the target-gradient coordinates to reflect the determined orientation of the target object 818. For example, the object-specific-preset-edit system 102 can determine an angle between a center of the target object 818 and a center of the target-gradient coordinates. The object-specific-preset-edit system 102 can then translate the target-gradient coordinates basted on the determined angle. With all the coordinates of the target-gradient coordinates determined, the object-specific-preset-edit system 102 applies the preset-localized edit to the target object 818 in the target digital image 814 according to transformed-positioning parameters including target-gradient coordinates.

As mentioned above, FIGS. 9A-9B illustrate the object-specific-preset-edit system 102 applying an object-specific-preset-linear gradient to a target digital image. Generally, with regard to applying an object-specific-preset-linear gradient to a target object as shown in FIGS. 9A-9B, the object-specific-preset-edit system 102 determines target-gradient coordinates that effectively rescale and reposition a preset-localized edit (e.g., the linear gradient) as defined within the digital-image-editing document for the object-specific-preset gradient for the linear gradient. For example, the target-gradient coordinates guide the object-specific-preset-edit system 102 to apply the linear gradient of the object-specific-preset-linear gradient to a sky region in the target digital image based on a horizon in the target digital image. In particular, FIGS. 9A-9B illustrate the object-specific-preset-edit system 102 applying a linear gradient from the object-specific-preset-linear gradient 904 to a horizon of a sky region in a target digital image 918.

As shown in FIG. 9A, for instance, the object-specific-preset-edit system 102 performs an act 902 of determining a half-distance between preset-zero-point coordinates and preset-full-point coordinates in an object-specific-preset-linear gradient. For example, as mentioned above, the digital-image-editing document for the object-specific-preset-linear gradient 904 includes preset-positioning parameters including preset-zero-point coordinates (e.g., an x-coordinate and a y-coordinate) for a preset-zero point 912 and preset-full-point coordinates (e.g., an x-coordinate and a y-coordinate) for a preset-full point 914 corresponding to a preset-linear gradient 910 on an edited object 908 (e.g., a sky region). In one or more embodiments, the object-specific-preset-edit system 102 determines the half-distance 916 between the preset-zero-point coordinates for the preset-zero point 912 and the preset-full-point coordinates for the preset-full point 914 by first determining the distance between the preset-zero point 912 and the preset-full point 914. In at least one embodiment, the object-specific-preset-edit system 102 determines this distance according to the following equation:

$$d=\sqrt{(IF(P).x-IZ(P).x)^2+(IF(P).y-IF(P).y)^2}$$

Where d is the distance between the preset-zero point 912 and the preset-full point 914; IF(P).x is the x-coordinate of the preset-full point 914; IZ(P).x is the x-coordinate of the preset-zero point 912; IF(P).y is the y-coordinate of the preset-full point 914; and IZ(P).y is the y-coordinate of the preset-zero point 912. In one or more embodiments, the object-specific-preset-edit system 102 determines the half-distance 916 by dividing d by 2.

As further shown in FIG. 9A, the object-specific-preset-edit system 102 performs an act 920 of determining slopes of a horizon and a line perpendicular to the horizon on a horizon mid-point in the target digital image. For example, the object-specific-preset-edit system 102 determines a horizon 922 of a sky region 921 in the target digital image 918 utilizing the CNN, CRF, and linear regression, as discussed above with regard to FIGS. 6B-6D.

As further indicated by FIG. 9A, the object-specific-preset-edit system 102 determines a slope of the horizon 922 and a slope of a perpendicular line 924 to the horizon 922. For example, the object-specific-preset-edit system 102 can determine the slope of the horizon 922 according to the equation y=mx+b. The object-specific-preset-edit system 102 can then determine the slope of the perpendicular line 924 as a slope that, when multiplied by the slope of the horizon 922, gives a product of −1.

As additionally indicated by FIG. 9A, the object-specific-preset-edit system 102 identifies mid-point coordinates for a mid point 926 of the horizon 922. In one or more embodiments, the object-specific-preset-edit system 102 determines the mid-point coordinates for the mid point 926 by identifying x and y coordinates of a first point on the horizon 922 (e.g., a left-most point), and identifying x and y coordinates of a last point on the horizon 922 (e.g., a right-most point). The object-specific-preset-edit system 102 then adds the first and last x-coordinates, and the first and last y-coordinates, and divides both by 2 to determine the mid point 926.

As shown in FIG. 9B, the object-specific-preset-edit system 102 performs an act 928 of determining target-zero-point coordinates and target-full-point coordinates for applying the object-specific-preset gradient to the target digital image. As mentioned above, the object-specific-preset-edit system 102 determines the transformed-positioning parameters for applying the preset-linear gradient 910 from the object-specific-preset-linear gradient 904 by determining target-zero-point coordinates and target-full-point coordinates associated with the target digital image 918. In one or more embodiments, the object-specific-preset-edit system 102 determines the target-zero-point coordinates of the target-zero point 932 and target-full-point coordinates of the target-full point 934 by identifying points that lie at the half-distance 916 from the mid point 926 on the perpendicular line 924. In at least one embodiment, the object-specific-preset-edit system 102 identifies the target-zero-point coordinates and target-full-point coordinates utilizing the following equations:

$$x = x_0 \pm l \cdot \sqrt{\frac{1}{1+m^2}}$$

$$y = y_0 \pm m \cdot l \cdot \sqrt{\frac{1}{1+m^2}}$$

Where $x_0$ and $y_0$ are the x and y coordinates of the mid point 926, l. is the horizon 922, m.l. is the perpendicular line 924, and m is the slope of the horizon 922 in the x equation and the slope of the perpendicular line 924 in the y equation. With target-zero-point coordinates and target-full-point coordinates determined, the object-specific-preset-edit system 102 applies the preset-localized edit (e.g., the linear gradient) to the horizon 922 in the target digital image 918 according to the transformed-positioning parameters, here, the target-zero-point coordinates and target-full-point coordinates.

In one or more embodiments, the object-specific-preset-edit system 102 also applies object-specific-preset edits for linear gradients to non-sky objects in a target digital image. To illustrate, an object-specific-preset edit may include information for a linear gradient applied to an edited object, such as a rectangular backyard pool. Based on a detected selection of a preset-edit option associated with the object-specific-preset edit, the object-specific-preset-edit system 102 applies the same linear gradient to a target object (e.g., a rectangular fountain in a park) by first determining a transformation matrix based on the preset-gradient coordinates (e.g., preset-zero-point coordinates and preset-full-point coordinates) for the linear gradient applied to the edited object (e.g., the backyard pool), as well as the bounding-box coordinates for the edited object.

The object-specific-preset-edit system 102 next scales the preset-zero-point coordinates and the preset-full-point coordinates using the transformation matrix. For example, the object-specific-preset-edit system 102 scales the transformation matrix based on bounding-box coordinates for the target object such that the linear gradient from the object-specific-preset edit can be accurately applied to the target object (e.g., the rectangular fountain). The object-specific-preset-edit system 102 then determines a rotation angle between center coordinates among bounding-box coordinates for the edited object and center coordinates between the preset-zero-point coordinates and the preset-full-point coordinates. The object-specific-preset-edit system 102 then determines the target-zero-point coordinates and target-full-point coordinates by rotating the scaled preset-zero-point coordinates and preset-full-point coordinates by the determined rotation angle. The object-specific-preset-edit system 102 then applies the linear gradient to the target object based on the target-zero-point coordinates and target-full-point coordinates.

Figure 10:
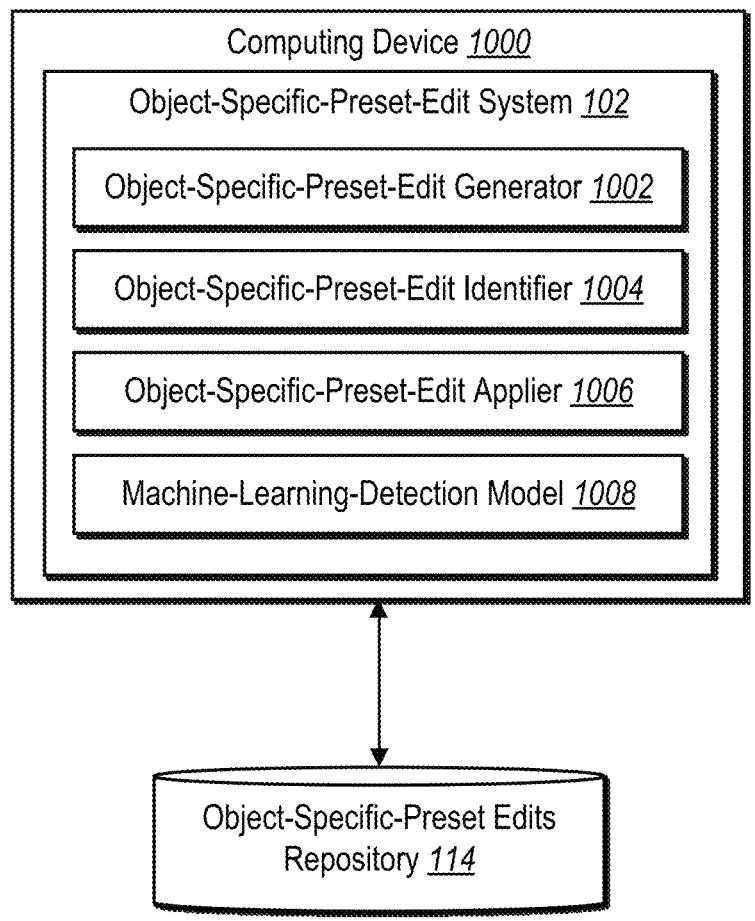
FIG. 10 illustrates a schematic diagram of the object-specific-preset-edit system in accordance with one or more embodiments.

FIG. 10 illustrates a detailed schematic diagram of an embodiment of the object-specific-preset-edit system 102 operating on a computing device 1000 in accordance with one or more embodiments. As discussed above, the object-specific-preset-edit system 102 is operable on a variety of computing devices. Thus, for example, the computing device 1000 is optionally the server(s) 108 and/or the client computing device 110. In one or more embodiments, the object-specific-preset-edit system 102 includes an object-specific-preset-edit generator 1002, an object-specific-preset-edit identifier 1004, an object-specific-preset-edit applier 1006, and a machine-learning-detection model 1008.

As mentioned above, and as shown in FIG. 10, the object-specific-preset-edit system 102 includes the object-specific-preset-edit generator 1002. In one or more embodiments, the object-specific-preset-edit generator 1002 generates object-specific-preset edits based on localized edits to an edited object in an edited digital image. For example, and as discussed above with reference to FIGS. 5A-6D, the object-specific-preset-edit generator 1002 detects a selection of an option to generate an object-specific-preset edit. Based on the detected selection, the object-specific-preset-edit generator 1002 detects objects in an edited digital image, and determines which of the objects is the edited object (e.g., either an object such as a person, animal, toy, etc., or a horizon of a sky region). The object-specific-preset-edit generator 1002 then generates the object-specific-preset edit based on the edited object and the localized edit. In at least one embodiment, the object-specific-preset-edit generator 1002 further adds classification and title information to the object-specific-preset edit based on an object identifier associated with the edited object and user title input.

As mentioned above, and as shown in FIG. 10, the object-specific-preset-edit system 102 includes the object-specific-preset-edit identifier 1004. In one or more embodiments, the object-specific-preset-edit identifier 1004 identifies object-specific-preset edits that are tailored to a target digital image. For example, in response to a detected selection of preset option in connection with a target digital image, the object-specific-preset-edit identifier 1004 detects one or more objects in the target digital image and then identifies one or more object-specific-preset edits in the object-specific-preset edits repository 114 that correspond to the detected one or more objects in the target digital image. To illustrate, the object-specific-preset-edit identifier 1004 identifies object-specific-preset edits that indicate object identifiers that correspond with object identifiers associated with the objects in the target digital image. The object-specific-preset-edit identifier 1004 further generates one or more lists of general preset edits and the identified object-specific-preset edits.

As mentioned above, and as shown in FIG. 10, the object-specific-preset-edit system 102 includes the object-specific-preset-edit applier 1006. In one or more embodiments, object-specific-preset-edit applier 1006 applies a selected object-specific-preset edit to a target object in a target digital image. For example, in response to a detected selection of a preset-edit option, the object-specific-presetedit applier 1006 determines a target object in the target digital image by identifying an object in the target digital image with an object identifier that corresponds with an object identifier specified by the corresponding object-specific-preset edit. The object-specific-preset-edit applier 1006 then determines transformed-positioning parameters for applying the localized edit specified by the corresponding object-specific-preset edit to identified target object. Finally, the object-specific-preset-edit applier 1006 applies the localized edit from the object-specific-preset edit to the target object according to the transformed-positioning parameters.

As mentioned above, and as shown in FIG. 10, the object-specific-preset-edit system 102 includes the machine-learning-detection model 1008. In one or more embodiment, the object-specific-preset-edit system 102 trains the machine-learning-detection model 1008 to determine object identifiers and locations of objects in digital images. For example, in response to receiving an input digital image, the machine-learning-detection model 1008 outputs a list of object identifiers (e.g., object tags) and corresponding locations (e.g., object bounding boxes, or bounding-box coordinates) for all objects in the input digital image. In at least one embodiment, the machine-learning-detection model 1008 further outputs a confidence score associated with each identified object.

Each of the components 1002-1008 of the object-specific-preset-edit system 102 includes software, hardware, or both. For example, the components 1002-1008 includes one or more instructions stored on a computer-readable storage medium and executable by processors of one or more computing devices, such as a client computing device or server device. When executed by the one or more processors, the computer-executable instructions of the object-specific-preset-edit system 102 can cause the computing device(s) to perform the methods described herein. Alternatively, the components 1002-1008 includes hardware, such as a special-purpose processing device to perform a certain function or group of functions. Alternatively, the components 1002-1008 of the object-specific-preset-edit system 102 includes a combination of computer-executable instructions and hardware.

Furthermore, the components 1002-1008 of the object-specific-preset-edit system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1008 may be implemented as a stand-alone application, such as a desktop or mobile application. Furthermore, the components 1002-1008 may be implemented as one or more web-based applications hosted on a remote server. The components 1002-1008 may also be implemented in a suite of mobile device applications or "apps." To illustrate, the components 1002-1008 may be implemented in an application, including but not limited to ADOBE CREATIVE CLOUD, such as ADOBE PHOTOSHOP or ADOBE PHOTOSHOP CAMERA. "ADOBE", "CREATIVE CLOUD", "PHOTOSHOP", and "PHOTOSHOP CAMERA" are either registered trademarks or trademarks of Adobe Systems Incorporated in the United States and/or other countries.

Figure 11:
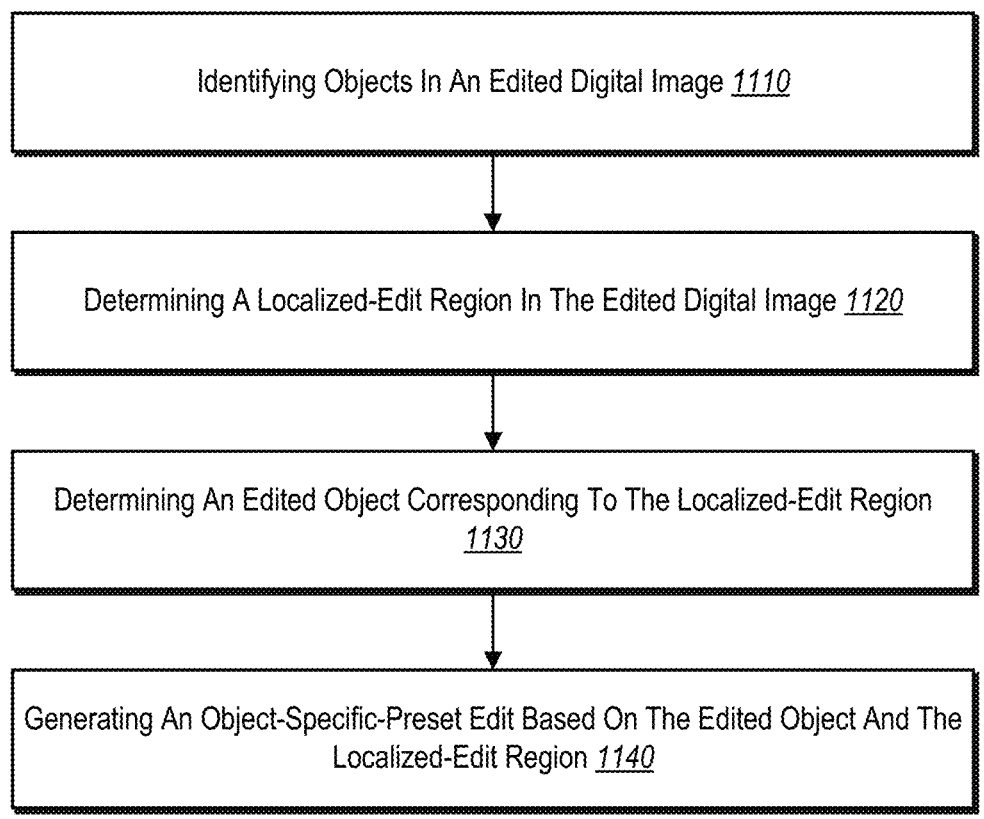
FIG. 11 illustrates a flowchart of a series of acts for generating an object-specific-preset edit in accordance with one or more embodiments.
Figure 12:
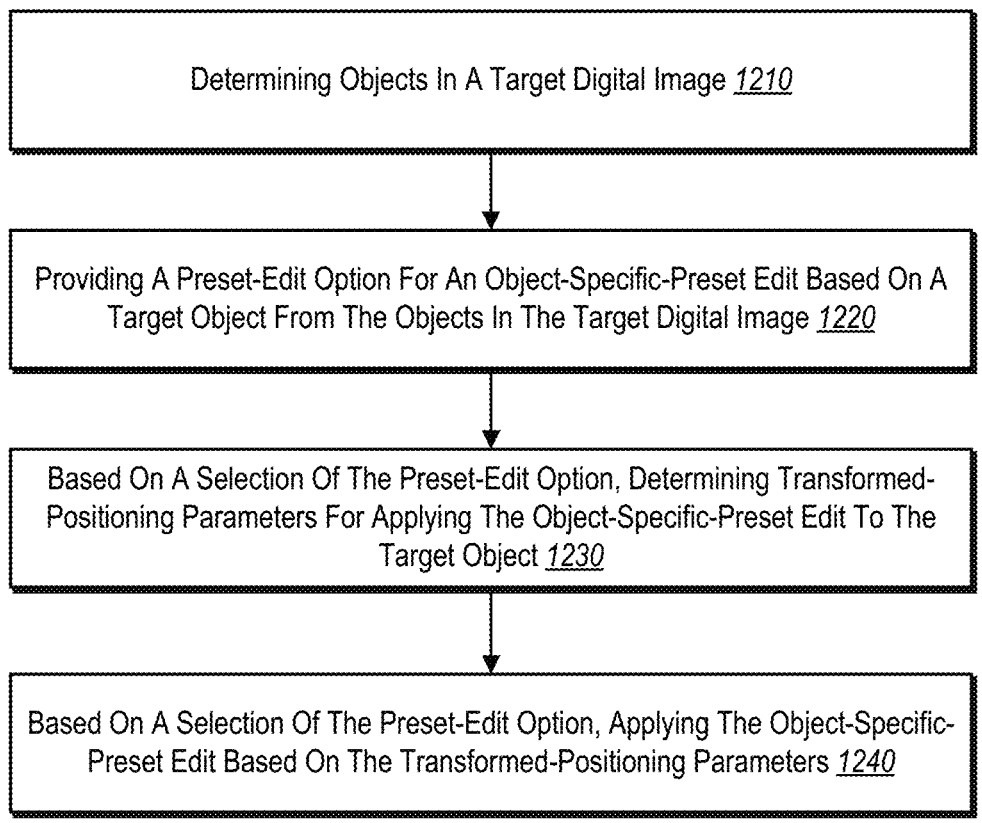
FIG. 12 illustrates a flowchart of a series of acts for applying an object-specific-preset edit in accordance with one or more embodiments.
Figure 13:
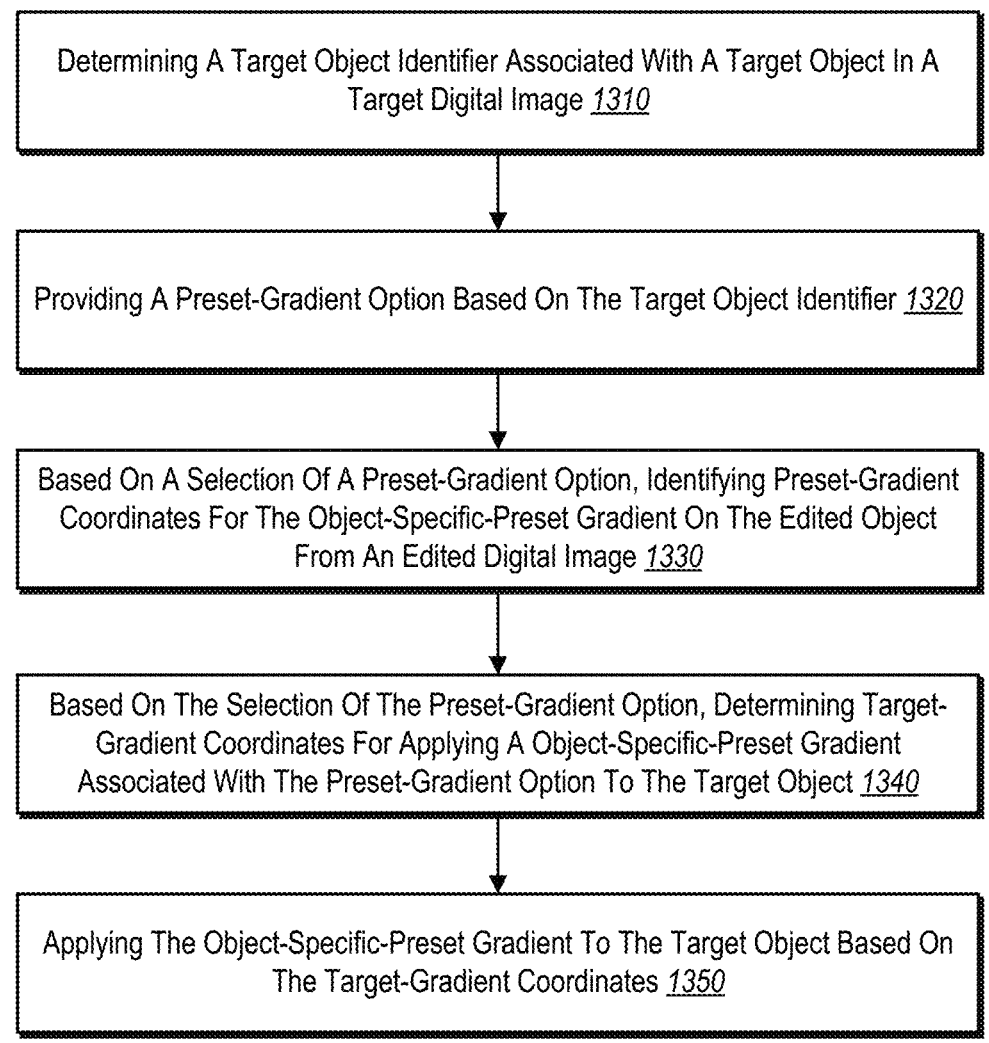
FIG. 13 illustrates a flowchart of another series of acts for applying an object-specific-preset gradient in accordance with one or more embodiments.

FIGS. 1-10, the corresponding text, and the examples provide a number of different methods, systems, devices, and non-transitory computer-readable media of the object-specific-preset-edit system 102. In addition to the foregoing, one or more embodiments can also be described in terms of flowcharts comprising acts for accomplishing a particular result, as shown in FIGS. 11, 12, and 13. FIGS. 11, 12, and 13 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a flowchart of a series of acts 1100 for generating an object-specific-preset edit in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1110 of identifying objects in an edited digital image. For example, the act 1110 involves identifying one or more objects within an edited digital image comprising a localized edit. In one or more embodiments, identifying the one or more objects within the edited digital image includes determining one or more object identifiers and one or more bounding boxes for the one or more objects within the edited digital image utilizing a machine-learning-detection model.

In one or more embodiments, identifying the one or more objects within the edited digital image includes: detecting a sky region within the edited digital image by generating a weighted average mask for the sky region utilizing an image-detection model; and adjusting the weighted average mask for the sky region to generate a probability map for the sky region and a non-sky region within the edited digital image. In at least one embodiment, the series of acts 1100 includes determining a horizon line for the sky region demarcating the localized-edit region by: determining a set of boundary coordinates for the sky region; and generating the horizon line by applying a linear regression to the set of boundary coordinates.

As shown in FIG. 11, the series of acts 1100 includes an act 1120 of determining a localized-edit region in the edited digital image. For example, the act 1120 involves determining a localized-edit region for the localized edit within the edited digital image.

As shown in FIG. 11, the series of acts 1100 includes an act 1130 of determining an edited object corresponding to the localized-edit region. For example, the act 1130 involves determining an edited object from the one or more objects that corresponds to the localized edit based on an overlap between the localized-edit region and the edited object. In one or more embodiments, determining the edited object from the one or more objects that corresponds to the localized edit based on the overlap between the localized-edit region and the edited object can include: determining a degree of overlap between the localized-edit region and a bounding box for an object within the edited digital image; determining other degrees of overlap between the localized-edit region and other bounding boxes for other objects within the edited digital image; and identifying the object as the edited object based on the degree of overlap exceeding the other degrees of overlap. In at least one embodiment, determining the degree of overlap between the localized-edit region and the bounding box for the object within the edited digital image includes: determining an area of overlap between the localized-edit region and the bounding box for the object; determining an area of union for the localized-edit region and the bounding box for the object; and determining an intersection-over-union value for the localized-edit region and the bounding box for the object based on the area of overlap and the area of union.

In one or more embodiments, determining the edited object from the one or more objects that corresponds to the localized edit based on the overlap between the localized-edit region and the edited object includes: detecting a sky region within the edited digital image; determining a degree of overlap between the localized-edit region and the sky region within the edited digital image; and identifying the sky region as the edited object based on the degree of overlap exceeding a predetermined threshold.

As shown in FIG. 11, the series of acts 1100 includes an act 1140 of generating an object-specific-preset edit based on the edited object and the localized-edit region. For example, the act 1140 involves generating an object-specific-preset edit for editing objects having a type corresponding to a type of the edited object by aggregating an object identifier for the edited object and instructions for the localized edit within a digital-image-editing document.

As mentioned, FIG. 12 illustrates a flowchart of a series of acts 1200 for applying an object-specific-preset edit in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some embodiments, a system can perform the acts of FIG. 12.

As shown in FIG. 12, the series of acts 1200 includes an act 1210 of determining objects in a target digital image. For example, the act 1210 involves determining a set of objects within a target digital image. In one or more embodiments, the series of acts 1200 includes an act of determining the set of objects within the target digital image by determining one or more object identifiers for the one or more objects within the target digital image utilizing a machine-learning-detection model. In at least one embodiment, the series of acts 1200 also includes determining that the target object corresponds to the object identifier for the object-specific-preset edit by determining that an object identifier associated with the target object matches the object identifier for the object-specific-preset edit.

As shown in FIG. 12, the series of acts 1200 includes an act 1220 of providing a preset-edit option for an object-specific-preset edit based on a target object from the objects in the target digital image. For example, the act 1220 involves providing, for display on a client computing device, a preset-edit option for the object-specific-preset edit based on a target object, from the set of objects, corresponding to an object identifier for the object-specific-preset edit.

As shown in FIG. 12, the series of acts 1200 includes an act 1230 of, based on a selection of the preset-edit option, determining transformed-positioning parameters for applying the object-specific-preset edit to the target object. For example, the act 1230 involves, based on a detected selection of the preset-edit option determining transformed-positioning parameters for a localized edit to the target object within the target digital image based on preset-positioning parameters for an edited object within the digital-image-editing document. The series of acts 1200 also includes an act 1240 of, based on the selection of the preset-edit option, applying the object-specific-preset edit based on the transformed-positioning parameters. For example, the act 1240 involves, based on the selection of the preset-edit option, applying the object-specific-preset edit to the target object within the target digital image according to the transformed-positioning parameters.

In one or more embodiments, the series of acts 1200 includes an act of determining the transformed-positioning parameters for applying a radial gradient as the localized edit to the target object by: determining preset-gradient coordinates for a preset-localized edit to the edited object; determining bounding-box coordinates for the edited object as the preset-positioning parameters for the edited object; determining bounding-box coordinates for the target object; and generating target-gradient coordinates for applying the radial gradient to the target object based on comparisons among the preset-gradient coordinates for the edited object, the bounding-box coordinates for the edited object, and the bounding-box coordinates for the target object.

In at least one embodiment, the series of acts 1200 includes further generating the target-gradient coordinates for applying the radial gradient to the target object by: determining scaling ratios for the radial gradient based on the preset-gradient coordinates and the bounding-box coordinates for the edited object; determining directional offsets of the edited object with respect to center coordinates among the preset-gradient coordinates based on the bounding-box coordinates for the edited object; and generating the target-gradient coordinates for applying the radial gradient to the target object based on the scaling ratios, the directional offsets, the bounding-box coordinates for the edited object, and the bounding-box coordinates for the target object. The series of acts 1200 can further include determining the transformed-positioning parameters for applying the radial gradient as the localized edit to the target object by modifying the target-gradient coordinates for applying the radial gradient to the target object based on an orientation of the target object within the target digital image.

In one or more embodiments, the series of acts 1200 includes an act of determining transformed-positioning parameters for applying a linear gradient as the localized edit to a sky region as the target object by: identifying, as the preset-positioning parameters, preset-zero-point coordinates for a preset-linear gradient on the edited object and preset-full-point coordinates for the preset-linear gradient on the edited object; determining a half-distance between the preset-zero-point coordinates and the preset-full-point coordinates; determining mid-point coordinates of a horizon line for the sky region in the target digital image; and determining the transformed-positioning parameters by determining target-zero-point coordinates for the linear gradient on the sky region and target-full-point coordinates for the linear gradient on the sky region based on the half-distance and the mid-point coordinates of the horizon line.

As mentioned, FIG. 13 illustrates a flowchart of a series of acts 1300 for applying an object-specific-preset gradient in accordance with one or more embodiments. While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer-readable medium can comprise instructions that, when executed by one or more processors, cause a computing device to perform the acts of FIG. 13. In some embodiments, a system can perform the acts of FIG. 13.

As shown in FIG. 13, the series of acts 1300 includes an act 1310 of determining a target object identifier associated with a target object in a target digital image. For example, the act 1310 involves determining a target object identifier for a target object within a target digital image.

As shown in FIG. 13, the series of acts 1300 includes an act 1320 of providing a preset-gradient option based on the target object identifier. For example, the act 1320 involves providing, for display on a client computing device, a preset-gradient option for an object-specific-preset gradient based on the target object identifier for the target object corresponding to a preset object identifier for the object-specific-preset gradient.

As shown in FIG. 13, the series of acts 1300 includes an act 1330 of, based on a selection of the preset-gradient option, identifying preset-gradient coordinates for the object-specific-preset gradient on an edited object from an edited digital image. For example, the act 1330 involves, based on the detected selection of the preset-gradient option, identifying the preset-gradient coordinates for the object-specific-preset gradient from a digital-image-editing document associated with the object-specific-preset gradient.

As shown in FIG. 13, the series of acts 1300 includes an act 1340 of based on the selection of the preset-gradient option, determining target-gradient coordinates for applying an object-specific-preset gradient associated with the preset-gradient option to the target object. For example, the act 1330 involves, based on the detected selection of the preset-gradient option, determining target-gradient coordinates for applying the object-specific-preset gradient on the target object within the target digital image by adjusting the preset-gradient coordinates for the object-specific-preset gradient on the edited object.

In one or more embodiments, determining the target-gradient coordinates for applying a radial gradient as the object-specific-preset gradient to the target object includes: determining bounding-box coordinates for the edited object; determining bounding-box coordinates for the target object; determining scaling ratios for the radial gradient based on the preset-gradient coordinates for the edited object and the bounding-box coordinates for the edited object; and generating the target-gradient coordinates for applying the radial gradient to the target object based on the scaling ratios, the preset-gradient coordinates for the edited object, the bounding-box coordinates for the edited object, and the bounding-box coordinates for the target object. In at least one embodiment, generating the target-gradient coordinates for applying the radial gradient to the target object includes: determining a horizontal offset of the edited object with respect to a horizontal center coordinate among the preset-gradient coordinates and a vertical offset of the edited object with respect to a vertical center coordinate among the preset-gradient coordinates based on the bounding-box coordinates for the edited object; and determining the target-gradient coordinates for applying the radial gradient to the target object based on the scaling ratios, the horizontal offset, the vertical offset, the bounding-box coordinates for the edited object, and the bounding-box coordinates for the target object. Also, in at least one embodiment, generating the target-gradient coordinates for applying the radial gradient to the target object comprises: scaling the bounding-box coordinates for the target object based on the scaling ratios; and determining the target-gradient coordinates by adjusting the scaled bounding-box coordinates according to center coordinates for the radial gradient.

In one or more embodiments, the series of acts 1300 includes determining the target-gradient coordinates for applying a linear gradient as the object-specific-preset gradient to a sky region as the target object by: identifying preset-zero-point coordinates for a preset-linear gradient on the edited object and preset-full-point coordinates for the preset-linear gradient on the edited object; determining a half-distance between the preset-zero-point coordinates and the preset-full-point coordinates; determining mid-point coordinates of a horizon line for the sky region in the target digital image; determining a slope of a line perpendicular to the horizon line; and determining the target-gradient coordinates by determining target-zero-point coordinates for the linear gradient on the sky region and target-full-point coordinates for the linear gradient on the sky region based on the half-distance, the mid-point coordinates of the horizon line, and the slope of the line perpendicular to the horizon line.

In at least one embodiment, the series of acts 1300 includes an act of determining the target-gradient coordinates for applying a linear gradient as the object-specific-preset gradient to a non-sky object as the target object by: identifying preset-zero-point coordinates for a preset-linear gradient on the edited object and preset-full-point coordinates for the preset-linear gradient on the edited object; scaling the preset-zero-point coordinates and the preset-full-point coordinates utilizing a transformation matrix; determining a rotation angle between center coordinates among bounding-box coordinates for the edited object and center coordinates between the preset-zero-point coordinates and the preset-full-point coordinates; and determining target-zero-point coordinates for the linear gradient on the non-sky object and target-full-point coordinates for the linear gradient on the non-sky object by rotating the scaled preset-zero-point coordinates and the scaled preset-full-point coordinates by the rotation angle.

As shown in FIG. 13, the series of acts 1300 includes an act 1350 of applying the object-specific-preset gradient to the target object based on the target-gradient coordinates. For example, the act 1340 involves applying the object-specific-preset gradient to the target object within the target digital image according to the target-gradient coordinates. In one or more embodiments, applying the object-specific-preset gradient to the target object with the target digital image according to the target-gradient coordinates includes one of: applying a radial gradient to an object within the target digital image, applying a linear gradient to a sky region within the target digital image, or applying a linear gradient to a non-sky region within the target digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media are any available media that is accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which are used to store desired program code means in the form of computer-executable instructions or data structures and which are accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links which are used to carry desired program code means in the form of computer-executable instructions or data structures and which are accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 14:
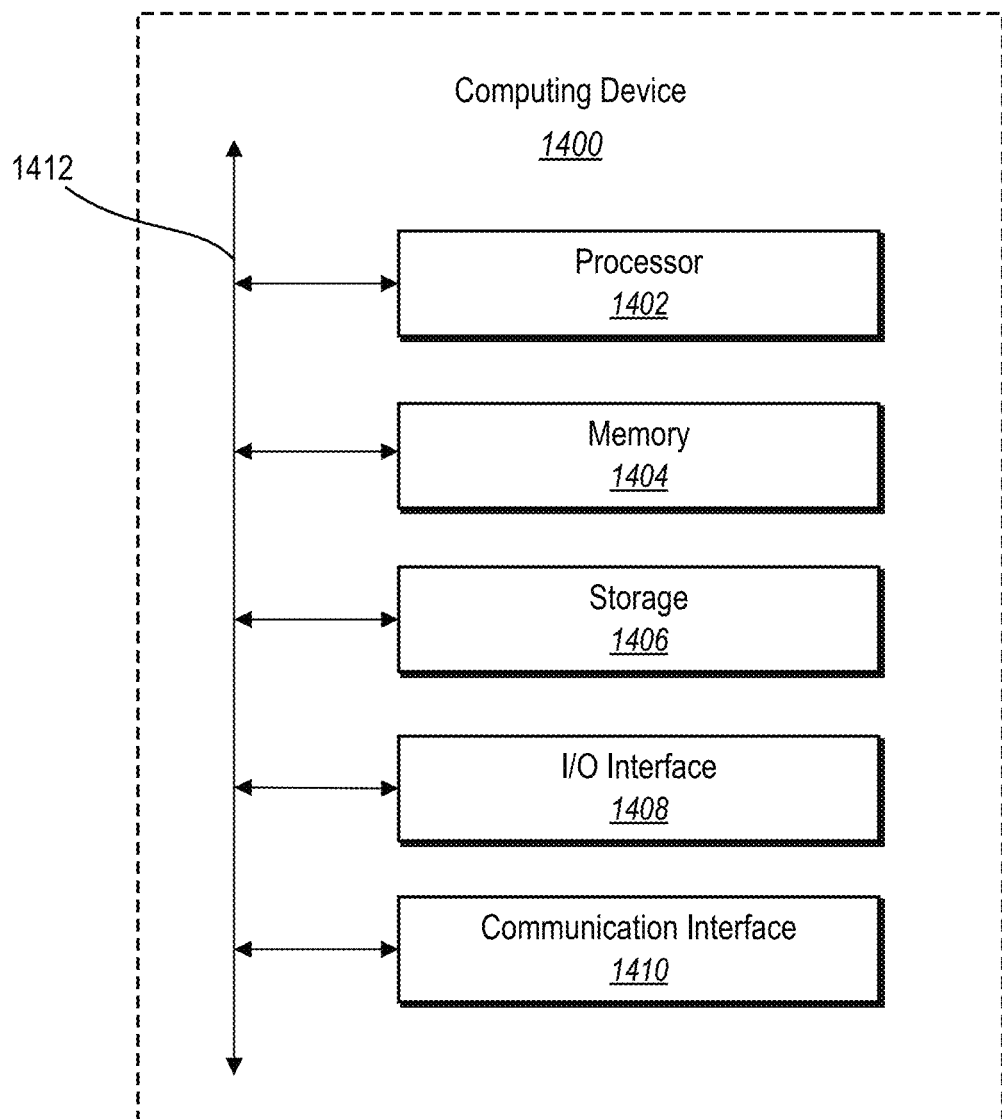
FIG. 14 illustrates a block diagram of an example computing device for implementing one or more embodiments of the present disclosure.

FIG. 14 illustrates a block diagram of an example computing device 1400 that may be configured to perform one or more of the processes described above. One will appreciate that one or more computing devices, such as the computing device 1400 may represent the computing devices described above (e.g., the server(s) 108, the client computing device 110). In one or more embodiments, the computing device 1400 may be a mobile device (e.g., a mobile telephone, a smartphone, a PDA, a tablet, a laptop, a camera, a tracker, a watch, a wearable device, etc.). In some embodiments, the computing device 1400 may be a non-mobile device (e.g., a desktop computer or another type of client computing device). Further, the computing device 1400 may be a server device that includes cloud-based processing and storage capabilities.

As shown in FIG. 14, the computing device 1400 includes one or more processor(s) 1402, memory 1404, a storage device 1406, input/output interfaces 1408 (or "I/O interfaces 1408"), and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, the storage device 1406 includes a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 includes hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 includes hardware, software, or both that connects components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   a memory component comprising a plurality of digital images and a digital-image-editing document for an object-specific-preset gradient; and
   one or more processing devices coupled to the memory component, the one or more processing devices to perform operations comprising:
      determining a set of objects within a target digital image;
      providing, for display on a client computing device, a preset-gradient option for the object-specific-preset gradient based on a target object, from the set of objects, corresponding to an object identifier for the object-specific-preset gradient; and
      based on a detected selection of the preset-gradient option:
         identifying preset-gradient coordinates for the object-specific-preset gradient on an edited object from an edited digital image;
         determining target-gradient coordinates for applying the object-specific-preset gradient to the target object within the target digital image by adjusting the preset-gradient coordinates for the object-specific-preset gradient to the edited object; and
         applying the object-specific-preset gradient to the target object within the target digital image according to the target-gradient coordinates.

2. The system as recited in claim 1, wherein the operations further comprise:
   determining the set of objects within the target digital image by determining one or more object identifiers for the set of objects within the target digital image utilizing a machine-learning-detection model; and
   determining that the target object corresponds to the object identifier for the object-specific-preset gradient by determining that an object identifier associated with the target object matches the object identifier for the object-specific-preset gradient.

3. The system as recited in claim 1, wherein adjusting the preset-gradient coordinates for the object-specific-preset gradient to the edited object further comprises determining transformed-positioning parameters for applying a radial gradient as a localized edit to the target object by:
   determining preset-gradient coordinates for a preset-localized edit to the edited object;
   determining bounding-box coordinates for the edited object as preset-positioning parameters for the edited object;
   determining bounding-box coordinates for the target object; and
   generating target-gradient coordinates for applying the radial gradient to the target object based on comparisons among the preset-gradient coordinates for the edited object, the bounding-box coordinates for the edited object, and the bounding-box coordinates for the target object.

4. The system as recited in claim 3, wherein generating the target-gradient coordinates for applying the radial gradient to the target object further comprises:
- determining scaling ratios for the radial gradient based on the preset-gradient coordinates and the bounding-box coordinates for the edited object;
- determining directional offsets of the edited object with respect to center coordinates among the preset-gradient coordinates based on the bounding-box coordinates for the edited object; and
- generating the target-gradient coordinates for applying the radial gradient to the target object based on the scaling ratios, the directional offsets, the bounding-box coordinates for the edited object, and the bounding-box coordinates for the target object.

5. The system as recited in claim 4, wherein the operations further comprise determining the transformed-positioning parameters for applying the radial gradient as the localized edit to the target object by modifying the target-gradient coordinates for applying the radial gradient to the target object based on an orientation of the target object within the target digital image.

6. The system as recited in claim 1, wherein the operations further comprise determining transformed-positioning parameters for applying a linear gradient as a localized edit to a sky region as the target object by:
- identifying, as preset-positioning parameters, preset-zero-point coordinates for a preset-linear gradient on the edited object and preset-full-point coordinates for the preset-linear gradient on the edited object;
- determining a half-distance between the preset-zero-point coordinates and the preset-full-point coordinates;
- determining mid-point coordinates of a horizon line for the sky region in the target digital image; and
- determining the transformed-positioning parameters by determining target-zero-point coordinates for the linear gradient on the sky region and target-full-point coordinates for the linear gradient on the sky region based on the half-distance and the mid-point coordinates of the horizon line.

7. A method comprising:
- determining a target object identifier for a target object within a target digital image;
- providing, for display on a client computing device, a preset-gradient option for an object-specific-preset gradient based on the target object identifier for the target object corresponding to a preset object identifier for the object-specific-preset gradient; and
- based on a detected selection of the preset-gradient option:
  - identifying preset-gradient coordinates for the object-specific-preset gradient on an edited object from an edited digital image;
  - determining target-gradient coordinates for applying the object-specific-preset gradient to the target object within the target digital image by adjusting the preset-gradient coordinates for the object-specific-preset gradient to the edited object; and
  - applying the object-specific-preset gradient to the target object within the target digital image according to the target-gradient coordinates.

8. The method as recited in claim 7, wherein applying the object-specific-preset gradient to the target object with the target digital image according to the target-gradient coordinates comprises one of: applying a radial gradient to an object within the target digital image, applying a linear gradient to a sky region within the target digital image, or applying a linear gradient to a non-sky region within the target digital image.

9. The method as recited in claim 7, wherein determining the target-gradient coordinates for applying a radial gradient as the object-specific-preset gradient to the target object comprises:
- determining bounding-box coordinates for the edited object;
- determining bounding-box coordinates for the target object;
- determining scaling ratios for the radial gradient based on the preset-gradient coordinates for the edited object and the bounding-box coordinates for the edited object; and
- generating the target-gradient coordinates for applying the radial gradient to the target object based on the scaling ratios, the preset-gradient coordinates for the edited object, the bounding-box coordinates for the edited object, and the bounding-box coordinates for the target object.

10. The method as recited in claim 9, wherein generating the target-gradient coordinates for applying the radial gradient to the target object comprises:
- determining a horizontal offset of the edited object with respect to a horizonal center coordinate among the preset-gradient coordinates and a vertical offset of the edited object with respect to a vertical center coordinate among the preset-gradient coordinates based on the bounding-box coordinates for the edited object; and
- determining the target-gradient coordinates for applying the radial gradient to the target object based on the scaling ratios, the horizontal offset, the vertical offset, the bounding-box coordinates for the edited object, and the bounding-box coordinates for the target object.

11. The method as recited in claim 9, wherein generating the target-gradient coordinates for applying the radial gradient to the target object comprises:
- scaling the bounding-box coordinates for the target object based on the scaling ratios; and
- determining the target-gradient coordinates by adjusting the scaled bounding-box coordinates according to center coordinates for the radial gradient.

12. The method as recited in claim 7, wherein determining the target-gradient coordinates for applying a linear gradient as the object-specific-preset gradient to a sky region as the target object comprises:
- identifying preset-zero-point coordinates for a preset-linear gradient on the edited object and preset-full-point coordinates for the preset-linear gradient on the edited object;
- determining a half-distance between the preset-zero-point coordinates and the preset-full-point coordinates;
- determining mid-point coordinates of a horizon line for the sky region in the target digital image;
- determining a slope of a line perpendicular to the horizon line; and
- determining the target-gradient coordinates by determining target-zero-point coordinates for the linear gradient on the sky region and target-full-point coordinates for the linear gradient on the sky region based on the half-distance, the mid-point coordinates of the horizon line, and the slope of the line perpendicular to the horizon line.

13. The method as recited in claim 7, wherein determining the target-gradient coordinates for applying a linear gradient as the object-specific-preset gradient to a non-sky object as the target object comprises:

identifying preset-zero-point coordinates for a preset-linear gradient on the edited object and preset-full-point coordinates for the preset-linear gradient on the edited object;
scaling the preset-zero-point coordinates and the preset-full-point coordinates utilizing a transformation matrix;
determining a rotation angle between center coordinates among bounding-box coordinates for the edited object and center coordinates between the preset-zero-point coordinates and the preset-full-point coordinates; and
determining target-zero-point coordinates for the linear gradient on the non-sky object and target-full-point coordinates for the linear gradient on the non-sky object by rotating the scaled preset-zero-point coordinates and the scaled preset-full-point coordinates by the rotation angle.

14. A non-transitory computer-readable medium storing executable instructions which when executed by a processing device, cause the processing device to perform operations comprising:
determining a target object identifier for a target object within a target digital image;
providing, for display on a client computing device, a preset-gradient option for an object-specific-preset gradient based on the target object identifier for the target object corresponding to a preset object identifier for the object-specific-preset gradient; and
based on a detected selection of the preset-gradient option:
identifying preset-gradient coordinates for the object-specific-preset gradient on an edited object from an edited digital image;
determining target-gradient coordinates for applying the object-specific-preset gradient to the target object within the target digital image by adjusting the preset-gradient coordinates for the object-specific-preset gradient to the edited object; and
applying the object-specific-preset gradient to the target object within the target digital image according to the target-gradient coordinates.

15. The non-transitory computer-readable medium as recited in claim 14, wherein the operations further comprise applying the object-specific-preset gradient to the target object with the target digital image according to the target-gradient coordinates comprising one of: applying a radial gradient to an object within the target digital image, applying a linear gradient to a sky region within the target digital image, or applying a linear gradient to a non-sky region within the target digital image.

16. The non-transitory computer-readable medium as recited in claim 14, wherein the operations further comprise determining the target-gradient coordinates for applying a radial gradient as the object-specific-preset gradient to the target object by:
determining bounding-box coordinates for the edited object;
determining bounding-box coordinates for the target object;
determining scaling ratios for the radial gradient based on the preset-gradient coordinates for the edited object and the bounding-box coordinates for the edited object; and
generating the target-gradient coordinates for applying the radial gradient to the target object based on the scaling ratios, the preset-gradient coordinates for the edited object, the bounding-box coordinates for the edited object, and the bounding-box coordinates for the target object.

17. The non-transitory computer-readable medium as recited in claim 16, wherein the operations further comprise:
determining a horizontal offset of the edited object with respect to a horizonal center coordinate among the preset-gradient coordinates and a vertical offset of the edited object with respect to a vertical center coordinate among the preset-gradient coordinates based on the bounding-box coordinates for the edited object; and
determining the target-gradient coordinates for applying the radial gradient to the target object based on the scaling ratios, the horizontal offset, the vertical offset, the bounding-box coordinates for the edited object, and the bounding-box coordinates for the target object.

18. The non-transitory computer-readable medium as recited in claim 16, wherein the operations further comprise:
scaling the bounding-box coordinates for the target object based on the scaling ratios; and
determining the target-gradient coordinates by adjusting the scaled bounding-box coordinates according to center coordinates for the radial gradient.

19. The non-transitory computer-readable medium as recited in claim 14, wherein the operations further comprise determining the target-gradient coordinates for applying a linear gradient as the object-specific-preset gradient to a sky region as the target object by:
identifying preset-zero-point coordinates for a preset-linear gradient on the edited object and preset-full-point coordinates for the preset-linear gradient on the edited object;
determining a half-distance between the preset-zero-point coordinates and the preset-full-point coordinates;
determining mid-point coordinates of a horizon line for the sky region in the target digital image;
determining a slope of a line perpendicular to the horizon line; and
determining the target-gradient coordinates by determining target-zero-point coordinates for the linear gradient on the sky region and target-full-point coordinates for the linear gradient on the sky region based on the half-distance, the mid-point coordinates of the horizon line, and the slope of the line perpendicular to the horizon line.

20. The non-transitory computer-readable medium as recited in claim 14, wherein the operations further comprise determining the target-gradient coordinates for applying a linear gradient as the object-specific-preset gradient to a non-sky object as the target object by:
identifying preset-zero-point coordinates for a preset-linear gradient on the edited object and preset-full-point coordinates for the preset-linear gradient on the edited object;
scaling the preset-zero-point coordinates and the preset-full-point coordinates utilizing a transformation matrix;
determining a rotation angle between center coordinates among bounding-box coordinates for the edited object and center coordinates between the preset-zero-point coordinates and the preset-full-point coordinates; and
determining target-zero-point coordinates for the linear gradient on the non-sky object and target-full-point coordinates for the linear gradient on the non-sky object by rotating the scaled preset-zero-point coordinates and the scaled preset-full-point coordinates by the rotation angle.

* * * * *